(12) United States Patent
Radecker et al.

(10) Patent No.: US 7,745,970 B2
(45) Date of Patent: Jun. 29, 2010

(54) CIRCUITRY FOR SUPPLYING A LOAD WITH AN OUTPUT CURRENT

(75) Inventors: Matthias Radecker, Duisburg (DE); Michael Lenz, Zomeding (DE)

(73) Assignees: Infineon Technologies AG, Munich (DE); Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1013 days.

(21) Appl. No.: 11/383,976

(22) Filed: May 18, 2006

(65) Prior Publication Data

US 2007/0024254 A1    Feb. 1, 2007

(30) Foreign Application Priority Data

May 23, 2005  (DE) ................. 10 2005 023 687
May 16, 2006  (DE) ................. 10 2006 022 819

(51) Int. Cl.
*H01L 41/08*    (2006.01)
(52) U.S. Cl. ............... 310/316.01; 310/317; 310/319
(58) Field of Classification Search ............ 310/316.01, 310/317
See application file for complete search history.

(56) References Cited

U.S. PATENT DOCUMENTS

| | | | | |
|---|---|---|---|---|
| 3,880,572 | A | * | 4/1975 | Haugsjaa et al. ............ 431/358 |
| 5,065,067 | A | * | 11/1991 | Todd et al. .................. 310/339 |
| 5,495,136 | A | * | 2/1996 | Chiang et al. ............... 310/339 |
| 5,546,294 | A | | 8/1996 | Schutten et al. |
| 5,854,543 | A | | 12/1998 | Satoh et al. |

(Continued)

FOREIGN PATENT DOCUMENTS

DE        696 04 896        12/1996

(Continued)

OTHER PUBLICATIONS

Hamamura, et al.; "Piezoelectric transformer AC-DC Converter Over a Worldwide Range of Input Voltage by Combined PWM and PFM Control"; Jun. 17-21, 2001; IEEE Power Electronics Specialists Conference, vol. 1, pp. 416-421.

(Continued)

*Primary Examiner*—Mark Budd
(74) *Attorney, Agent, or Firm*—Michael A. Glenn; Glenn Patent Group

(57) ABSTRACT

A circuitry comprises a converter means for generating an alternating current signal from an energy from an energy source, a piezo transformer with an input and an output, wherein the input of the piezo transformer is electrically coupled to the converter means, to receive the alternating current signal as an excitation on the input side from the converter means, and wherein the output of the piezo transformer is designed to provide an output current, and a load, which is coupled to the output of the piezo transformer, so that output current flows through the same. The load is designed to convert at least part of the electrical energy supplied by the output current flowing through the load into another form of energy. The load is further designed such that a useful power provided in the form of useful energy is substantially proportional to the output current. The circuitry is designed to adjust the output current to a predetermined value.

The described circuitry allows the supply of a load with particularly high efficiency, low interference emission and good regulation characteristics.

50 Claims, 23 Drawing Sheets

U.S. PATENT DOCUMENTS

| | | |
|---|---|---|
| 5,866,968 A | 2/1999 | Mech |
| 6,002,214 A | 12/1999 | Ribarich |
| 6,013,969 A | 1/2000 | Noma et al. |
| 6,087,787 A | 7/2000 | Williams |
| 6,144,139 A | 11/2000 | Noma et al. |
| 6,239,558 B1 | 5/2001 | Fujimura et al. |
| 6,281,637 B1 * | 8/2001 | Asada .................. 315/209 PZ |
| 6,348,755 B1 | 2/2002 | Shimamura et al. |
| 6,433,465 B1 * | 8/2002 | McKnight et al. ........... 310/339 |
| 6,591,524 B1 * | 7/2003 | Lewis et al. .................... 40/324 |
| 6,747,421 B2 * | 6/2004 | Kohn .......................... 315/291 |
| 6,853,150 B2 | 2/2005 | Clauberg et al. |
| 6,914,365 B1 * | 7/2005 | Chou et al. ................. 310/318 |
| 7,019,993 B2 * | 3/2006 | Vazquez Carazo ........... 363/67 |
| 7,049,760 B2 * | 5/2006 | Dowe ...................... 315/241 P |
| 7,218,533 B2 | 5/2007 | Radecker et al. |
| 2002/0024269 A1 | 2/2002 | Nakasutka et al. |
| 2007/0024254 A1 | 2/2007 | Radecker et al. |

FOREIGN PATENT DOCUMENTS

| | | |
|---|---|---|
| DE | 101 43 016 | 9/2001 |
| EP | 0 782 374 | 12/1996 |
| EP | 1146630 | 10/2005 |
| JP | 09-082479 | 9/1995 |

OTHER PUBLICATIONS

Yin, et al. Digital Controller Design for Electronic Ballasts with Phase Control.

* cited by examiner

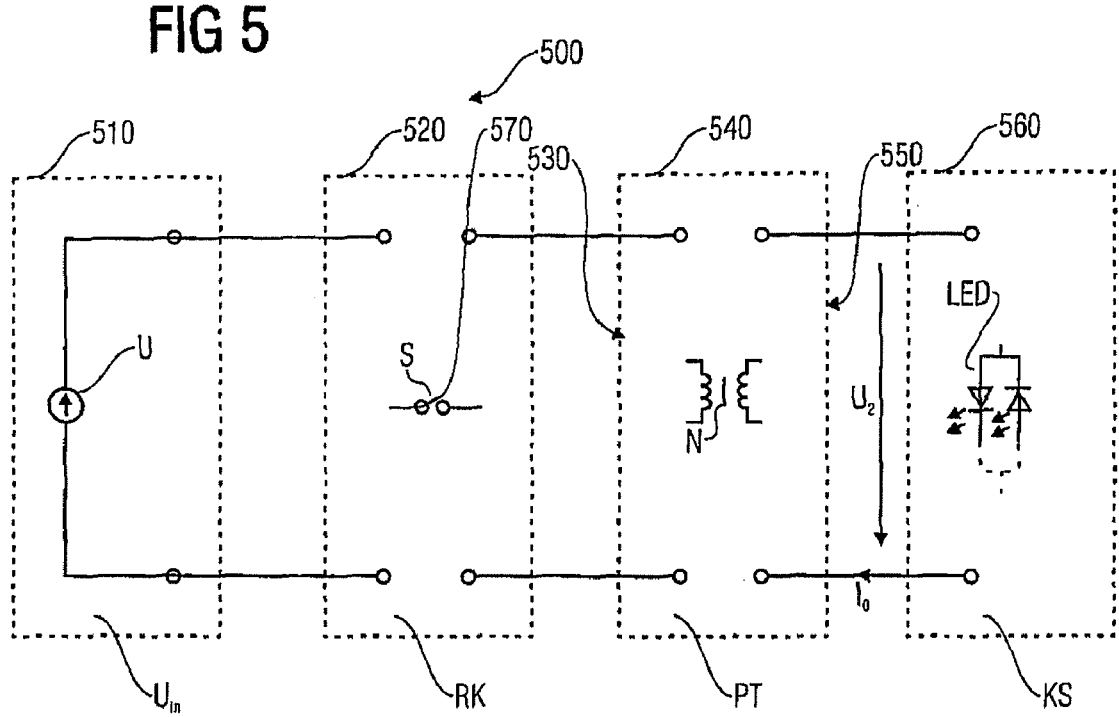

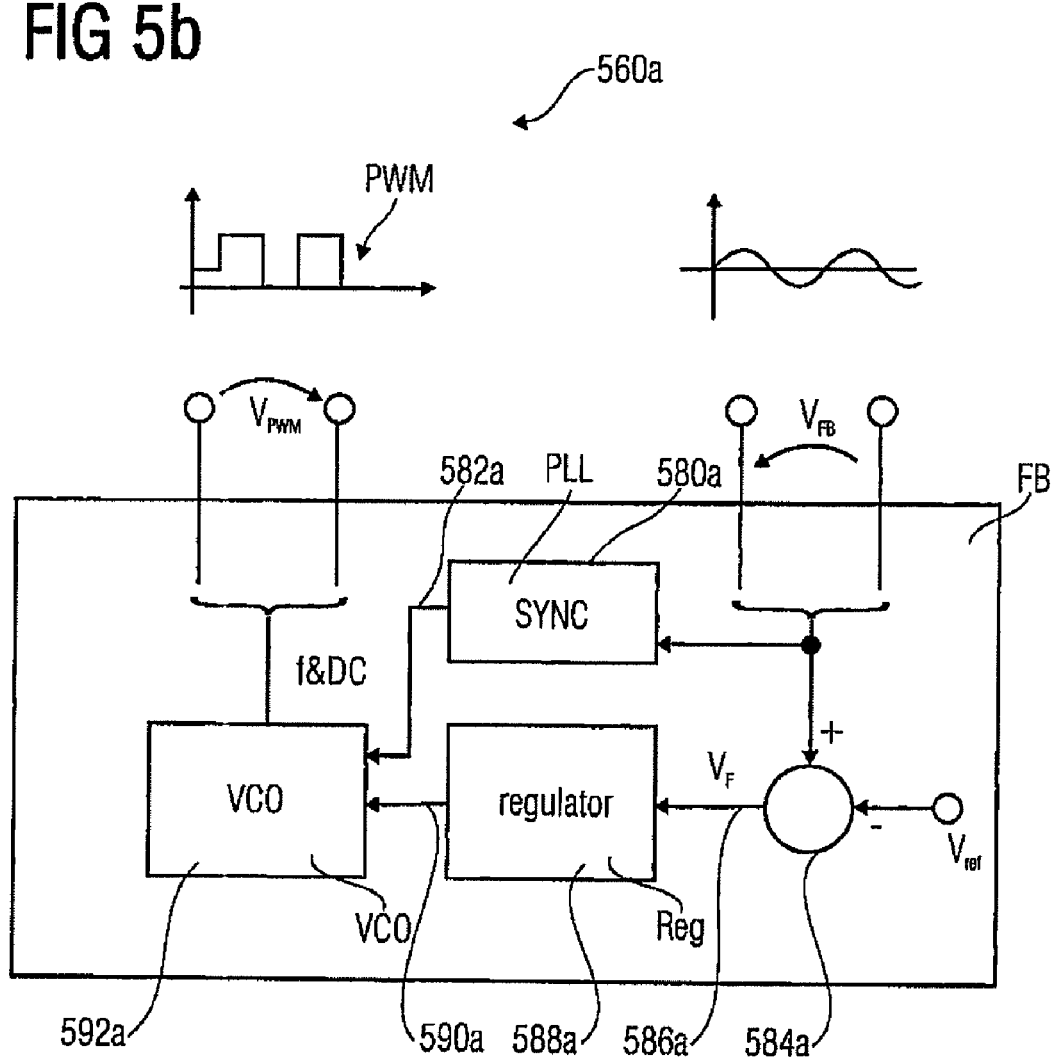

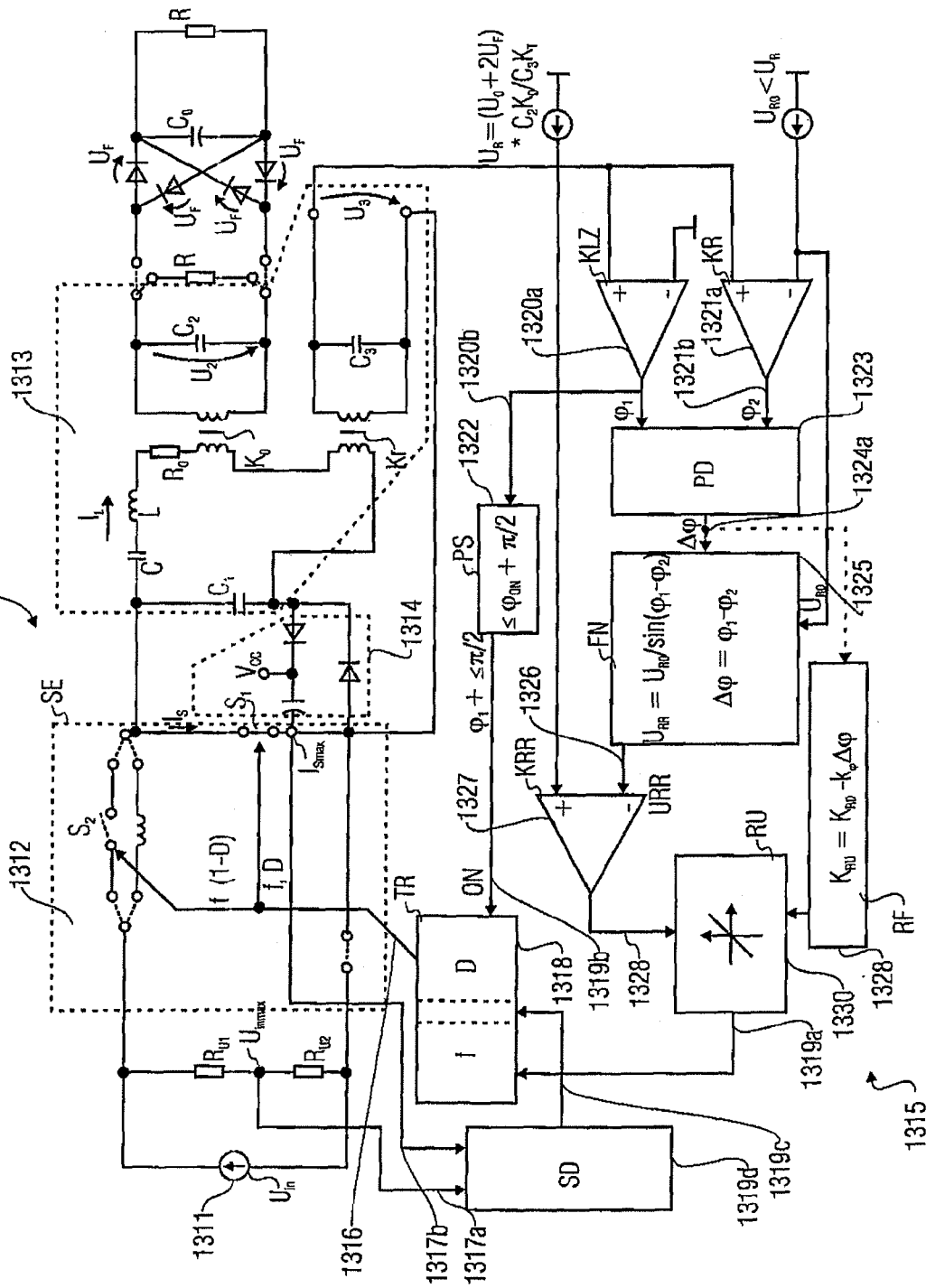

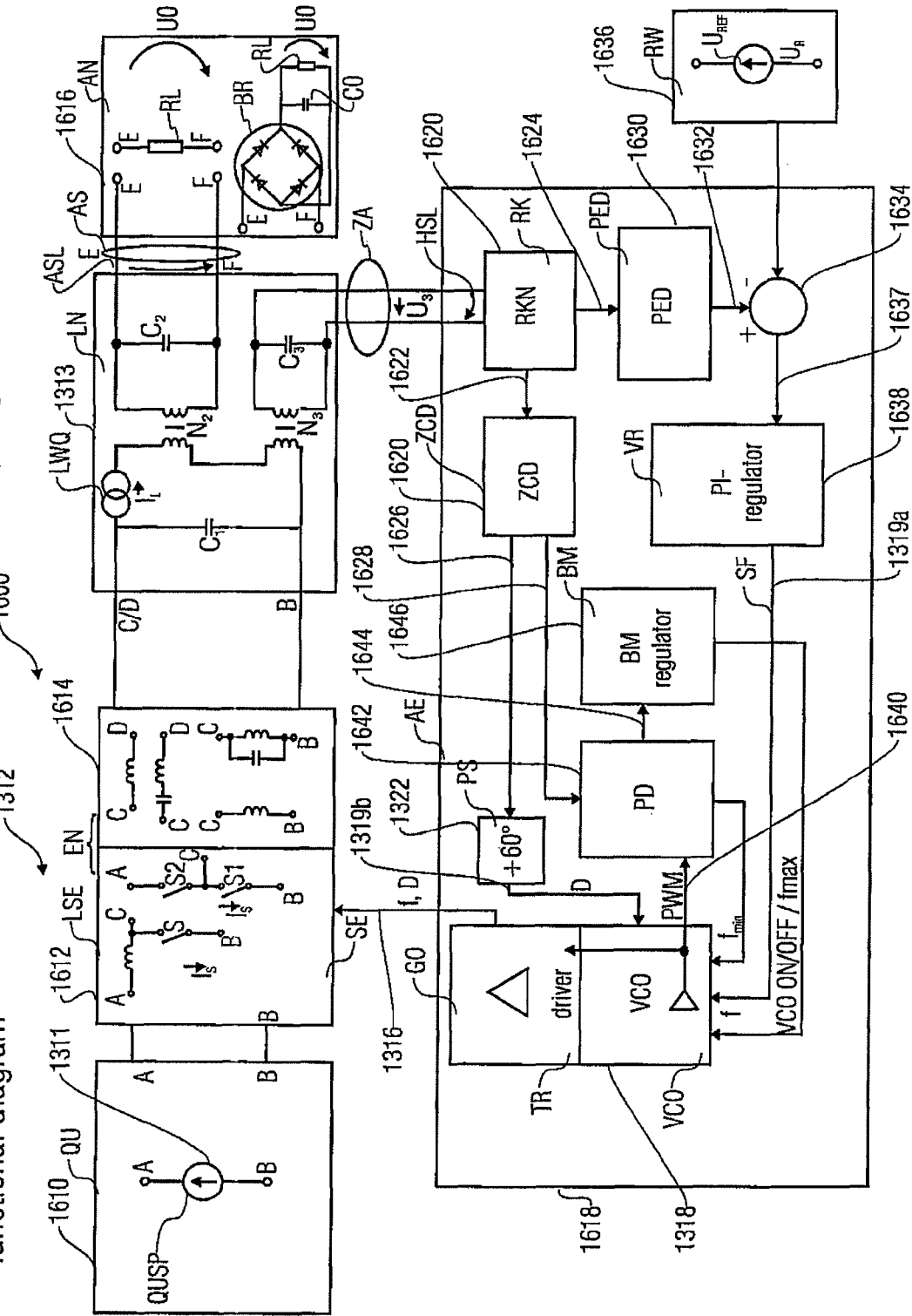

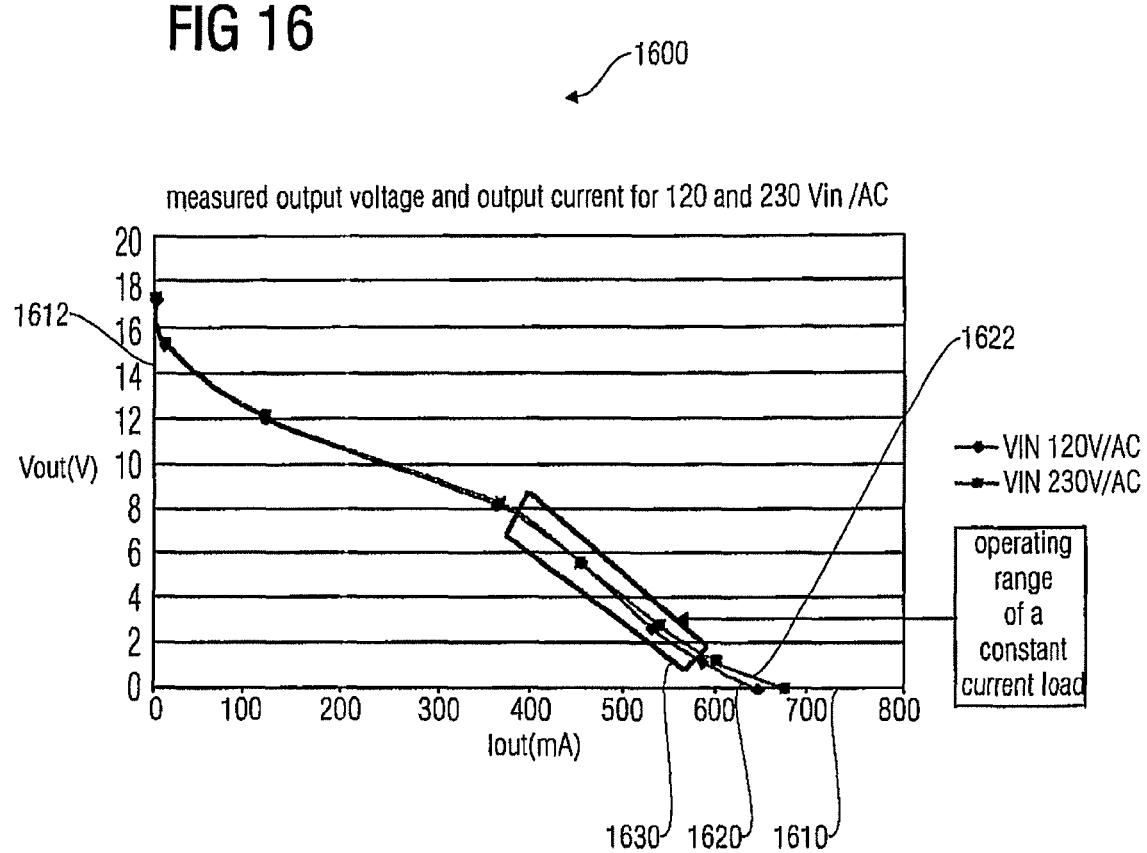

CIRCUITRY FOR SUPPLYING A LOAD WITH AN OUTPUT CURRENT

CROSS-REFERENCE TO RELATED APPLICATION

This application claims priority from German Patent Application No. 102005023687.1, which was filed on May 23, 2005, and is incorporated herein by reference in its entirety, and from German Patent Application No. 102006022819.7, which was filed on May 16, 2006 and is incorporated herein by reference in its entirety.

BACKGROUND OF THE INVENTION

1. Field of the Invention

The present invention relates generally to a circuitry for supplying a load with an output current, particularly to a control device for constant current loads with piezoelectric transformer.

2. Description of the Related Art

In many technical applications, it is required to supply electric loads, such as light-emitting diodes, fluorescent lamps or accumulators with a current.

Present simple approaches for operating such loads are, for example, series resistors. Thus, series resistors are frequently used, particularly in the context of light-emitting diodes. The disadvantage of such approaches is a comparatively high power dissipation and the fact that the current flowing through the load also changes with changing input voltage. A constant current regulator can, for example, provide a solution for the mentioned disadvantages. Analog regulators, such as linear regulators, have the advantage of a very low interference emission, but again have the disadvantage of comparatively high power dissipation.

Switched regulators, such as "hard-", which means non-resonant, switching converters, offer the advantage of a high efficiency, but emit a stronger interference spectrum (for example compared to analog regulators or linear regulators, respectively). In other words, with hard- or non-resonant switching converters, an interference voltage occurs in a conducted way and by free emission. Conventionally, said interference emission has to be suppressed or filtered out, respectively, by further circuit complexity.

Resonant flyback converters (also known as "soft" switching converter) have also the advantage of high efficiency and preferably only emit a low interference (noise) spectrum. However, resonant flyback converters are more expensive in terms of circuit engineering, since they require additional resonance elements.

A resonant arrangement for driving antiparallel LED chains or chains of light-emitting diodes or luminescent diodes is illustrated in U.S. Pat. No. 6,853,150 B2, wherein a resonance half bridge with an inductance and a capacitance is used. The antiparallel LED chains as load are again separated from each other by decoupling capacities, in order to balance voltage differences between the chains. Thus, a number of passive devices are given at least by the inductance and the capacitance. Thus, when only one antiparallel LED chain is used, the number of passive devices is determined to be at least two. Additionally, there are decoupling capacitances in every antiparallel LED chain branch.

Above a power of about 1 watt, at least one inductance has to be used as energy storage for current regulation in all switched or clocked regulators, respectively. The inductance makes the regulator bulky and expensive, respectively, both in size and costs. Thus, it is desirable to reduce the number of passive devices.

In the following, known converters will be described with regard to FIGS. 1a, 1b, 2 and 3. Thus, FIGS. 1a and 1b show circuit diagrams of flyback converters according to the prior art. In other words, a flyback converter is shown in FIGS. 1a and 1b as hard-switching regulator with a switch S. The converter according to FIG. 1a is designated by 100 in its entirety and the converter according to FIG. 1b is designated by 150 in its entirety. A flyback converter as hard-switching regulator with a switch according to FIG. 1a or 1b has the disadvantage that a current with high frequency is interrupted towards the input, so that a high-frequency input interference-spectrum is significant and has to be suppressed with additional filtering effort (at least in interference-sensitive applications).

Further, converters or regulators according to FIG. 1A or 1B for driving constant current loads, such as light-emitting diodes (LEDs) have the disadvantage that a filter capacitor $C_{out}$ on the output side and a fast rectifier diode $D_{out}$ have to be used to generate a voltage across the light-emitting diodes (LEDs) as a constant current load (KS). If the light-emitting diodes (LEDs) were connected directly to the output of the inductance $L_s$, and an alternating voltage were applied, then, a resulting reverse voltage across the light-emitting diodes (LEDs) with uninterrupted current flow would become at least equal to the input voltage $U_{in}$. Since light-emitting diodes (LEDs) have no high reverse disruptive strength, the shown arrangement is usually not practicable.

FIG. 2 shows a circuit diagram of a Buck converter according to the prior art. The Buck converter according to FIG. 2 is designated by 200 in its entirety, and comprises an input voltage source for providing an input voltage $U_{in}$, a switch S, a diode $D_{out}$, an inductance $L_s$, a capacitance $C_{out}$ as well as a constant current load KS consisting of a series connection of light-emitting diodes (LEDs), wherein the mentioned elements are connected to each other in the way shown in FIG. 2. The Buck converter 200 has the same disadvantages as the flyback converters 100, 150 shown with regard to FIGS. 1a and 1b. In other words, the discussion with regard to the problems of the reverse voltage occurring at the light-emitting diodes to the flyback converters 100, 150 apply also with regard to the Buck converter shown in FIG. 2. Further, the Buck converter has the additional disadvantage that the input voltage $U_{in}$ always has to remain higher than the sum of forward voltages of the light-emitting diode of the LED chain.

Further, it should be noted that the circuitry 150 according to FIG. 1b has the advantage compared to the circuitry 100 according to FIG. 1a, that controlling the switch S can be performed without additional circuits (such as, for example, bootstrap circuits) from the input source (with the input voltage $U_{in}$).

FIG. 3 shows a circuit diagram of a boost converter according to the prior art. The boost converter according to FIG. 3a is designated by 300 in its entirety and comprises an input voltage source providing an input voltage $U_{in}$, an inductance $L_s$, a switch S, a diode $D_{out}$, a capacitance $C_{out}$ as well as a constant current load KS, which is formed, for example, by a series connection of light-emitting diodes (LEDs). The mentioned circuit elements are connected or coupled, respectively, in the way shown in FIG. 3.

The circuit 300 according to FIG. 3 can cause improved smoothing of the input current as boost converter (compared to the circuitries shown in FIGS. 1a, 1b and 2). Additionally, with uninterrupted current flow, usage of the LED chain KS as rectifier without additional smoothing capacitor $C_{out}$ would be possible. A reverse disruptive strength of the LED chain would additionally be sufficient to operate the light-emitting diodes (LEDs) in reverse direction, since a voltage would be equal to zero in an on state of the switch S. However, the circuit or circuitry 300 has the disadvantage that it is not short-circuit-proof, so that in the case of a short circuit across the LED chain, the input source (providing the input voltage $U_{in}$) is not protected from overcurrent. A corrective is provided, for example by an additional limiting resistor in an input circuit, which causes, additionally, increased losses, even during normal operation. Alternatively, a fast fuse can be used, which again causes additional costs and irreversible failure in the case of a short circuit.

Further, all flyback converters shown with regard to FIGS. 1a, 1b, 2 and 3 have the disadvantage that they have to be regulated by a feedback of the output current or output voltage to an approximately constant output power and thus to a constant current in the light-emitting diodes (LEDs) or other electrical loads. Therefore, a resistor divider for detecting the input and output voltage or a sense resistor is usually required for detecting the output current.

Additionally, the boost converter (for example the converter according to FIG. 3) has the disadvantage that additional elements for damping short-term overvoltages (for example for dealing with a load drop or load dump, respectively) are required in vehicle networks in order to avoid an overload at the electrical loads (for example at the LED chain).

SUMMARY OF THE INVENTION

It is an object of the present invention to provide a circuitry for efficient and interference-free operation of a load, which converts electrical energy into another form of useful energy.

The present invention provides a circuitry having: a converter means for generating an alternating current signal from energy from an energy source; a piezo transformer with an input and an output, wherein the input of the piezo transformer is electrically coupled to the converter means to receive the alternating current signal from the converter means as an input side excitation, and wherein the output of the piezo transformer is designed to provide an output current; and a load coupled to the output of the piezo transformer so that output current flows through the same, which is designed to convert at least part of the electrical energy supplied by the output current flowing through the load into another form of energy, and which is further designed such that a useful power provided in the form of useful energy is substantially proportional to the output current; and wherein the circuitry is designed to adjust the output current to a predetermined value.

It is the central idea of the present invention that an operation of a load converting electric energy into another form of energy, so that the useful power provided in the form of useful energy is substantially proportional to the output current flowing through the load, can be obtained in a particularly favorable way when a piezo transformer provides the output current. It has been shown that by using a piezo transformer, a particularly precise adjustment or regulation of the output current to a predetermined value is possible, wherein a high flexibility exists with regard to tapping a feedback quantity when using a piezo transformer, since both an input current of the piezo transformer and an auxiliary signal tapped at the auxiliary output of the piezo transformer represent a measure for the output current, which can be used for regulating. Further, due to the high Q, a piezo transformer allows a suppression of harmonics, so that the output current substantially only has a base frequency. Thereby, interference of adjacent circuitries by the inventive circuitry is avoided or minimized, respectively.

Further, a circuitry using a converter means for generating an alternating current signal from energy of an energy source, as well as piezo transformer receiving the alternating current signal on the input side, has a particularly high efficiency. By appropriate control or regulation of the converter means, it can be ensured that the converter means supplies approximately exactly that energy to a piezo transformer, which is consumed by the load connected to the output of the piezo transformer. Switching losses in the converter means can be kept low, and losses in the piezo transformer itself are very low due to the typically high Q of a piezo transformer. By using the inventive circuitry, adjustment of the current is performed by the electrical load and not, as in common practice, by dissipation. Thus, power dissipation of the inventive circuitry is low, which, on the one hand, reduces the power consumed on the input side and, on the other hand, minimizes objectionable heat built-up.

Further, a piezo transformer allows to replace the conventionally required several passive devices with only one device, the piezo transformer itself. The piezo transformer can be kept low and small in its structural height, so that there is an advantage with regard to the required structural volume of the inventive circuitry compared to conventional circuitries. This facilitates the realization of an inventive circuitry with a given housing. Further preferred embodiments of the present invention will be defined below by the dependent claims.

BRIEF DESCRIPTION OF THE DRAWINGS

These and other objects and features of the present invention will become clear from the following description taken in conjunction with the accompanying drawings, in which:

FIG. 5 is a block diagram of an inventive circuitry according to a first embodiment of the present invention;

FIG. 5b is a block diagram of a control circuit for usage in inventive circuitry;

FIG. 15 is a block diagram of an inventive circuitry according to a thirteenth embodiment of the present invention; and FIG. 16 is a graphical illustration of measurement results in a circuitry with auxiliary tap ZA according to FIG. 6c and FIG. 15 for synchronization of the turn-on time and for regulation across a peak detector PED 1630, and a comparator 1637 when using a constant reference $U_R$ in block RW 1636 for regulating an approximately constant output current around a selectable operating point of the right curve range >400 mA at a LED forward voltage $U_O$ of a about 2.5 V, and a load current $I_O$ of about 530 mA, independent of the input voltage.

DESCRIPTION OF THE PREFERRED EMBODIMENTS

Figure 4:
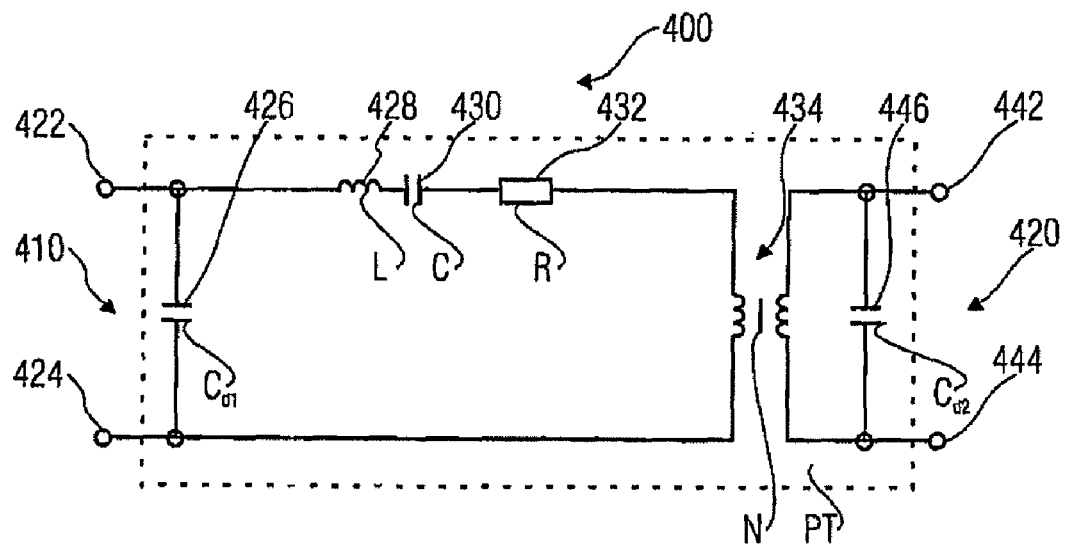
FIG. 4 is an equivalent circuit diagram of a piezo transformer.

FIG. 4 shows an equivalent circuit diagram of a piezo transformer for usage in an inventive circuitry. The piezo transformer according to FIG. 4 is designated by 400 in its entirety. The piezo transformer 400 (in the following also designated as piezo trafo) comprises an input 410 and an output 420, which can be, for example, galvanically separated (but not necessarily have to be so). The input 410 has two input terminals 422, 424. An input capacitance 426, which is also designated by $C_{d1}$, is connected between the first input terminal 422 and the second input terminal 424. Further, the piezo transformer 400 has a series resonant circuit, consisting of an inductance 428 (also designated by L), a capacitance 430 (also designated by C) and a resistor 432 (also designated by R). The series resonant circuit 428, 430, 432 (RLC) is connected in series to an input of a transformer 434 between the first input terminal 422 and the second input terminal 424, as can be seen from FIG. 4. An output of the transformer 434 is additionally coupled to output terminals 442, 444 of the output 420 of the piezo transformer 400. Additionally, an output capacitance 446 (also designated by $C_{d2}$) is connected in parallel to the output of the transformer 434. The transformer 434 realizes a voltage transformation ratio (voltage transmission ratio) of N between its input and its output.

A piezo transformer for usage in an inventive circuitry has also the electrical equivalent circuit diagram shown with regard to FIG. 4 and serves as energy transformer. By damping the resonant circuit formed by the equivalent elements inductance 428 (L) and capacitance (C) with an output load (for example an ohmic load connected to the output terminals 442, 444), any desired transformation ratio can be adjusted by frequency change (or frequency adjustment) and by a selection of the voltage transformation ratio (N) of the transformer (434). If an operating frequency of a transformation converter (for example the frequency of an excitation on the input side supplied to the input 410 of the piezo transformer 400) deviates sufficiently from a mechanical resonance frequency of the piezo transformer 400, no power will be transmitted to the output 420 of the piezo transformer 400, and the piezo transformer 400 isolates the output 420 electrically from the efficiency of an input voltage (for example at the input 410 of the piezo transformer 400).

By a transformation ratio N adjustable during the design (of the piezo transformer or the inventive circuitry, respectively), the piezo transformer 400 according to FIG. 4 can effect an arbitrary up or down transformation of the input voltage, and can thus be adapted to a desired voltage at an electrical load (which is, for example connected to the output 420 of the piezo transformer 400). Simultaneously, by a high efficiency of the piezo transformer 400 and low losses in connection therewith, represented by the equivalent loss resistor 432 (R), a disadvantage of conventional approaches is eliminated.

The input and output capacitances 426, 446 of the piezo transformer 400 ($C_{d1}$, $C_{d2}$) can be adjusted such that an optimum efficiency is obtained by impedance adaptation to the load with regard to a design of $C_{d2}$, and that an optimum zero voltage switching (ZVS) is obtained with regard to a selection of the input capacitance 426 ($C_{d1}$) in the switches of a driving converter circuit (RK).

FIG. 5 shows a block diagram of an inventive circuitry according to a first embodiment of the present invention. The circuitry according to FIG. 5 is designated by 500 in its entirety. The circuitry 500 comprises an input voltage source 510 providing an input voltage $U_{in}$, and which is not to be considered as integral part of the inventive circuitry, but rather symbolizes a provision of an input voltage $U_{in}$ or a corresponding input current, respectively. Further, the circuitry 500 comprises a converter means 520 (also designated by RK). The converter means 520 is coupled to the voltage source 510 to receive energy or power, respectively, from the voltage source 510. The converter means 520, which is preferably a resonance converter circuit, is additionally coupled to an input 530 of a piezo transformer 540 (or another resonant transformer arrangement). An output 550 of the piezo transformer 540 is additionally coupled to a load 560 (also designated by KS).

In the following, based on the structural description, the mode of operation of the circuitry 500 will be described, which shows a basic arrangement of an inventive approach. The voltage source 510, which can also be considered as input source $U_{in}$, is connected or coupled, respectively, to the converter means or resonance converter circuit 520 (RK), respectively. The converter means 520, which is preferably a resonance converter circuit, includes at least one switch, and is designed to generate an alternating current signal from the input voltage $U_{in}$ provided from the voltage source 510 at the input 530 of a piezo transformer 540. In other words, since the converter means 520 is connected to the piezo transformer or piezoelectric transformer 540 (PT), respectively, the alternating current signal generated by the converter means can form excitation of the piezo transformer 540 on the input side. An arrangement of antiparallel constant current loads KS is arranged, for example, at the output 550 of the piezo transformer 540 (as load 460). In other words, load 560 comprises, for example, two luminescent diodes connected in antiparallel or two chains of luminescent diodes connected in antiparallel, which can be considered as constant current loads in that an optical power emitted from the luminescent diodes or light-emitting diodes (also referred to as LED) is typically proportional to a current flow through the light-emitting diodes. In so far it is desirable that a predetermined and constant current flows through the load 560 or the light-emitting diodes contained in the load, respectively.

It should further be noted that the converter means 520 can be designed, for example, for an adjustment of a constant or at least approximately constant current or output current $I_0$, respectively, through the load 560.

A feedback for adjusting the constant current (for example the constant output current $I_0$ through the load 560) is not necessarily required, since controlling the piezo transformer 540 can be preformed within the converter means or converter circuit 520 (RK), respectively, wherein an approximately constant output current can be adjusted independent of the load 560 and the input voltage $U_{in}$.

In other words, the converter means 500 generates an alternating current signal based on the input voltage $U_{in}$ from the voltage source 510, by switching at least one switch 570 (also designated by S). For that purpose, the converter means 520 can, for example, comprise further switches or additional reactive elements, as will be discussed below. The resulting alternating current signal serves as input signal at the input 530 of the piezo transformer 540, wherein the piezo transformer provides an output voltage $U_2$, an output current $U_0$ or an output power, respectively, at its output 550, which depends on frequency and amplitude of the alternating current signal on the input side. The output voltage $U_2$ or the output current $I_0$ of the piezo transformer 540, respectively, serve to supply the load 560. Thus, the output voltage $U_2$ or the output current $I_0$ can be adjusted by appropriately adjusting amplitude of the alternating current signal and the frequency f of the alternating current signal. In other words, by adjusting the operating frequency f of the converter means 520, which means the frequency with which the switch 570 (as well as possibly further existing switches) is switched, the output current $I_0$ can be influenced. Further, the selection of turn-on moments (instants) and turn-off moments when the switch 570 (and possibly further switches) is switched (turned) or turned on and turned off, respectively, can also influence the output current $I_0$. For that reason, it will be discussed in detail below how the converter means 520 can be controlled or regulated, respectively, or how the operating frequency f as well as the turn-on moments and the turn-off moments of the switch 570 can be controlled or regulated, respectively.

For a better understanding, it should be noted that different concepts exist for controlling or regulating the converter unit 520.

Figure 6A:
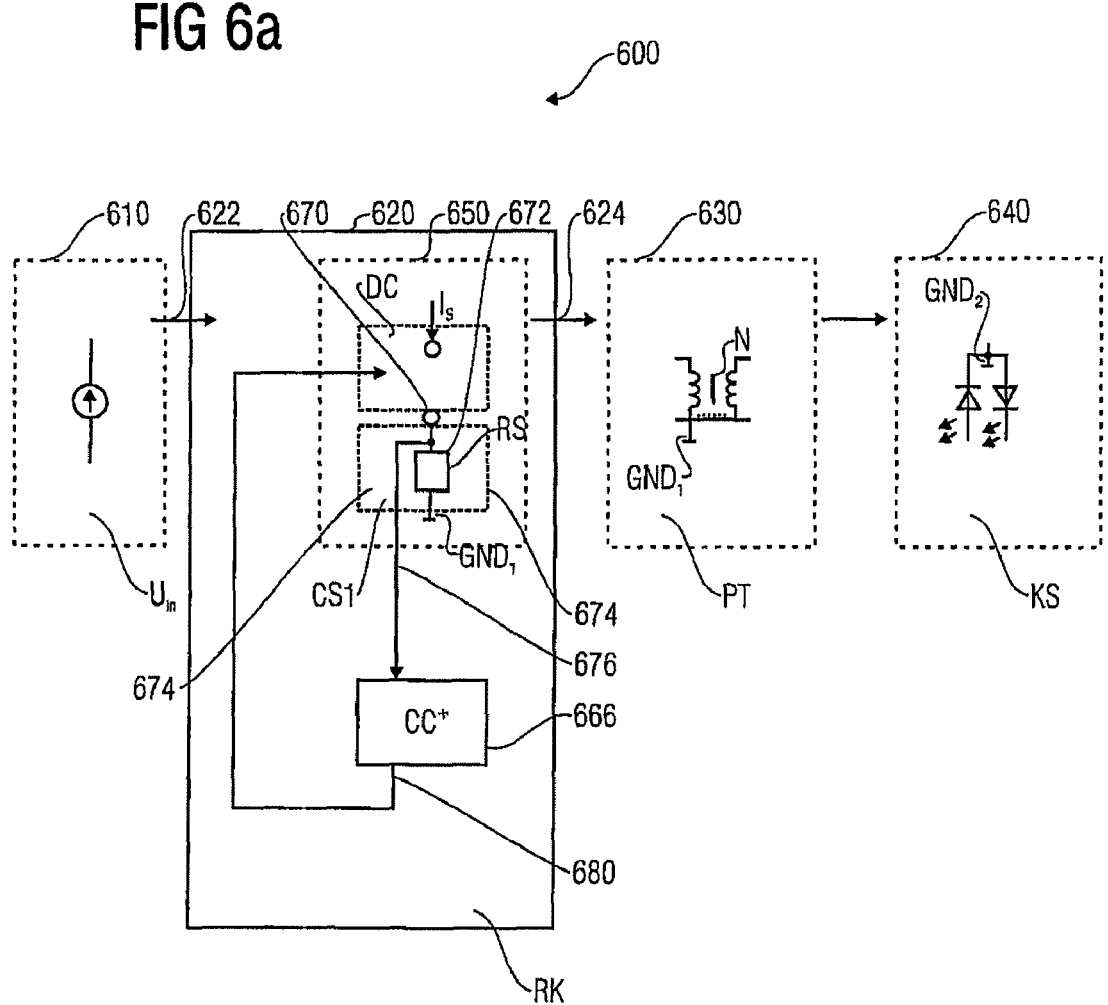
FIG. 6a is a block diagram of an inventive circuitry according to a third embodiment of the present invention.

Thus, with reference to FIG. 6a, it will first be determined how the converter unit can be regulated based on a determination of a current through the switch 570.

Then, with reference to FIGS. 6b, 7a and 7b, it will be described how the converter unit 510 can be controlled or regulated by evaluating both a current flow through the switch 570 and an output current $I_0$ through the load.

Further, with regard to FIGS. 5a, 5b, 6c, 7c, 7d, 12, 13a, 13b, 13c, 13d, 13e, 13f, 14 and 15, it will be explained how the converter unit 510 can be controlled or regulated by using an auxiliary signal, which is coupled-out (extracted) from the piezo transformer.

Further, FIGS. 8, 9, 10 and 11 show different approaches for operating a load, wherein the circuitries according to FIGS. 8, 9, 10 and 11 can, for example, replace the load 560 (or the loads shown in the other Figs.). It should further be noted that all load circuits described in the previous description could be advantageously used with all other described circuitries for supplying the different load arrangements.

FIG. 6a shows a circuit diagram of an inventive circuitry according to an embodiment of the present invention. The circuitry according to FIG. 6a is designated by 600 in its entirety. The circuitry 600 receives an input voltage $U_{in}$ from an input voltage source or input current source 610, respectively. Thereby, the input voltage source 610 corresponds the input voltage source 510 shown with regard to FIG. 5. The input voltage source 610 is coupled to a converter means 620 to provide energy or power 622 to the converter means 620. The converter means 620 provides itself an alternating current signal 624 to an input of a piezo transformer 630. For that purpose, an output of the converter means 620 is coupled to the input of the piezo transformer 630. An output of the piezo transformer 630 is further coupled to a load 640, which is, for example, a constant current load. Details with regard to the piezo transformer 630 and the load 640 have already been described above or will be described below, wherein the corresponding configurations are related to all embodiments of the inventive circuitry if not otherwise indicated.

The converter means 620 comprises a switch unit 650 as well as regulation means 660, which is also referred to as constant current regulator CC. The switch unit 650 comprises at least one switch 670 (also designated by S below), which is connected in series or in parallel into a circuit between an input of the switch unit 650, which is coupled to the voltage source 610, and an output of the switch unit 650, which is coupled to the input of the piezo transformer 630. Thereby, the switch 670 is connected between the voltage source 610 and the piezo transformer 630, such that switching the switch 670, possibly in connection with further switches or reactive elements, causes a generation of the alternating current signal based on the energy or power 622 provided from the voltage source 610.

A shunt resistor 672 is connected in series to the switch 670 and allows a determination of the current flowing through the switch 670. Thus, generally, the shunt resistor 672 forms a current determination means 674, which is also designated by CS1. The current determination means 674 or the shunt resistor 672, respectively, provides a current description signal 676, which describes the current through the switch 670, to the regulation means 666. The regulation means 666 generates a control signal 680 for controlling or turning on and turning off switch 670. The regulation means 666 is designed to control, for example, the switch 670 such that for example a maximum value, average value or effective value of a current $I_S$ through the switch 670 is adjusted to a predetermined value. In other words, the regulation means 666 compares the information 676 about the current $I_S$ through the switch 670, for example, with a predetermined reference value and increases or decreases an operating frequency f, by which the switch 670 is switched or turned on or turned off, respectively, in dependence of a difference between information 676 and the reference value. Alternatively or additionally, the regulation means 666 can also adjust turn-on moments or turn-off moments or a duty cycle of the switch 670 in dependence on the information 676 (possibly in connection with a reference value).

Additionally, it should be noted that the regulation means 666 could adjust the reference value for example in dependence on a wave form or a signal shape of the signal 676, respectively. The regulation means 660 can infer the input voltage $U_{in}$ or also the quantity of the load 640 for example, from a slew rate of the signal 666. Additionally, optionally, the predetermined reference value can be adjusted in dependence on a determination of the quantity of the load 640. Thereby, a quantity depending on the quantity of the load (for example a phase shift between two currents or between a current and a voltage, or a waveform of a signal) can be evaluated. If the quantity of the load 640 is at least approximately known, the reference value can be derived from the quantity of the load, for example by using a lookup table or a functional context. For example, the reference value can be decreased compared to a nominal reference value, when it is determined that the load is smaller than a nominal load. Thereby, it is avoided that the same current is impressed into a decreased load as into a high load, which might cause a destruction of the small load.

In summary, it can be said that the regulation of the converter means 620 in the circuitry 600 according to FIG. 6a is substantially performed based on a comparison or formation of a difference between a current $I_S$ through the switch 670 and a reference value.

Figure 6B:
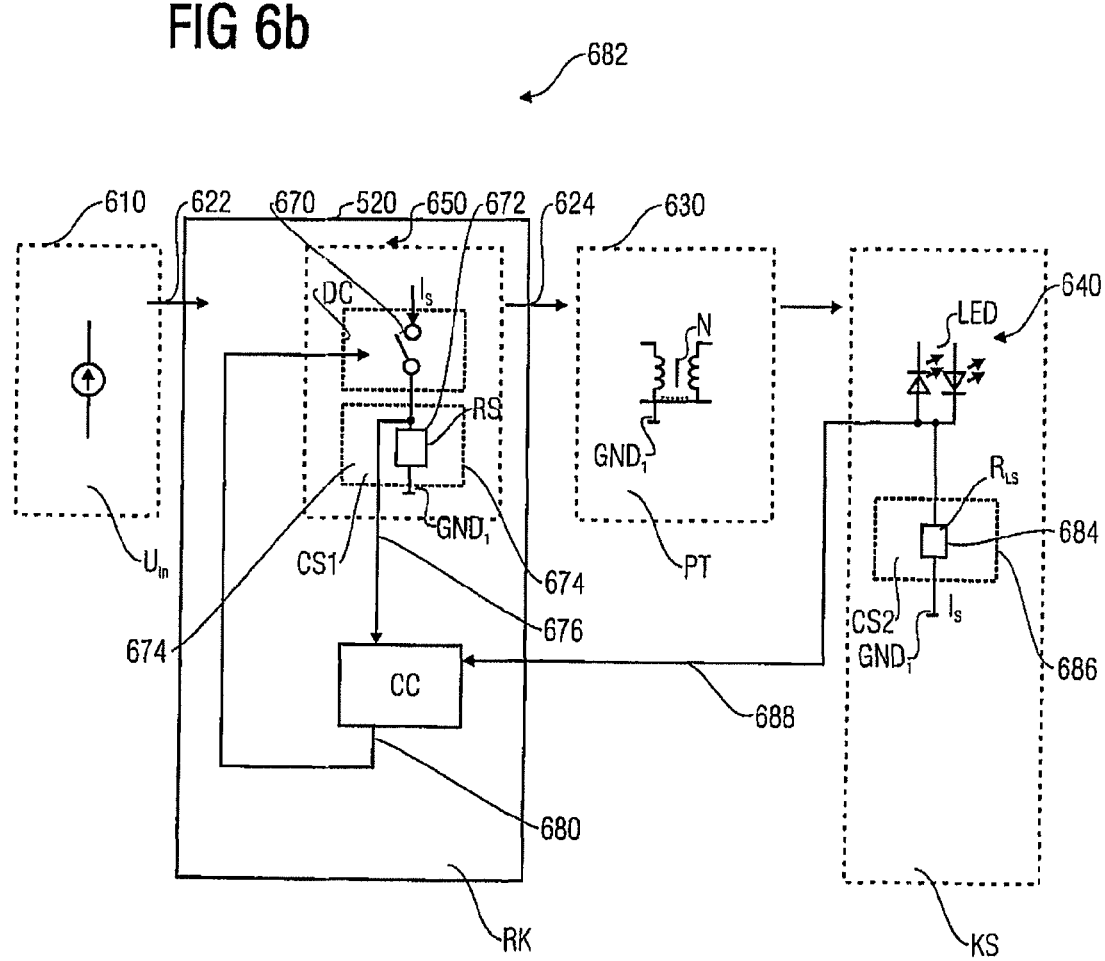
FIG. 6b is a block diagram of an inventive circuitry according to a fourth embodiment of the present invention.

FIG. 6b shows a circuit diagram of an inventive circuitry according to a further embodiment of the present invention. The circuitry according to FIG. 6b is designated by 682 in its entirety. Here, it should be noted that the circuitry 682 is very similar to the circuitry 600 according to FIG. 6a, apart from differences with regard to the regulation means, so that equal means in the circuitries 600, 682 are provided with the same reference numbers.

However, the circuitry 682 further comprises an output current detection, which will be discussed below. The load 640 is again coupled to the output of the piezo transformer 630 in the circuitry 682. However, the circuitry 682 comprises an output current determination means, which is designed to detect the output current $I_O$ flowing through the load 640. In the shown embodiment according to FIG. 6b, a shunt resistor or sense resistor 684, respectively, is connected in series to the load 640, so that a voltage drop across the shunt resistor or sense resistor 684, respectively, is proportional to the output current $I_O$ flowing through the load 640. Additionally, the output current detection means is also designated by 686 or CS2, respectively, and provides an output current description signal 688, which is a measure for an output current $I_O$ flowing through the load 640. A regulation means 690 processes both the switch current description signal 676 and the output current description signal 688 to generate the switch control signal 680. The regulation means 690 is, for example, designed to determine zero crossings of the switch current $I_S$ and the output current $I_O$, and to determine a phase difference between an input current at the input of the piezo transformer 630 and an output current at the output of the piezo transformer 630 based on the times of the zero crossings of the switch current $I_S$ and the output current $I_O$. Further, the regulation means 690 is preferably designed to control the switch 670 with regard to an operating frequency f, turn-on moments, turn-off moments and/or a duty cycle, to adjust or regulate, respectively, the phase difference between the input current of the piezo transformer 630 and the output current $I_O$ of the piezo transformer 630 to a predetermined phase difference reference value. In other words, the regulation means 690 is designed to change the operating frequency f, turn-on times, turn-off times or duty cycle of the control signal 680 in dependence of the phase difference between the input current of the piezo transformer 630 and the output current of the piezo transformer 630 on the one hand, and the phase difference reference value on the other hand, in order to minimize a deviation between the phase difference and the phase difference reference value.

Further, the regulation means 690 can also use an absolute quantity of the output current $I_O$, for example an amplitude, an average value or an effective value of the output current $I_O$ for regulation or an adjustment, respectively, of parameters (operating frequency f, turn-on time, turn-off time, duty cycle) of the control signal 680. The deviation of the mentioned phase difference from the phase difference reference value as well as a deviation of the quantity of the output current $I_O$ from an output current reference value, can be combined, for example linearly with each other, to determine the parameters of the control signal 680.

Further, it has to be noted that the phase difference reference value and possibly the output current reference value can either be fixed or can be adjusted, for example, by determining a quantity of the load 640 (for example the load resistor or the load impedance), as has been described above. By adjusting the phase difference reference value or the output current reference value, it can, for example, be accomplished that the phase difference reference value or the output current reference value describes a smaller nominal output current when a smaller load is present.

In a further embodiment, the switch current detection means 670 and the switch current description signal 676 are omitted. In that case, the regulation means 690 is further designed to receive the output current description signal 688. In this embodiment, the regulation means 690 is designed to adjust the parameters of the control signal 680 based on a maximum value, average value or effective value of the output current $I_O$, and to thus adjust the quantity of the output current $I_O$ to the output current reference value. In other words, in the mentioned embodiment, merely the output current itself is detected with regard to a maximum value or effective value, and for example, adjusted or regulated to a constant effective current value.

Further, it should be noted that the circuitries 600 according to FIGS. 6a and 700 according to FIG. 6b differ with regard to the underlying reference potentials in a preferred embodiment.

In the circuitry 600 according to FIG. 6a, typically, both the voltage source 610 and the switch unit 650 and the input of the piezo transformer 630 are at the same reference potential, which is, for example, designated by GND1. The load, however, can use a second reference potential GND2 differing from the first reference potential GND1, like the output of the piezo transformer 630. Thus, the circuitry 600 allows decoupling of the reference potentials GND1, GND2 on the input side and on the output side without any further galvanically separating elements.

In the circuitry 682 according to FIG. 6b, however, typically, the voltage source 610, the switch unit 615, the input and output of the piezo transformer 630 and the load 640 are related to the first reference potential GND1 or are connected to the first reference potential GND1 in an electrically conductive way, respectively.

In the following, precise realizations of the circuitry 682 according to FIG. 6b will be described with regard to FIGS.

7a and 7b. Since the circuitries according to FIGS. 7a and 7b are very similar to the circuitry 682 according to FIG. 6b, equal means or signals, respectively, are designated by the same reference numbers and are not discussed in detail again here. FIG. 7a shows a block diagram of an inventive circuitry according to an embodiment of the present invention. The circuitry of FIG. 7a is designated by 700 in its entirety. A first terminal of a voltage source 610, which provides an input voltage $U_{in}$, is coupled to a first terminal of a switch unit 650, and a second terminal of the voltage source 610 is coupled to a second terminal of the switch unit 650 (via a shunt resistor 672). A first output terminal 712 of the switch unit 650 is coupled to a first input terminal of a piezo transformer 630, which is represented by an equivalent circuit diagram according to FIG. 4. The second terminal of the voltage source 610 is further coupled to a second input terminal of the piezo transformer 630. A first output terminal of the piezo transformer 630 is further coupled to a first terminal 714 of a load 740, and a second output terminal of the piezo transformer 630 is coupled to a second terminal 716 of the load 740 via a shunt resistor 684. Further, the second input terminal of the piezo transformer 630 and the second output terminal of the piezo transformer 630 are connected to each other in a conductive way.

The switch unit 650 comprises two switches, wherein a first switch 670 is connected between the second terminal of the switch unit 650 and the output terminal 712 of the switch unit 650. A second switch 720 is connected between the first terminal of the switch unit 650 and the output terminal 712 of the switch unit 650. Thereby, the first switch 670 is designated by S1, and the second switch 720 is also designated by S2. A driver 730 is further coupled to control terminals of the switches 670, 720 and designed to control the switches 670, 720 in dependence on a control signal 686. The driver 730 is, for example, designed to control the two switches 670, 720 in phase opposition, so that, for example, the first switch 670 is closed when the second switch 720 is opened and vice versa. Preferably, generally, the driver 730 is designed to ensure that the two switches 670, 720 are not turned on simultaneously. In that case, a regulation means 690 receives the switch current description signal 676, which describes the switch current $I_S$ through the first switch 670, and which is derived from the switch current $I_S$ through the shunt resistor 672. Further, the regulation means 690 receives the output current description signal 688, which describes the output current $I_0$ flowing through the load 640, and which is derived from the output current $I_0$ through the shunt resistor 684. Further, based on the switch current description signal 676 and the output current description signal 688, the regulation means provides the control signal 686 for the switch unit 650. Thereby, the mode of operation of the regulation means 690 corresponds substantially to the mode of operation as described above with regard to the circuitry 682 according to FIG. 6b.

Figure 7A:
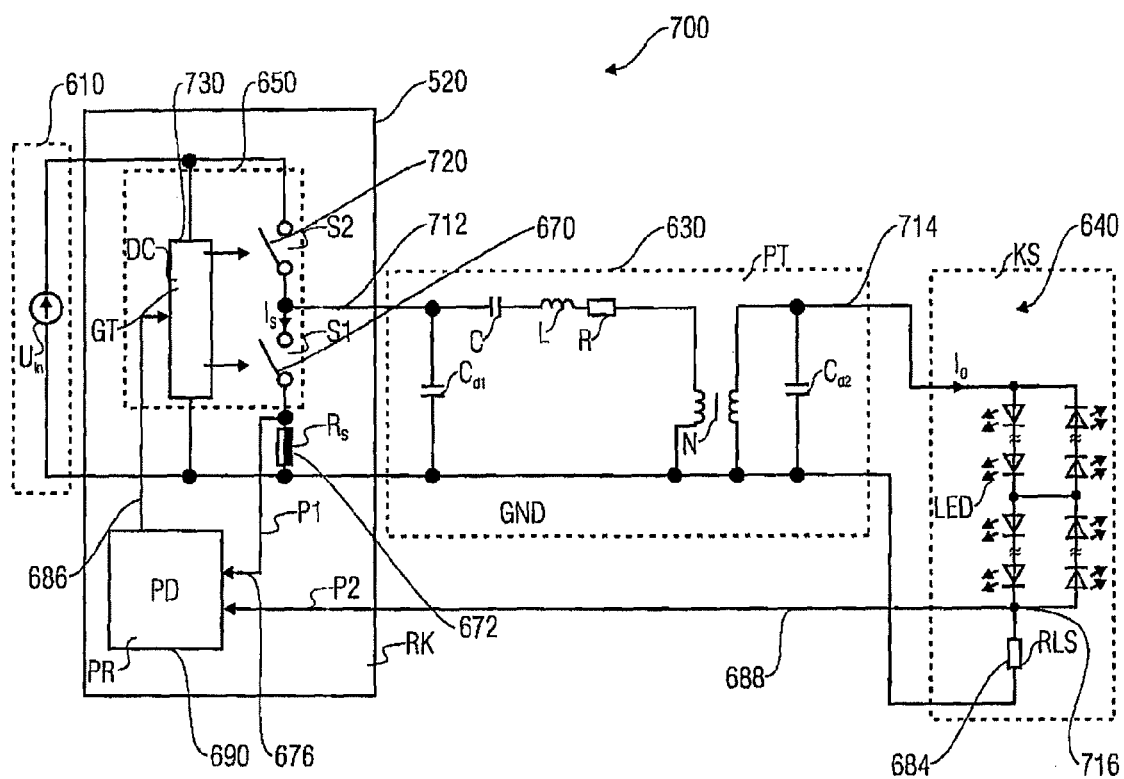
FIG. 7a is a block diagram of an inventive circuitry according to a sixth embodiment of the present invention.
Figure 7B:
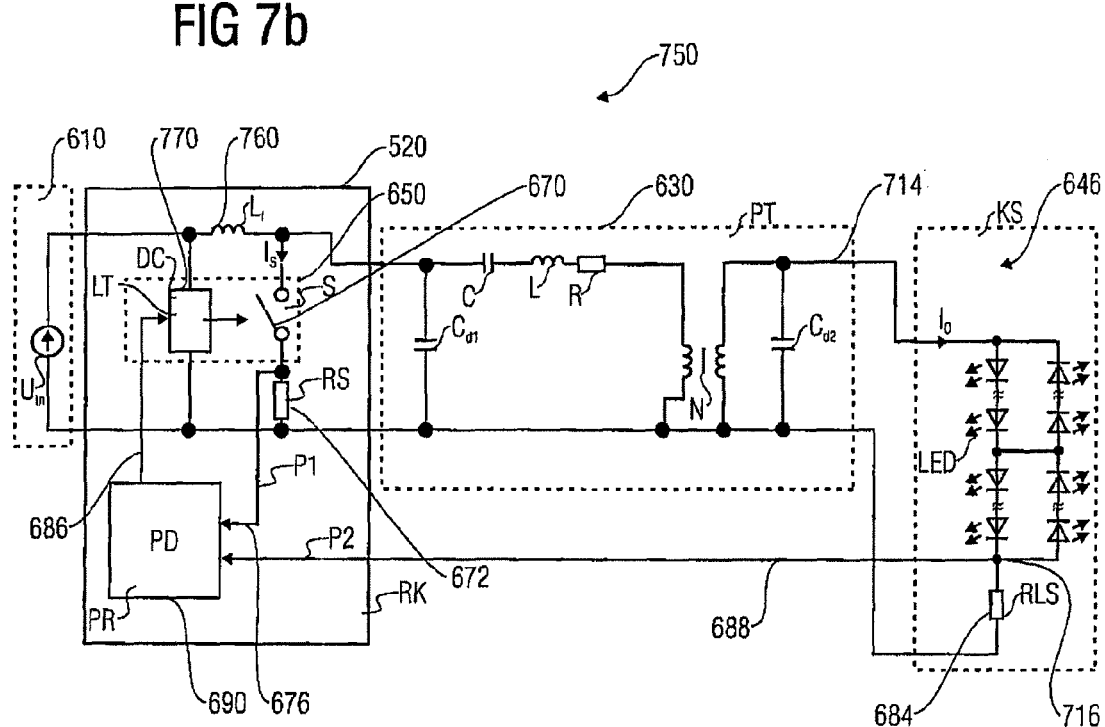
FIG. 7b is a block diagram of an inventive circuitry according to a seventh embodiment of the present invention.

FIG. 7b shows a block diagram of an inventive circuitry according to a further embodiment of the present invention. The circuitry according to FIG. 7b is designated by 750 in its entirety. Since the circuitry 750 is very similar to the circuitry 700, similar features or signals, respectively, are designated by the same reference numbers in the circuitries 700 and 750.

The circuitry 750 differs from the circuitry 700 substantially in the configuration of an input network as well as a switch unit 650, wherein the input network and the switch unit are connected between the voltage source 610 and the input of the piezo transformer 630, to generate the input side excitation of the piezo transformer 630 in the form of an alternating current signal. In the circuitry 750, the first terminal of the voltage source 610 is coupled to a first terminal of the switch unit 650 via an inductance 760. Thereby, a first terminal of the inductance 760 is coupled to the first terminal of the voltage source 610, and a second terminal of the inductance 760 is coupled to the first terminal of the switch unit 650. The second terminal of the inductance 760 is further coupled to the first input terminal of the piezo transformer 630. The second terminal of the voltage source 610 is further coupled to a second terminal of switch unit 650 via the shunt resistor 672. Further, the second terminal of the voltage source 610 is coupled to the second input terminal of the piezo transformer 630. Further, a switch 670 is connected between the first terminal and the second terminal of the switch unit 650, which is also designated by S. Further, a control input of the switch 670 is coupled to the output of a driver 770, wherein the driver 770 receives the control signal 686 from regulation means 690. Thus, the sense resistor 672 converts the switch current $I_S$ flowing through the switch 670 into a voltage, which forms the switch current description signal 676, and which is supplied to the regulation means 690.

In the circuitry 750, the regulation means 690 fulfills substantially the same function as in the circuitries 682, 700, so that a repeated description is omitted. However, it should be noted that phase ratios in the circuitries 700, 750 might be different, so that, for example, phase delays in the regulation means 690 are adapted to details of the circuitries 700, 750.

In summary, it can be said that FIG. 7a shows a preferred embodiment of the present invention. According to an aspect of the present invention, the input voltage $U_{in}$ can be detected by a driver circuit DC within an integrated control part RK (also designated by converter means in its entirety), and can be used for controlling or turning off during overvoltage or undervoltage. A push-pull control of the two switches 670, 720 (S1, S2) is performed via a push-pull driver GT, which can, for example, be part of the driver 730. The currents $I_S$ in the first switch or low side switch 670 (S1) and $I_0$ in a load circuit (or through the load 640, respectively) can be evaluated via shunt resistors or sense resistors, respectively, 672, 684 ($R_S$, $R_{LS}$), and can be used for turning off the switches 670, 720 (S1, S2) or for regulating a constant phase position (PD) between these two currents (phases P1 and P2), respectively. A phase regulator (PR) can be used, which can be part of the regulation means 690, or which can form the regulation means 690. Further, a quantity of the output current $I_0$ can be detected via the sense resistor or shunt resistor 684 ($R_{LS}$) and regulated to an exact current value.

FIG. 7b shows an equivalent configuration of the circuit according to FIG. 4a. In other words, FIG. 7b shows a circuitry 750 equivalent to the circuitry 700 according to FIG. 7a. The circuitry 750 according to FIG. 7b differs from the circuitry 700 according to FIG. 7a in that a class E circuit with input choke coil 760 instead of high side switch 720 is used instead of a half bridge circuit (consisting of the two switches 670, 720 or S1, S2).

In other words, FIG. 7a shows an inductance-free half bridge converter as a preferred embodiment of the present invention. By evaluating the current or switch current $I_S$, respectively, in the first switch 60 ($S_1$), which is also designated as low side switch, through a shunt resistor or sense resistor 672 ($R_S$), respectively, and by a comparison with the output current $I_0$ across a further sense resistor or shunt resistor 684 ($R_{LS}$) (or a sense output US of the piezo transformer), a constant output current $I_0$ can be adjusted. The same is shown in a further embodiment for class E in FIG. 7b with regard to the evaluation of the switch current in switch S. In other words, the switch current $I_S$ through the first switch 670, which is designated as low side switch (switch coupled to a low potential or reference potential) is used when generating the control signal 686. A phase position of the switch current $I_S$ is preferably determined by a phase detector and compared to a phase position of the output current $I_O$. In other words, a phase difference is formed between the phase positions of the switch current $I_S$ and the output current $I_O$. The regulation means 690 is preferably formed to compare the phase difference with a phase difference reference value and to generate the control signal 686 in order to adjust the phase difference to the phase difference reference value.

Further, the regulation means 690 is formed to incorporate the quantity (amplitude, average value or effective value) of the output current $I_O$ into the regulation, and to thus adjust the quantity of the output current $I_O$, for example, to an output current reference value, to adjust, for example, a constant output current $I_O$.

The same mode of operation as in the circuitry 700 is shown in the further embodiment of the circuitry 750 for the class E in FIG. 7*b* with regard to the evaluation of the switch current $I_S$ in the switch 670 (S). The circuitry 750 according to FIG. 7*b* has the disadvantage that an inductance (the inductance 760) is required apart from the piezo transformer 630, but the circuitry 750 saves one switch (the second switch 720 or S2, respectively) (compared to the circuitry 700). Further, compared to a boost converter, the circuitry 750 according to FIG. 7*b* has the advantage of short-circuit strength and saving of smoothing capacitors on the output side and fast diodes with approximately the same input current smoothing.

The half bridge circuit according to FIG. 7*a* has a limited interference spectrum to the input voltage, despite a missing choke coil, since it generates substantially a half wave of the base harmonic as input current curve. By commutation of the current across the input capacitor of the piezo transformer 630, zero voltage switching (ZVS) is obtained, which, on the one hand, heavily reduces turn-on losses, and, on the other hand, still leads to an improved electromagnetic compatibility (EMV) by a smaller high-frequency interference spectrum, compared to hard-switching converters, such as the Buck converter or the flyback converter with switches on the input side.

In the following, a concept of regulation will be described with regard to FIGS. 5*a*, 5*b*, 6*c*, 7*c* and 7*d* as well as FIGS. 12, 13*a*, 13*b*, 13*c*, 13*d*, 13*e*, 13*f*, 14 and 15, which can be used in connection with serial coupling-out of an auxiliary signal from the piezo transformer.

In the following, first, the basic mode of operation of the present invention will be described by using serial coupling-out of the auxiliary voltage with regard to FIG. 12. Then, with reference to FIG. 13A, an equivalent circuit diagram of the piezo transformer used in connection with the mentioned embodiment will be described, before further details of the present invention will be described with reference to FIGS. 13B to 13F. Subsequently, further embodiments of the present invention will be discussed with regard to FIGS. 14 and 15.

Figure 12:
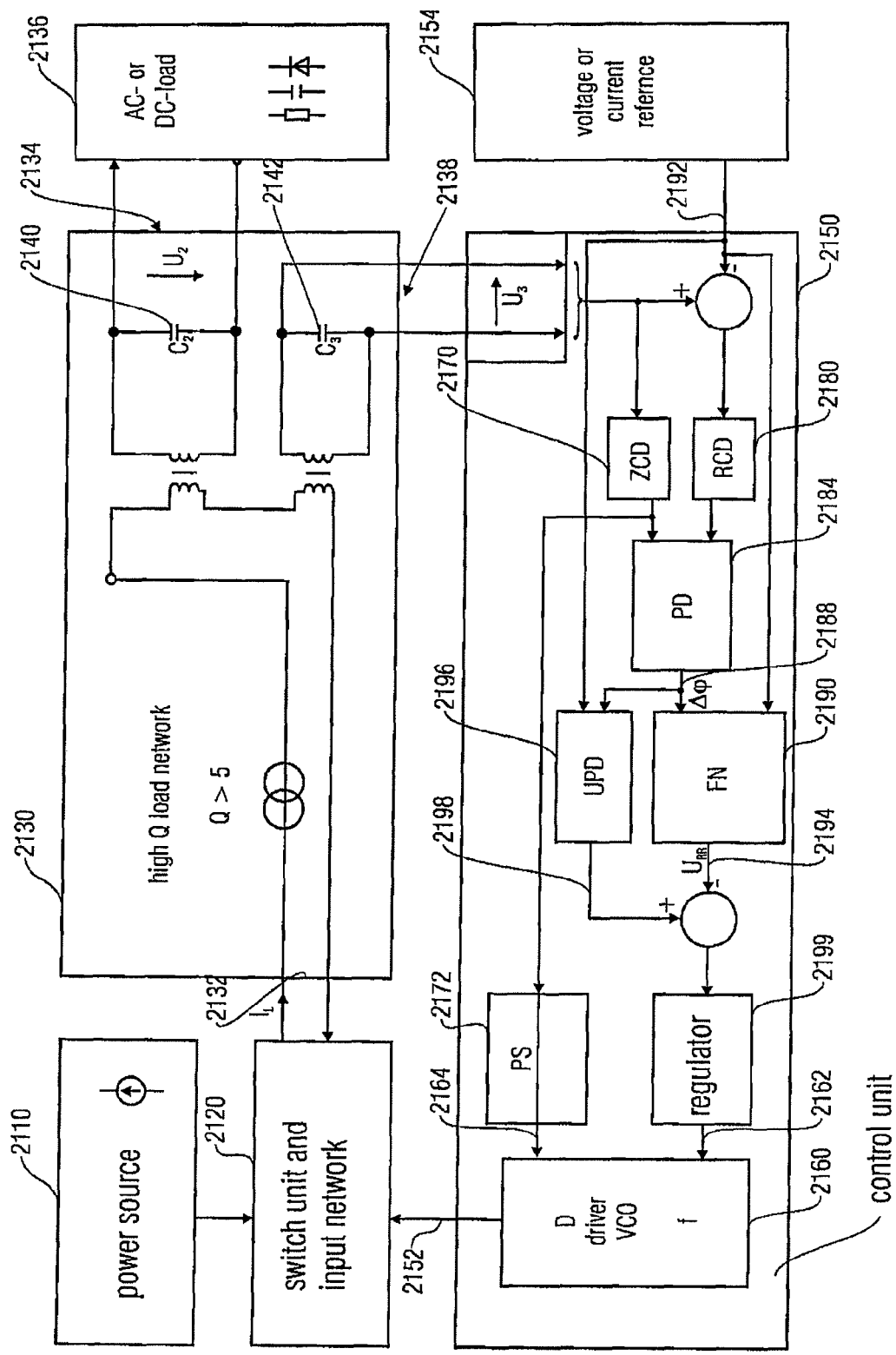
FIG. 12 is a block diagram of an inventive circuitry according to a tenth embodiment of the present invention.

FIG. 12 shows a block diagram of an inventive resonance converter by using serial coupling-out of an auxiliary signal. The circuitry according to FIG. 12 is designated by 2100 in its entirety. A power source (or voltage source) 2110 provides energy or power to an input network 2120. The input network 2120 comprises a switch unit as well as possibly additional reactive elements and serves, overall, for generating an excitation (alternating current signal) on the input side of a resonant transformer arrangement 2130. The resonant transformer arrangement 2130 (or a piezo transformer, respectively) can, for example, be seen as a load network with high Q, with Q>5. The switch unit 2120 provides, for example, a load alternating current $I_L$ to the load network of high Q, or, excites at least such a load alternating current $I_L$ in a resonant circuit of the resonant transformer arrangement, respectively. For that purpose, an input 2132 of the resonant transformer arrangement 2130 is coupled to an output of the input network or an output of the switch unit, respectively. Further, the resonant transformer arrangement comprises an output 2134 for providing an output voltage (typically designated by $U_2$) or an output current $I_0$ for a load network or a load 2136, respectively. The load network 2136 can, for example, be an alternating current load or a direct current load, as has already been described above.

Further, the resonant transformer arrangement 2130 comprises an auxiliary output 2138 for providing an auxiliary voltage or auxiliary signal, respectively, which has a substantially fixed phase position to a load alternating current $I_L$ through a resonance circuit of the resonant transformer arrangement. The output 2134 of the resonant transformer arrangement 2130 is supplied, for example, via a first output tap or output tapping, respectively, of the transformer arrangement, while, on the other hand, the auxiliary output 2138 is supplied via a second tap of the resonant transformer arrangement 2130. The first tap of the resonant transformer arrangement is preferably, but not necessarily, galvanically separated from the second tap of the resonant transformer arrangement. Further, preferably, but not necessarily, a second capacitance 2140 (C2) is connected in parallel to the output 2134, while a third capacitance 2143 (C3) is connected in parallel to the auxiliary output 2138 of the resonant transformer arrangement. The capacitances 2140, 2142 are, preferably, designed to adjust or influence, respectively, a phase relation between the load current $I_L$, the output voltage $U_2$ and the auxiliary voltage $U_3$ at the auxiliary output 2138.

The circuitry 2100 further comprises a control circuit or control unit 2150, respectively, which receives the auxiliary signal or the auxiliary output $U_3$, respectively, from the auxiliary output 2134 of the resonant transformer arrangement 2130, and generates a control signal 2152 for the switch unit in the input network based thereon. The control circuit or control unit, respectively, generates a voltage reference and/or a current reference itself or receives the voltage reference and/or current reference from a reference provision means 2154.

Further, the control unit 2150 comprises a driver 2160 for generating the control signal 2152 for turning on and/or turning off the switches of the switch unit in the input network 2120. In an extended sense, the driver comprises a variable oscillator, which means, for example, a voltage controlled oscillator VCO or a digital circuitry for generating a signal with a predetermined frequency or period duration. Thereby, the driver 2160 is designed to receive frequency information f, which is used for adjusting a period duration of the control signal 2152. Further, the driver 2160 is designed to allow adjustment of a duty cycle. For that purpose, the driver receives a turn-on signal 2164, which indicates that at least one switch in the switch unit of the input network 2120 is to be turned on. Turn-off times, when the switch in the switch unit in the input network 2120 is to be turned off, are determined by the information 2162 about the frequency.

In the following, it will be described how information 2162 about the frequency as well as the turn-on signal 2164 is generated.

For that purposes, on the one hand, the auxiliary voltage $U_3$ is supplied to a zero crossing detector 2170, which detects the zero crossing of the auxiliary voltage $U_3$. The zero crossing detector 2170 is also designated by ZCD. An output of the zero crossing detector 2170, which describes zero crossings of the auxiliary voltage $U_3$, is further supplied to a phase shifter 2712 (PS). The delay means 2170 is designed to delay the output signal of the zero crossing detector 2710 with regard to a phase by about 60 to 90° (in relation to a period duration of an operating frequency of the driver, by which the driver switches the switch in the switch unit of the input network 2120 on and off). The output signal of the zero crossing detector 2710 delayed by the delay means 2172 serves thus as the turn-on signal 2164 for the driver, which directs the driver to turn on the switch in the switch unit.

Further, the control unit 2150 comprises a reference value comparator 2180, which compares the auxiliary voltage $U_3$ to a predetermined (fixed or variable) reference value and provides an output signal, which indicates when the auxiliary voltage $U_3$ crosses the reference value. The reference value comparator 2180 is also referred to as reference crossing detector (RCD).

A phase detector 2184 receives both the output signal of the zero crossing detector 2170 and of the reference value detector 2180 and determines a phase difference 2188 or $\Delta\phi$ between the two signals. Thus, in connection with the reference value, the phase difference 2188 is a measure for an amplitude of the auxiliary voltage $U_3$.

Thus, a functional network 2190 receives the phase difference 2188 from the phase detector 2184, as well as the reference value 2192 from the reference value provision means 2154. The functional network 2190 calculates information 2194 about an amplitude of the auxiliary voltage $U_3$ from the phase difference 2188 and the reference value 2192. The information 2194 about the amplitude is also designated by $U_{RR}$. Further, an amplitude target value provision means 2196 receives the reference value 2192 as well as additionally the phase difference 2188 and generates an amplitude reference value 2198 based thereon. A difference determiner (difference calculator) receives the amplitude reference value 2198 as well as the amplitude information 2194, forms the difference there from and provides the result to a regulator 2199. Thus, the regulator 2199 generates frequency information 2162 based on the difference of the amplitude reference value 2198 and the amplitude 2194, to adjust the operating frequency of the driver or the oscillator or the timer included in the driver, respectively. Preferably, the regulator 2199 is designed to adjust the difference between the amplitude reference value 2198 and the amplitude information 2194 representing a regulation deviation (control deviation) to zero.

The regulator 2199 can, for example, be a proportional regulator or proportional integral regulator, but other possible regulator embodiments, such as a pure integral regulator, are also possible.

Thus, merely based on the auxiliary voltage $U_3$, the circuitry 2100 allows adjustment of the turn-on time of the switch or the switches in the switch unit 2120, as well as amplitude regulation. The shown amplitude regulation has the significant advantage that the control circuit 2150 has merely the zero crossing detector 2170 and the reference value comparator 2180 as analog components. All other signals are defined by phases and not amplitudes, and can thus be digitalized, for example, by time measurement. In other words, analog further processing becomes unnecessary due to the conversion of the auxiliary voltage $U_3$ into digital signals with the help of the zero crossing detector 2170 and the reference value comparator 2180, at the earliest possible time. Based on the fact that the auxiliary output voltage $U_3$ is mainly sinusoidal, further, the amplitude of the auxiliary voltage $U_3$ can be inferred from the switching times of the zero crossing detector 2170 and the reference value comparator 2180, which allows a very effective regulation of the output voltage $U_2$ of the resonant transformer arrangement 2130.

Further, it should be noted that optionally the generation of the variable amplitude reference value 2198 can be omitted, and that instead a fixed amplitude reference value depending on the reference value 2192 can be used. In that case, means 2196 is omitted.

Further, the amplitude reference value generator 2196 can adapt or correct, respectively, the amplitude reference value 2198 in dependence on an input voltage provided by the power source 2110. The amplitude $U_3$, which means the amplitude information 2194 can optionally be used in forming the amplitude reference value 2198.

Figure 1A:
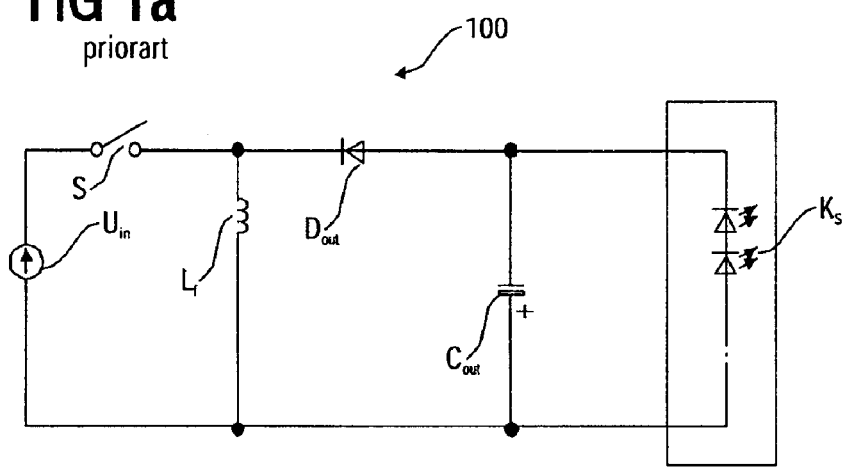
FIG. 1a is a circuit diagram of a flyback converter according to the prior art.
Figure 1B:
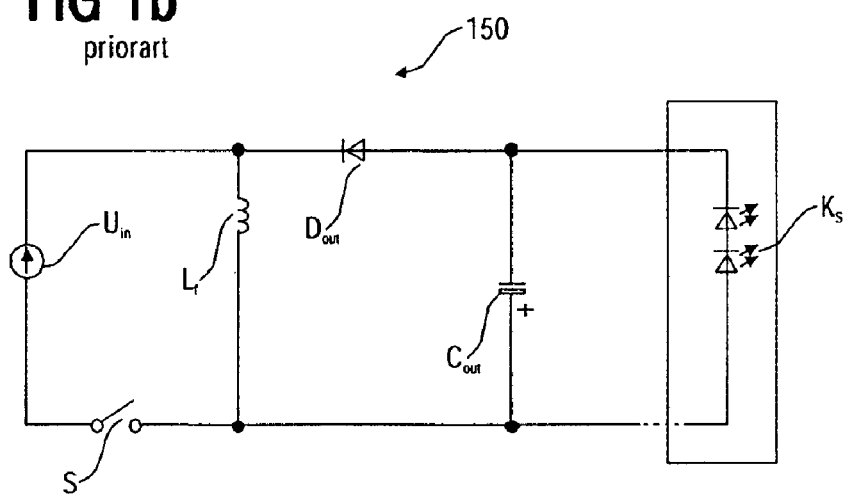
FIG. 1b is a circuit diagram of a further flyback converter according to the prior art.
Figure 2:
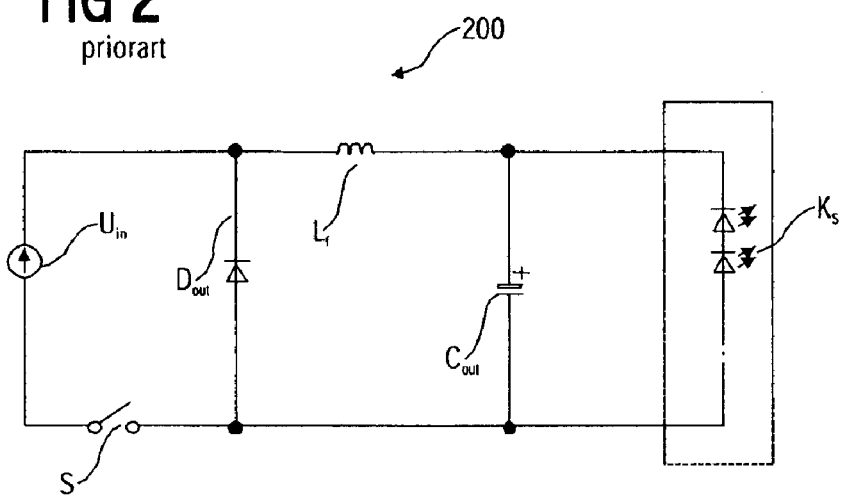
FIG. 2 is a circuit diagram of a Buck converter according to the prior art.

For further understanding, an equivalent circuit diagram of a piezo transformer for usage in combination with a circuitry according to FIG. 2.1 will be described with regard to FIG. 13A.

In other words, FIG. 13A shows a typical electric equivalent circuit diagram of a piezo transformer with the voltage transformation ratios $k_0$ and $k_r$.

The piezo transformer according to FIG. 13A is designated by 1300 in its entirety. The piezo transformer 1300 has, for example, an input 1302 with a first input terminal 1302a (A) and a second input terminal 1302b (B). The equivalent circuit diagram 1300 of the piezo transformer has further a capacitance 1302c on the input side, which is connected in parallel to the input 1302. Further, the equivalent circuit diagram 1300 comprises a resonant circuit consisting of a series connection capacitance 1304a, inductance 1304b and resistor 1304c, through which a load alternating current $I_L$ flows. Further, the equivalent circuit diagram 1300 comprises a first transformer 1306a, through which the load alternating current $I_L$ flows from the input side, and a second transformer 1306b, through which load alternating current $I_L$ flows also from the input side. In other words, the two transformers 1306a, 1306b are connected in series on the input side, which is characteristic for the described configuration of a piezo transformer.

An output of the first transformer 1306a provides an output voltage $U_2$ at the output 1308a of the piezo transformer. A second capacitance 1308b ($C_2$) is connected in parallel to the output of the first transformer 1306a, which has a transformation ratio of $k_0$. Further, it should be noted that the output 1308 of the piezo transformer 1300 comprises a first terminal 1308c (C) and a second terminal 1308d (D).

Further, an output of the second transformer 1306b provides the auxiliary voltage $U_3$ at an auxiliary output 1309a. The second transformer 1306b has a voltage transformation ratio $k_r$. A capacitance 1309b ($C_3$) is connected in parallel to the output of the second transformer 1306b. Further, the auxiliary output 1309a comprises a first terminal 1309e (E) as well as a second terminal 1309f (F), between which the auxiliary voltage $U_3$ is provided.

In other words, FIG. 13A shows a typical electrical equivalent circuit diagram of a piezo transformer PT with voltage transformation ratio $k_0$ and $k_r$.

Thereby, the voltage or auxiliary voltage, respectively, $U_3$ is generated at 1309b ($C_3$), wherein the voltage $U_3$ is always proportional to the load current $I_L$. Further, from the context described with regard to the equivalent circuit diagram 1300, it results that the output voltage $U_0$, for example a voltage at an output of a rectifier network or at a network of light-emitting diodes or chains of light-emitting diodes connected in an anti-parallel way, which is coupled to the output 1308 on the input side, can only be detected approximately proportional to a voltage detection, when an output load R, which is coupled to the output 1308a is small enough compared to the impedance $i/\omega C_2$ (see output load R in FIG. 13B). In other words, if a sufficiently high-impedance ohmic load is connected to the output 1308a, and further, a high-impedance ohmic load is connected to the output 1309a, it applies that the auxiliary voltage $U_3$ is approximately proportional to the output voltage $U_2$. If, however, the resistor of the resistive load connected to the output 1308a is not significantly higher than the impedance of the capacitance 1308b, this proportional context is disturbed.

In order to obtain, for example, an error of less than 1% of the output voltage (which means to obtain it that thereby the proportional relation between the output voltage $U_2$ and the auxiliary voltage $U_3$ is valid with sufficient accuracy), the equivalent resistor of an imaginary alternating current load (at the output 1308) must have more than seven times the value of the impedance of the capacitance 1308b ($C_2$). Thus, the regulating range of the piezo transformer, which is designed for an ohmic nominal load R of about the same quantity as the output impedance $1/\omega C_2$, is not adjustable to a constant output voltage up to the full load. However, a piezo transformer can be designed such that it is operated only in this range of an increased ohmic load, and thus already accomplish a regulation according to FIG. 13E, as will be described below.

According to one aspect of the present invention, the consideration is of relevance that the resonance converter should be implemented such that an impedance of a load connected to the output 1308 of the piezo transformer 1300 is at least as high as an impedance of the capacitance 1308b, preferably at least twice as high as the impedance of the capacitance 1308b. Further, it is preferred to ensure that the impedance of the load is at least five times as high as the impedance of the capacitance 1408b. The described dimensioning is no compulsory feature, but only serves to improve the accuracy.

FIG. 13B shows a block diagram of an inventive resonance converter with a regulation based on the auxiliary voltage $U_3$ coupled-out in a serial way. The circuitry according to FIG. 13B is designated by 1310 in its entirety. The circuitry 1310 is fed from a voltage source 1311, which provides a regulated or unregulated (possibly pulsed) direct voltage. The voltage source 1311 provides energy to an input network 1312, which also comprises a switch unit with at least one switch. The input network can be a network as has already been described above, which means, for example, a half bridge circuit or a class E circuit. Further, different options of the input network are designated by dotted lines. In other words, the input network 1312 is coupled to the voltage source 1311 on the input side. Further, the input network 1312 is coupled to an input of a resonant transformer arrangement 1313 on the output side. While a first output terminal of the input network 1312 is directly coupled to a first input terminal of the resonant transformer arrangement 1313, a second output terminal of the input network 1312 is coupled to a second input terminal of the resonant transformer arrangement 1313 via a pump circuit 1314. The pump circuit serves to provide a supply voltage $V_{CC}$ for the control circuit and is considered to be optional.

Further, preferably, the resonant transformer arrangement 1313 comprises a piezo transformer, as described with regard to FIG. 13A. The output of the resonant transformer arrangement 1313 is further alternatively (or simultaneously) coupled to an alternating current load (for example an ohmic resistor R) or a direct current load (for example a resistive load supplied via a rectifier arrangement), as indicated in FIG. 13B.

With regard to the direct current load or the alternating current load, the above explanations apply.

Further, the circuitry 1310 comprises a control circuit 1315, which receives the auxiliary voltage $U_3$ and generates a control signal 1316 for at least one of the switches in the input network 1312 based thereon. Further, optionally, the control circuit 1315 can obtain information 1317a about the input voltage $U_{in}$ of the voltage source 1311. Further, optionally, the control circuit 1315 can obtain information 1317b about a quantity of a current flow through at least one switch of the input network 1312 (for example in the form of a voltage tapped across a shunt resistor).

Further, the control circuit 1315 comprises a driver 1318, which has a similar function as the driver 2160 according to FIG. 12. Thus, the driver 1318 receives frequency information 1319a, which corresponds to frequency information 2162, as well as a turn-on signal 1319b, which corresponds to the turn-on signal 2164. Additionally, the driver 1318 can optionally receive a control signal 1319c from a protection circuit 1319d, wherein the driver 1318 can be deactivated by the protection circuit 1319d via the control signal 1319c, if the protection circuit 1319d determines an overvoltage or an undervoltage, respectively, for example due to the signal 1317a, or if the protection circuit 1319d determines, for example, another error condition like an overcurrent through the switch, for example via the signal 1317b.

In the following, the further layout of the control circuit 1315 will be described. A first reference value comparator 1320a compares the auxiliary voltage $U_3$ with a first predetermined reference value, which is equal to zero in the shown example. The reference value comparator 1320a is also designated by KLZ. Thus, a signal 1320b indicating whether the auxiliary voltage $U_3$ is higher or smaller than zero is applied to the output of the reference value comparator 1320a. Further, the control circuit 1315 comprises a second reference value comparator 1321a, which compares the auxiliary signal $U_3$ with a second reference value, which defines $U_{RO} < U_R$ by a second reference voltage. The reference value comparator 1321a is also designated by KR and provides an output signal 1321b, which carries information whether the auxiliary voltage $U_3$ is higher or smaller than the second reference voltage $U_{RO}$. A phase shifter 1322 receives the signal 1320b from the first reference value comparator 1320a and delays the signal 1320b by a phase shift in a range between 60° and 90° in relation to the operating frequency of the driver. In other words, the phase shifter 1322 effects a phase delay between 0° and 90° (or between 0 and π/2 rad, respectively), and generates the turn-on signal 1319b by the stated delay of the signal 1320b. In other words, the turn-on signal 1319b is active with a phase delay in a range between preferably 60° and 90° after a zero crossing of the auxiliary voltage $U_3$.

Further, a phase detector 1323 receives the output signal 1320b of the reference value comparator 1320a, as well as the output signal 1321b of the reference value comparator 1321a and forms a phase difference signal 1324a describing a phase shift between the signals 1320b and 1321b, based on the signal 1320b. Here, it should be noted, that, for example, φ1 designates a phase position of a rising or falling edge of the signal 1320b, and that φ2 designates a phase position of a rising or falling edge of the signal 1321b, wherein an arbitrary signal of the operating frequency f can serve as reference. A functional network 1325 further receives the phase difference signal 1324a as well as either the second reference voltage $U_{RO}$ or information about the second reference voltage $U_{RO}$, and calculates an amplitude 1326 of the auxiliary signal $U_3$ from the mentioned input quantities, wherein the amplitude 1326 is also designated by $U_{RR}$. For the calculation, the following applies:

$$U_{RR} = \frac{U_{R0}}{\sin\Delta\varphi}$$

with $\Delta\phi=\phi_1-\phi_2$.

In other words, the functional network 1325 calculates the amplitude 1326 from the knowledge of the second reference value $U_{R0}$ as well as the phase shift $\Delta f$ between a first time, when the auxiliary voltage $U_3$ shows a zero crossing, and a second time when the auxiliary voltage $U_3$ has the second reference value $U_{R0}$ or crosses the same, respectively.

Further, a third reference value comparator 1327 compares a third reference voltage $U_R$ with the amplitude information 1326 and provides a direction signal 1328, which indicates whether the amplitude value 1326 is higher or smaller than the third reference voltage $U_R$. A regulating amplification adjustment means 1328 receives the phase difference signal 1324a and determines further a regulating amplification $k_{RU}$ as a function of the phase difference $\Delta\phi$, which is provided by the phase detector 1323. The regulating amplification determination means 1328 calculates, for example, the regulation amplification $k_{RU}$ according to the linear relation $$k_{RU}=k_{R0}-k_\phi\Delta\phi.$$

$k_{RU}$ and $k_o$ are thereby, for example, constant values, but can also be selected in dependence on the environmental conditions (for example the input voltage $U_{in}$).

A regulator 1330 (RU) receives both the direction information 1328 and the regulation amplification $k_{RU}$ and generates frequency information 1319a for the driver 1318. The regulator 1330 increases or decreases the frequency information 1319a in dependence on the direction information 1328. If, for example, the amplitude information 1326 is higher than the third reference voltage $U_R$, the regulator 1330 will change the frequency information 1319a such that the operating frequency of the driver 1318 changes away from a resonance frequency of the resonant transformer arrangement 1313. Otherwise, the regulator 1330 changes, for example, the frequency information 1319a such that the operating frequency of the driver 1318 moves towards the resonance frequency of the resonant transformer arrangement 1313. The regulation amplification $k_{RU}$ indicates by how much the regulator 1313 changes the frequency information 1319a in one step (or per time unit, respectively). Such a regulation is useful since the phase difference $\Delta\phi$ carries information about the load, wherein with high load (low resistor of the load at the output of the resonant transformer arrangement 1313), a faster regulation is desirable than with a small load, to avoid instability and to obtain a sufficiently fast regulation at the same time.

Further, it has to be noted that ideally the following relation applies between the auxiliary voltage $U_3$ and the load alternating current $I_L$:

$$U_3 = \frac{I_L}{k_R}\frac{1}{j\omega C_3}$$

Thus, ideally, it applies that the auxiliary voltage $U_3$ has a phase shift of exactly 90° with regard to the load alternating current $I_L$. This fact can be used for determining the turn-on time by the turn-on signal 1319b in the shown manner.

Further, it has been noted that preferably the following relation applies for the third reference voltage $U_R$:

$$U_R = (U_0 + 2U_F)\cdot\frac{C_2\cdot k_0}{C_3\cdot k_r}$$

Thereby, $U_0$ is the desired output voltage at a direct current load (after the rectifier), $U_F$ is a forward voltage of a rectifier diode, $C_2$ and $C_3$ describe the second capacitance and the third capacitance of the resonant transformer arrangement 1313, and $k_0$ and $k_r$ describe the voltage transformation ratios of the two transformers of the resonant transformer arrangement 1313. In the above equation, typically, all quantities on the right side are either constants or known or given, respectively, so that the third reference voltage $U_R$ can be easily calculated.

Figure 13:
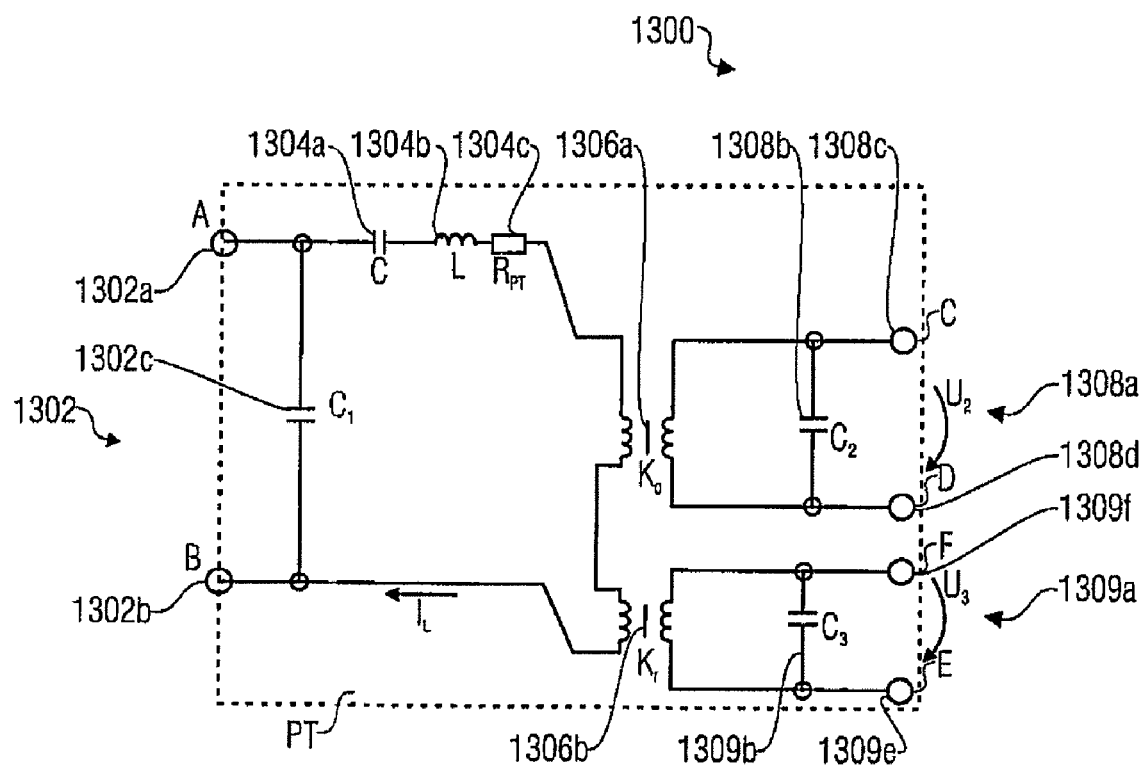
FIG. 13a is an equivalent circuit diagram of a piezo transformer with an auxiliary output.
FIG. 13b is a block diagram of an inventive circuitry according to an eleventh embodiment of the present invention.
FIG. 13c is a graphical illustration of temporal current and voltage curves in a circuitry according to FIG. 13b.
FIG. 13d is a further graphical illustration of temporal current and voltage curves in a circuitry according to FIG. 13b.
FIG. 13e is a graphical illustration of a connection between an output voltage $U_O$ and a reference voltage $U_R$ in a circuitry according to FIG. 13b.
FIG. 13f is a further graphical illustration of temporal current and voltage curves in a circuitry according to FIG. 13b.
Figure 13C:
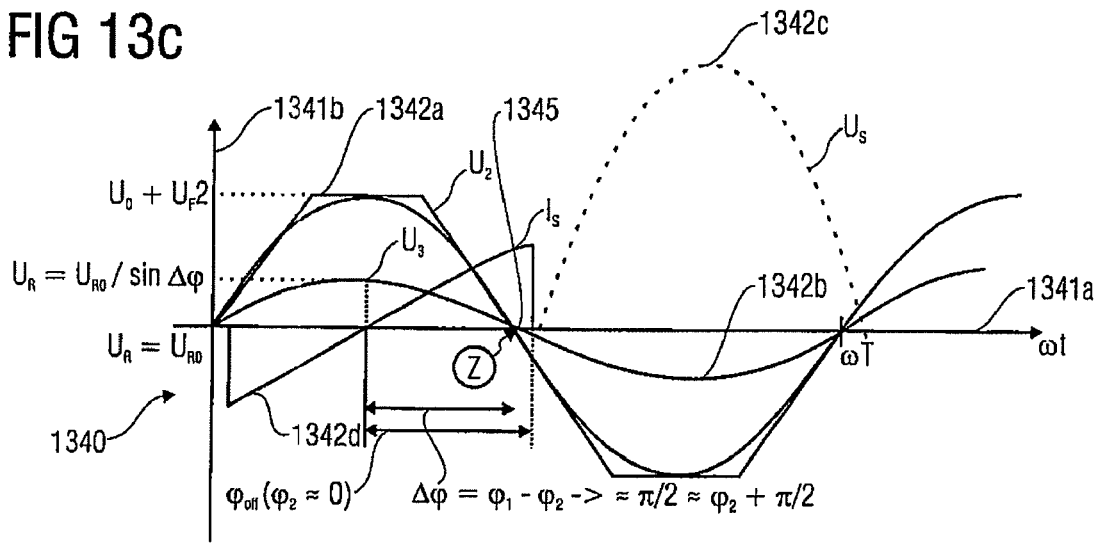

FIG. 13C shows a graphical illustration of a time curve of signals as they occur in the resonance converter according to FIG. 13B. The graphical illustration of FIG. 13C is designated by 1340 in its entirety. A time, normed with operating circle frequency, is plotted on an abscissa 1341a. An ordinate 1341b describes a quantity of the shown curve shapes.

A first curve shape 1342a describes the output voltage $U_2$ at the output of the resonant transformer arrangement, wherein it is assumed that a direct current load consisting of a rectifier arrangement (e.g. bridge rectifier), load capacitor and resistive load is connected to the output of the resonant transformer arrangement. In that case, it is assumed that the output voltage $U_0$ indicates a curve approximating a trapezoidal shape. A maximum value of the output voltage $U_2$ is approximately $U_{2,max}=U_0+2\cdot U_F$, wherein $U_0$ is the output voltage at the direct current load (which means at the resistive load after the rectifier circuit) and wherein $U_F$ describes a forward voltage of the diode used in the rectifier circuit.

A second curve shape 1342b describes the auxiliary voltage $U_3$ at the serially coupled-out voltage auxiliary output. The auxiliary voltage $U_3$ is approximately sinusoidal, since the load current $I_L$ through the resonant circuit of the resonant transformer arrangement is approximately sinusoidal due to the assumed high Q of the resonant transformer arrangement (while, however, harmonics causing a non-sinusoidal curve shape are highly damped.

A third curve shape 1342c describes a switch voltage $U_S$ across a switch of the switch unit. It has to be considered that the switch voltage $U_S$ assumes only very small or negligible values, as long as a reverse current flows through a freewheeling diode connected in parallel to the switch, or as long as a forward current flows through the switch.

Further, a fourth curve shape 1342d shows the switch current $I_S$ through the switch (including the reverse current through the reverse diode).

Further, the graphical illustration 1340 shows the third reference voltage $U_R$, which is in the shown case equal to the amplitude $U_{RR}$ of the auxiliary voltage $U_3$:

$$U_R = \frac{U_{R0}}{\sin\Delta\varphi}$$

In the shown configuration, further, at least approximately $U_R \approx U_{R0}$ applies, since approximately the following applies:

$$\Delta\phi=\phi_1-\phi_2\approx\pi/2\approx\phi_2+\pi/2.$$

It applies:

$$\phi_2\approx 0.$$

Figure 13D:
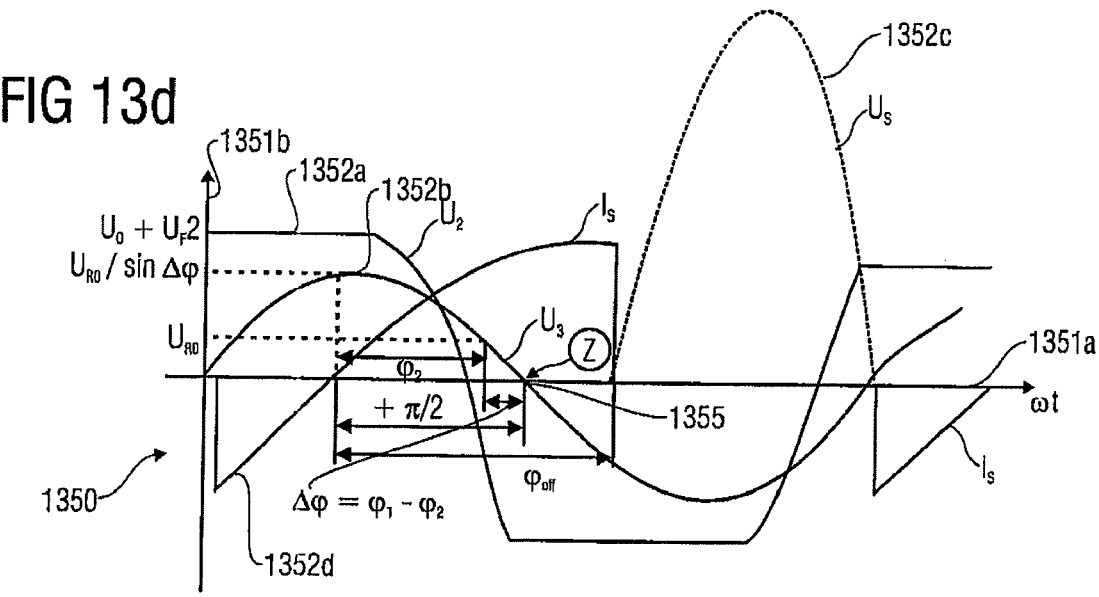

FIG. 13D shows, in a similar way to FIG. 13C, a graphical illustration of signals, which can occur in the resonant transformer arrangement 1310 according to FIG. 13B in a certain operating state. The graphical illustration of FIG. 13D is designated by 1315 in its entirety. Again, the time normed to the operating circle frequency ω is plotted on an abscissa 1351a. An ordinate 1351b describes the quantity of the plotted curve shapes.

A first curve shape 1352a describes the output voltage $U_2$ at the output of the resonant transformer arrangement. A second curve shape 1352b describes the auxiliary voltage $U_3$ at the serially coupled-out auxiliary output. Here, it should be noted, that in the graphical illustration 1350 a significant phase shift exists between the output voltage $U_2$ and the auxiliary voltage $U_3$, while the output voltage $U_2$ and the auxiliary voltage $U_3$ are almost in-phase in the graphical illustration 1340. In the curve shapes 1350, further, $U_{R0}<U_R$ applies.

Further, the graphical illustration shows a third curve shape 1352c, which describes the voltage $U_S$ across the switch of the switch unit. Further, a fourth curve shape 1345d describes the current $I_S$ through the switch of the switch unit.

Figure 13E:
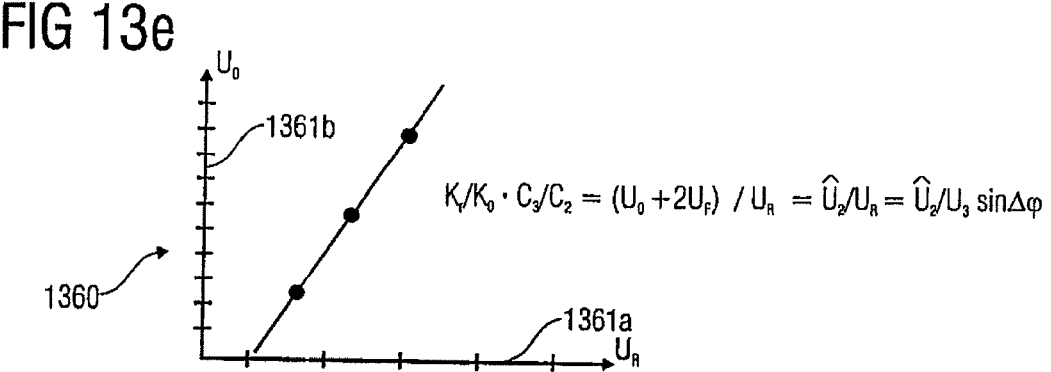

FIG. 13E shows further a graphical illustration of a relation between the third reference voltage $U_R$ and the output voltage $U_0$ at a direct current load. The following applies:

$$\frac{\hat{U}_2}{U_R} = \frac{U_0 + 2U_F}{U_R} = \frac{k_r}{k_0} \cdot \frac{C_3}{C_2} = \frac{\hat{U}_2}{\hat{U}_3 \sin\Delta\phi}$$

The graphical illustration 1360 of FIG. 13E illustrates this relation, wherein the third reference voltage $U_R$ is plotted on an abscissa 1361a, and wherein the voltage $U_0$ at the direct current load is plotted on an ordinate 1361b.

With regard to FIGS. 13B-13E, it will be described according to an aspect of the present invention, how the output voltage $U_0$ is regulated in the inventive resonance converter 1310 according to FIG. 13B. It should be noted that a piezo transformer can be designed such that it is operated only in the above stated range of an increased ohmic load, and that thus already a regulation according to FIG. 13E can be obtained. For example, it would be possible for a regulation to observe a maximum value of the sinusoidally coupled-out voltage or auxiliary voltage $U_3$, respectively, and to compare the same to a reference $U_R$.

Alternatively, a reference value $U_R$ can be used, which is smaller than the value of the output voltage to be regulated according to the equation relation according to FIG. 13E. In other words, if an output voltage $U_0$ is to be obtained at the direct current load, the amplitude of the auxiliary voltage $U_3$ has to be adjusted or regulated to the value adjusted or regulated to the value $U_R$. However, a value, which is smaller than $U_R$, can be selected for the first reference voltage $U_{R0}$. In that case, a function of the associated angle $\sin(\Delta\phi)$ has to be formed according to FIG. 13E and FIGS. 13C and 13D, which mathematically determines the maximum value and supplies the same to a comparator FN, as shown in FIG. 13B. This value is compared to the reference value $U_R$ according to FIG. 13B, and a corresponding frequency change is adjusted via the regulator 1313 (RU), to keep the deviation between the voltage or reference voltage $U_R$, respectively, and the voltage $U_{RR}$ or the amplitude of the auxiliary voltage $U_3$ calculated in the functional network 1325, respectively, always at zero or at least to minimize the same, respectively.

This can be performed by the reference value comparator 1327, but alternatively via a comparator, which supplies the deviation (between the reference value $U_R$ and the calculated amplitude $U_{RR}$) more accurately quantized to the regulator 1330, to thereby increase the regulating speed.

Further, the first reference value comparator 1320a (KLZ) detects a zero crossing of the voltage signal or the auxiliary voltage $U_3$, respectively, wherein the zero crossing is designated by 1345 (Z) or 1355 (Z) in FIGS. 13C and 13D. The second reference value comparator 1321a (KR) detects a moment when the voltage or the auxiliary voltage $U_3$, respectively, exceeds the reference voltage $U_{R0}<U_R$. The functional network 1325 forms the amplitude information 1326 is formed from the phase angle $\Delta\phi$ between the switching moments of the two reference value comparators 1320a (KLZ), 1321b (KR), which is, for example, designated as reference voltage $U_{RR}$ to be compared.

Further, for adjusting an appropriate regulating parameter (regulator amplification), the phase angle $\Delta\phi$ can be used, to adjust an appropriate regulation amplification in dependence on the quantity of a dynamical load step transition $k_{RU}$ according to the mapped function via the regulator functional network 1328 (RF).

However, this function is only effective with deviations of the output voltage, and thus not in a static case of an adjusted deviation with a stable adjusted phase angle $\Delta\phi$. In other words, if the phase difference $\Delta\phi$ is approximately constant and merely an amplitude of the auxiliary voltage $U_3$ (and thus the amplitude of output voltage $U_0$) varies slightly around a target value (defined, for example, by the third reference voltage $U_R$, the regulator amplification $k_{RU}$ is almost constant, and the output signal of the third reference value comparator 1327 decides, whether the regulator 1330 increases or decreases the frequency information 1319a. However, the quantity of the increase or decrease of the frequency information 1319a is constant due to the constant regulator amplification $k_{RU}$.

Further, FIG. 13B shows how the turn-on moment of the switches (controlled by the turn-on signal 1319b) is generated via a phase shift of, for example, approximately $+90°=\pi/2$, at the driver or the driver means 1318 (TR), respectively. Further, a relative turn-on time D is determined via the turn-on moment.

Thereby, a determination of the frequency or operating frequency f, respectively, is given via the regulator 1330 (RU), but a determination of the relative turn-on time D via the re-turn-on signal 1319b (ON), which synchronizes the turn-on moment. The above-described function (of synchronization) has the advantage that a re-start of, for example, the switch S1 of the switch unit (or, for example, the two switches S1 and S2) is synchronized with a zero crossing of the load current $I_L$.

The described solution has the advantage that a turn-on moment is always optimum, even when the input voltage (for example of the voltage source 1311) changes simultaneously to the load within wide limits. Thus, the load current is approximately in-phase with the zero crossing of the switch current, even when the input network 1312 (SE) can shift the zero crossing slightly by a maximum of +/−10 to 15°.

In order to avoid turning on that is too late, the phase angle of the phase shifter circuit 1322 (PS) can also be adjusted to be smaller, which means, for example, between 60° and 90°. Thereby, a delay is compensated by the driver circuit 1318 (TR) and the switches of the switch unit themselves (for example the switches S1 and S2), so that the switch in the switch unit or the switches in the switch unit, respectively, always turn on prior to the moment when the current in the switches becomes positive. Prior to the above-mentioned moment, for example, freewheeling diodes $D_f$, which are connected in parallel to the switch, take on the reverse current flowing in the switch.

In other words, according to the invention, it is preferred to use transistors as switches, and to connect a freewheeling diode in parallel to the load path of the transistors (which means, for example a drain-source path or a collector-emitter path), so that the freewheeling diodes take over the current in a reverse direction.

Thus, the described turn-on method, which means the generation of a turn-on signal 1319b based on a zero crossing of the auxiliary voltage $U_3$ and a corresponding time delay, solves generally and independent of topology, the object to allow zero voltage switching (ZVS) or another optimum switching-on close to zero voltage switching conditions (ZVS conditions) and to simultaneously cover a large input and load range, as well as to allow an extensive variability of the input network.

It is a prerequisite for the applicability of the above-mentioned concept that zero voltage switching (ZVS) is possible at all operating points of the converter, so that reactive energy in a load circuit or an input resonance circuit of the piezo transformer (PT) is always able to cause or allow the voltage at the switches to reach a zero-value in a resonant or quasi-resonant way.

Here, a margin of a reverse current time in the switches is advantageous, to always obtain an optimum turn-on point at tolerance variations in all operating cases, particularly at transient dynamic junctions, without leaving zero voltage switching (ZVS).

The above method for determining the correct turn-on moment achieves that the sinusoidal signal generated from the voltage or auxiliary voltage $U_3$, respectively, shows no interference with respect to possible superimposed harmonics, in the case of a high load circuit Q (Q>5) of the load resonance circuit consisting of inductance L and capacitance L with respect to the output load.

Thus, the quantity of the voltage amplitude of the auxiliary voltage $U_3$ is freely selectable, without resistive load of the signal $U_3$ or the voltage auxiliary output, respectively, which could make the phase position of the turn-on moment smaller, without recognizable advantages for the solution.

Detecting a reverse switch current for generating the turn-on signal however, would be less reliable, because this signal is often superimposed with harmonics, which result from the excitation of harmonics in an input circuit of the load network of a piezo transformer or another transformer. These harmonics can occur both by parasitic vibrations across the switch capacitance and parasitic power inductances of the electric connections, and can also be effected by harmonics of the piezo transformer or another load network itself.

Further, with missing zero voltage switching (ZVS), the turn-on signal generated via the phase shifter 1322 (PS) always gives the optimum turn-on moment, where the oscillation of the load resonant circuit is maintained. Thus, the influence of the input network on the optimum and reliable operation is mostly suppressed, if no erroneous dimensioning of the arrangement exists, where, for example, the input capacitance $C_1$ of the load network has been made too large. Thereby, the resonant circuit consisting of capacitance C and inductance L with high Q operates as filter, which only transforms the base frequency of the desired resonance and thus guarantees in-phase turning-on of the switches.

Figure 13F:
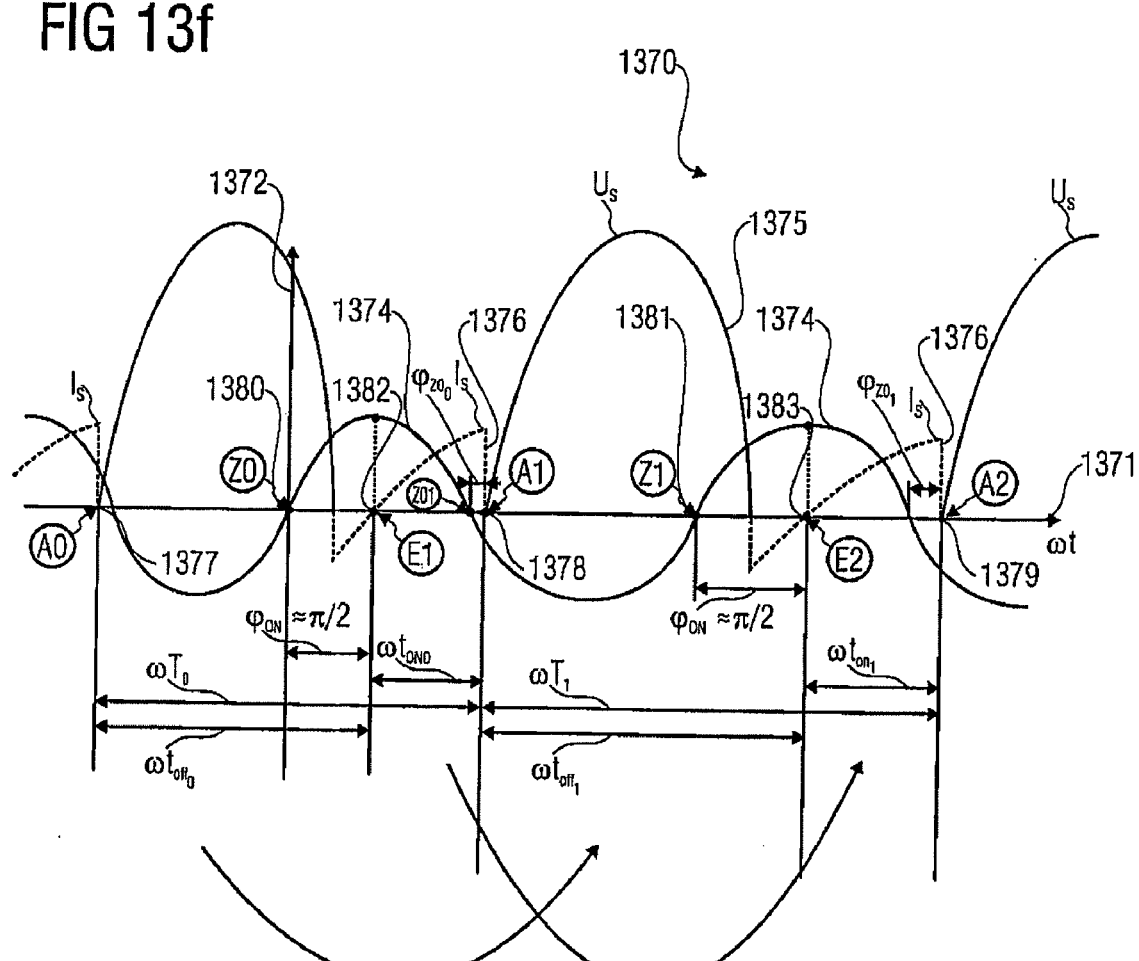

FIG. 13F shows a further graphical illustration of time curves, which occur in an operation of the inventive resonance converter according to FIG. 13F. The graphical illustration of FIG. 13F is designated by 1370 in its entirety. The time, normalized to the operating angular frequency $\omega$ is plotted on an abscissa 1371. An ordinate 1372 describes a quantity of the plotted curve shapes. Further, the graphical illustration 1370 shows a first curve shape 1374 describing the auxiliary voltage $U_3$. A second curve shape 1375 describes a switch voltage $U_S$ at a switch or across a switch, respectively, of the switch unit. Further, a third curve shape 1376 describes the switch current $I_S$ through the corresponding switch of the switch unit.

Further, the graphical illustration 1370 shows moments 1377 (A0), 1378 (A1), 1379 (A2) when the above-mentioned switch is turned off, so that the current flow through the switch returns to zero. The graphical illustration 1370 further shows moments 1380 (Z0), 1381 (Z1), when the auxiliary voltage $U_3$ shows a zero crossing in increasing direction (which means, for example, from negative towards positive values). Further, the graphical illustration 1370 shows moments 1382 (E1), 1383 (E2) when the switch current $I_S$ has a zero crossing.

In other words, FIG. 13F shows the basic principle of the invention according to an aspect of the present invention with regard to control of frequency or operating frequency f and relative turn-on time D. A moment of turning-off the current $I_S$, for example through the switch S1, designated by 1377 or A0, respectively, is detected in the control circuit 1315 or is known to the same. Subsequently, a zero crossing of the auxiliary voltage $U_3$ detected by the first reference value comparator 1320a (KLZ) is evaluated and effects turning-on of the switch S1 with a phase shift of 90° or another fixed phase shift of a minimum of 60° and a maximum of preferably 90°. A relative turn-off time $\omega T_{OFF0}$ is measured via a timer. At a moment 1378 (A1), the switch S1 switches off again or is turned off, respectively, wherein a whole (relative) period duration $\omega T_0$ results from a frequency currently adjusted via the voltage-controlled oscillator (VCO).

In other words, if the moment 1377 (A0), when the switch was turned-off the last time, is known, and if further the operating frequency f or the associated period duration T (to be calculated as reciprocal or frequency f), respectively, is known, the time interval between the previous turning-off 1377 (A0) and the next subsequent turning-off 1378 (A1) of the switch has the duration T.

In the case of a frequency rise, a time interval $\Delta \omega t$ is subtracted from the already stored previous period duration $\omega T_{0-1}$ across the regulator 1330 (RU), to obtain the current period duration $\omega T_0$. In frequency reduction, further, the time interval $\Delta \omega t$ is added to the already stored previous period duration. A new turn-off moment is again detected via the beginning of a timer, and the previous stored relative turn-off time $\omega t_{OFF0}$ is used to determine again the turn-off moment from the previous period duration $\omega t_0$, by establishing the difference as relative turn-on time $\omega t_{ON0}$, calculated from the moment 1382 (E1) onwards, according to $\omega t_{ON0} = \omega t_{OFF0} - \omega T_0$. This process proceeds continuously, so that the calculation of the turn-on time and the correct turn-on moment as well as the current frequency or operating frequency is solved with this constantly recurring algorithm. Thus, the described integrating method from period to period of the operating frequency of the resonance converter generates thus a fastest possible regulation of the output voltage, the power or the output current, respectively, which a periodically switching converter allows with regard to its regulating path.

Further, the respectively required frequency change can be adjusted according to the requirements of stability, regulating speed and other parameters via the regulator 1330 (RU), without leaving optimum turning-on, and by tracking the relative turn-on time in all cases of a variable load, a variable input voltage and possibly a variable input network of the converter or piezo transformer PT in dependence on the frequency.

In other words, the inventive concept for determining the turn-on and turn-off moments of the switch in the switch unit is based on a strictly separated adjustment of the turn-off moments 1377, 1378, 1379 (A1, A2, A3) of the switch and the turn-on moments 1382, 1383 (E1, E2) of the switch. A time interval between the turn-off moments is thereby merely defined by the frequency information 1319a provided by the regulator 1330 (RU), wherein a time interval between two subsequent turn-off moments is defined as period duration T belonging to the operating frequency f. The turn-on moments, when the control signal 1316 for the switch is generated, are further synchronized with (for example rising) zero crossings of the auxiliary voltage $U_3$, which are, for example, designated by 1380 and 1381 (Z0, Z1). Thus, the control signal 1316 for the switch is merely generated based on the above-mentioned zero crossings of the auxiliary voltage $U_3$ by a phase delay in the phase shifter 1322 (in combination with a phase delay of the driver 1318), so that the turn-on signal 1316 is delayed between 60° and 90° (with regard to the period duration T of the operating frequency f) in relation to the zero crossings 1382, 1383 of the auxiliary voltage $U_3$.

In dependence on how strong an overall change of the operating frequency f or the associated period duration T, respectively, is the delay means 1322 can be designed to delay the output signal 1320b of the first reference value comparator 1320a, for example by a fixed predetermined time, or to adjust the delay time for example dynamically to a quarter of the current period duration T. Generally, it is preferred that the delay of the delay means 1322 or the phase shifter 1322, respectively, lies in a range between one sixth of the period duration T associated to the operating frequency f and one quarter of the period duration T.

Figure 14:
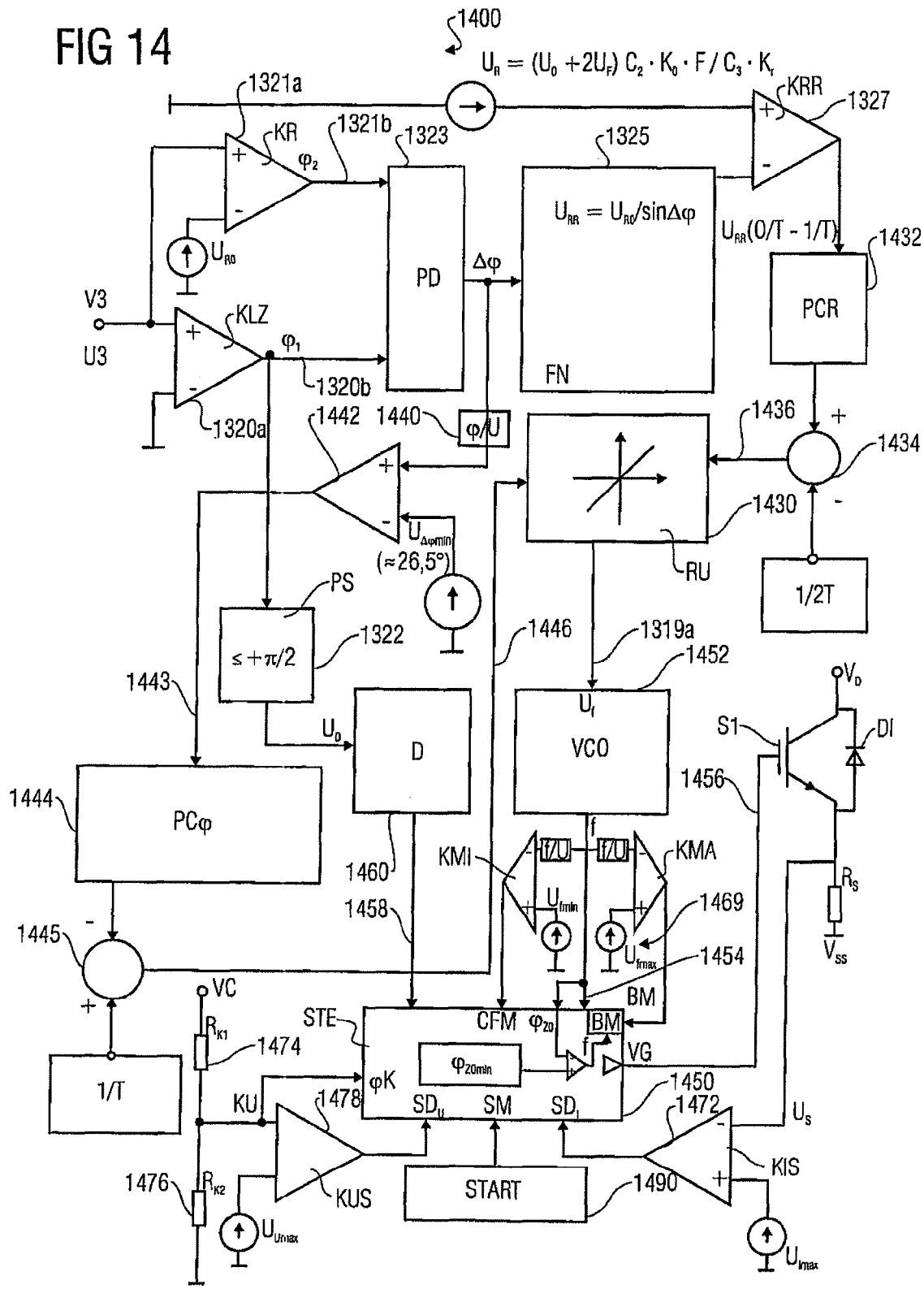
FIG. 14 is a block diagram of an inventive circuitry according to a twelfth embodiment of the present invention.

FIG. 14 shows a block diagram of a further inventive control circuit for a resonance converter by using a serially coupled-out auxiliary voltage $U_3$ or $V_3$, respectively. The circuitry according to FIG. 14 is designated by 1400 in its entirety. It should be noted that here the designation $V_3$ is used synonymously to the designation $U_3$ for the serially coupled-out auxiliary voltage.

It should be noted that the circuitry 1400 according to FIG. 14 has significant similarities with the circuitry 1300 according to FIG. 13B. For that reason, equal means are here designated by equal reference numbers and are not explained again. Rather, reference is made to the explanations with regard to FIG. 13B. However, it should be noted that a regulator 1430 of the circuitry 1400 differs from a regulator 1330 of the circuitry 1300.

In the circuitry 1400, a pulse code regulator 1432 receives the output signal of the third reference value comparator 1327. Together with a combiner 1434, the pulse code regulator 1432 generates a control signal 1436 for the regulator 1430, wherein the control signal 1433 assumes two values in dependence on the output signal of the reference value comparator 1327. For example, the pulse code regulator 1432 can be designed in combination with the combiner 1434 to adjust the control signal 1436 to a first value when a first value is present at the output of the reference value comparator 1327, and to adjust the control signal 1436 to a second value when a second value is present at the output of the reference value comparator 1327. The first value of the control signal 1436 can, for example, be an inverse of the second value of the control signal 1436. In other words, the control signal 1436 can, for example, assume the two values +x/T and −x/T in dependence on the output signal of the reference value comparator 1427, wherein x is, for example, a constant in a range between 0 and 0.5, and wherein T is the period duration associated to the operating frequency f.

Then, the regulator 1430 receives the control signal 1436 and decreases or increases the operating frequency in dependence on the value of the control signal 1436. For that purpose, the regulator 1430 provides frequency information 1319a, for example in the form of a digitally represented value or in the form of a control voltage $U_S$. It should be noted that the control signal 1436 hot only indicates to which direction the frequency is to be changed by the regulator 1430 but also to what degree the frequency is to be changed (for example per time step, per period or per time unit).

The circuitry 1400 according to FIG. 14 further comprises monitoring a minimum phase shift $\Delta\phi$. For that purpose, information about the phase shift $\Delta\phi$ is tapped at the output of the phase detector 1323 and optionally converted into a voltage or another electrical representation, such as is designated by the optional angle voltage converter 1440. A fourth reference value comparator 1442 compares the angle value $\Delta\phi$ with a minimum phase shift $\Delta\phi_{min}$ and provides thus an output signal 1443 indicating whether the phase shift $\Delta\phi$ is smaller or higher than the minimum phase shift $\Delta\phi_{min}$. The minimum phase shift $\Delta\phi_{min}$ is preferably selected in a range between 15° and 40°, wherein it has turned out that very good results can be obtained in a range between 20° and 30°. In a preferred embodiment, the minimum phase shift $\Delta\phi_{min}$ is, for example, adjusted to 26.5°.

Further, a frequency limitation means 1444, 1445 generates a control signal 1446 avoiding a reduction of the frequency through the regulator 1430, when the phase shift $\Delta\phi$ reaches the minimum phase shift $\Delta\phi_{min}$ or falls below the same.

Further, the circuitry 1400 comprises a driver 1450. A voltage-controlled oscillator (VCO), which can alternatively be replaced by a means for digital frequency generation, generates a control signal 1454 of the operating frequency f based on the frequency information 1319 and provides the same to the driver 1450. Thereby, the control signal 1454 serves mainly for generating turn-off moments for the switch (here symbolized by the IGBT transistor S1 with the freewheeling diode $D_f$ connected in antiparallel. In other words, a switch driver switches a control signal 1456 off for a driver, when, for example, a rising or falling edge appears in the control signal 1454.

The driver 1450 further receives a turn-on signal 1458, which is generated by a turn-on signal generation means 1460 from the signal generated by the phase shifter 1322. Thereby, the turn-on signal 1458 corresponds substantially to the output signal of the phase shifter 1322, wherein the turn-on signal generation means 1460, for example, also performs level conversion.

The driver 1450 typically turns on the control signal 1456 in response to receiving the turn-on signal 1458.

Further, the circuitry 1400 comprises a means for monitoring the frequency generated by the (voltage-) controlled oscillator 1452. The frequency monitoring means 1464 compares the frequency generated by the (voltage-) controlled oscillator 1452, for example with a minimum frequency $f_{min}$ and signals to the driver 1450 when the same falls below the minimum frequency $f_{min}$. Further, alternatively or additionally, the frequency monitoring means 1464 compares the frequency generated by the (voltage-) controlled oscillator 1452 with a maximum frequency $f_{max}$ and signals an exceeding of the maximum frequency $f_{max}$ to the driver 1450. The frequency monitoring means 1464 performs, for example, a frequency voltage conversion based on the control signal 1454 provided by the oscillator 1452, so that voltage information is present, which describes the operating frequency f of the voltage-controlled oscillator 1452. The above-mentioned voltage can be compared with a reference voltage $U_{fmin}$, which represents a minimum allowable frequency, and the result of the comparison provides information about whether the operating frequency f falls below the minimum allowable frequency $f_{min}$. Analogously, the above-mentioned voltage depending on the frequency can be compared with a further reference voltage $U_{fmax}$, representing the maximum frequency $f_{max}$, and the result of the comparison gives information about whether the operating frequency f exceeds the maximum allowable frequency $f_{max}$.

In the case of exceeding the maximum allowable frequency $f_{max}$ or when it falls below the minimum allowable frequency $f_{min}$, the driver 1450 can be turned off, for example.

As already briefly designated by regard to FIG. 13B, it can further be monitored whether a current flow through the switch (e.g. through S1) exceeds a maximum allowable value. For that purpose, the current flow through the switch S1 is converted into a voltage, which is here designated by $U_S$ (and which is not be confused with the voltage $U_S$ across the switch, shown in FIGS. 13C, 13D and 13F) by using a shunt resistor 1470. If the voltage $U_S$ across the shunt resistor $R_S$ exceeds a maximum allowable value (here: $U_{imax}$), which can be detected by a reference value comparator 1472 (KIS), an overcurrent condition is signaled to the driver 1450, which can, for example, result in turning-off the driver 1450.

Further, an input voltage $V_C$ can be evaluated, which is, for example, provided to the circuitry 1400 by the voltage source 1411. Since the voltage $V_C$ is higher than 50 Volt in many applications, it is preferred to generate a voltage $V_U$, which is a downscaled copy of the voltage $V_C$, by a resistive voltage divider consisting of two resistors 1474, 1476 ($R_{v1}$, $R_{v2}$). By comparing the voltage $V_U$ with a reference voltage $U_{Umax}$ in a reference value comparator 1478, further, a signal can be generated, which indicates an overvoltage condition to the driver 1450, and thus results in turning-off the driver. Further, the voltage $V_U$ can be used to adjust a correction angle $\phi_K$ in dependence thereon.

Figure 3:
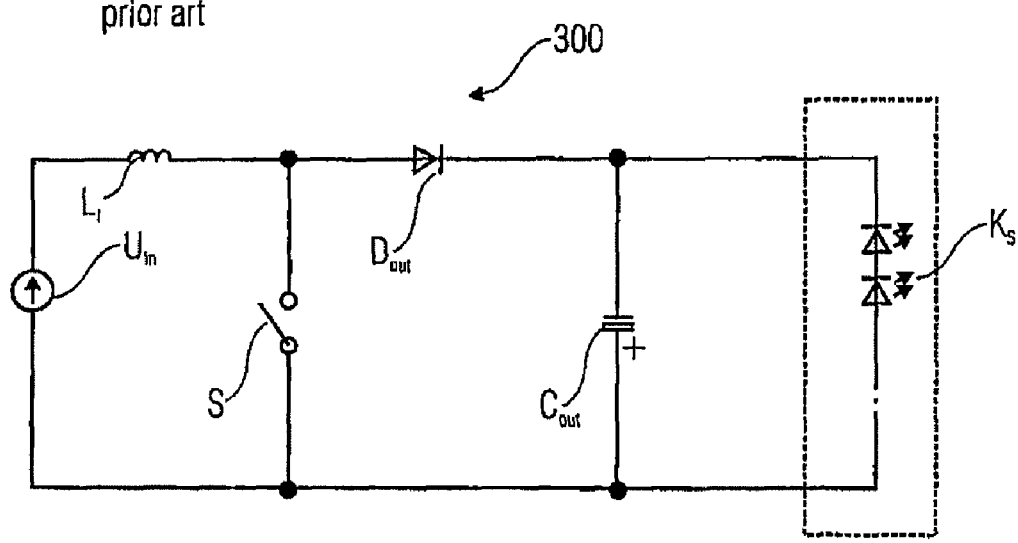
FIG. 3 is a circuit diagram of a boost converter according to the prior art.

The driver 1450 can optionally be designed to perform a burst mode operation, which means to send only individual packets of control impulses to the switch, with distinct breaks in-between the same, as is known. The burst mode can for example be activated in response to determining exceeding of the maximum frequency $f_{max}$. Further, the burst mode can be activated when the phase angle $\phi_{Z0}$, as defined for example with regard to FIG. 3D, falls below a minimum value $\phi_{Z0min}$.

In other words, FIG. 14 shows a control circuit, which is based on the principle of serially coupling-out the voltage or auxiliary voltage $U_3$, respectively, to the load described in FIG. 13. Thereby, first, the threshold comparators 1321a, 1320a (KR, KLZ) determine the phase difference $\Delta\phi$. Then, a maximum value $U_{RR}$ (of the auxiliary voltage $U_3$) (to be compared), is determined by the functional network 1325 (FN). If a rated phase angle $\Delta\phi_N$ is close to 90° (for example in a range between 750 and 105°), a function formation in the functional network 1325 (FN) is simplified in that the sinusoidal function (sin $\Delta\phi$) (at least approximately) equals one. In that case, the reference voltage $U_{RR}$ (the amplitude of the auxiliary voltage $U_3$) is equal to the reference voltage $U_{R0}$.

By comparing the reference voltage $U_{RR}$ (or the amplitude of $U_3$) to the target value, respectively, represented by the reference voltage $U_R$, an impulse of zero (0/T) or an impulse of one (1/T) is determined as impulse per period duration of a sinusoidal oscillation of the auxiliary voltage $U_3$ via the reference comparator 1327 (KRR). This value is compared to a value of ½/T. Thus, the regulator 1330 (RU) is controlled, so that the regulator 1330 generates a frequency change. For example, the regulator 1330 generates a frequency reduction in the case of an impulse of zero at the pulse code regulator (PCR), and a frequency rise in the case of an impulse of one at the pulse code regulator 1432. Thus, the pulse code regulator 1432 merely passes a regulation deviation, which can vary with a fixed distance value of ½ around a means value of ½ or 0, to the regulator 1330 (RU), and can thereby generate a frequency-dependent preamplification, in order to adapt the regulation speed of a respective application at different resonant frequencies of the load network to the possible reaction speed of the regulation path (controlled part of the system). The quantity of the frequency change can thus depend on the respective frequency itself or can also be constant, in an embodiment, which is not shown.

Further, a voltage-controlled oscillator 1452 (VCO) or another frequency adjustment means is operated from the result of the regulator 1330, which generates a frequency or operating frequency f, respectively, which is passed on to the control means or the driver 1450 (STE), respectively, and which is passed on to the switch S1 via the output VG of the driver 1450, in order to control the respective converter or resonance converter.

Thereby, the switch S1 can also be only one of several switches S1, S2, S3 and/or S4 operated out of phase. If two switches S1 and S2 are present, the same are typically or preferably, respectively, operated in push-pull and further, a dead time exists between the turn-on intervals. This dead time is calculated by transforming the relative turn-on time of the switch S1 controlled by the driver 1450 or the control means STE, respectively, to the other switches in phase or by 180° out of phase. This is performed via the reference value comparator 1320a (KLZ), for example by realizing the phase shift via the phase shifter network 1322 (PS), and by thus forming a relative turn-on time D from the turn-off moment and the synchronized turn-on moment, as is described with regard to FIG. 13F.

Thus, this function can be applied to different converter types, so that a universal circuit and control concept is given. By detecting the phase angle $\Delta\phi$, wherein the nominal phase angle $\Delta\phi_N$ should lie between 45° and 90°, the same can also be compared to a reference $\Delta\phi_{min}$. Since the load network can be designed equally for different converter types, the minimum phase angle $\Delta\phi_{min}$ is a normed measure for a maximally possible power transmission of an inventive arrangement, such as a piezo transformer, as load network.

The minimum or minimum allowable, respectively, phase angle, however, depends on the selection of the nominal phase angle. If it falls below the minimum allowable phase angle $\Delta\phi_{min}$, a signal of zero (0/T) or one (1/T) is generated via a further regulator circuit 1444 ($PC_\phi$), which is compared to a (constant) signal 1/T. Thus, a limitation of the frequency is performed, wherein the frequency is not decreased any further after the minimum allowable, respectively, phase angle $\Delta\phi_{min}$ has been achieved. If, for example, a short circuit occurs at the load, a higher current $I_L$ through the load circuit would form in the first instant, which could cause that the same falls below the minimum phase angle $\Delta\phi_{min}$. In that case, the regulator 1430 (RU) could try to lower the frequency to obtain an increase of the output voltage, in order to achieve that the auxiliary voltage $U_3$ matches the reference voltage $U_R$ again, based on a comparison with the reference value $U_R$ predetermined according to FIG. 13E and possibly corrected by a factor F in the circuitry 1400 according to FIG. 14.

In order to avoid that a reference value of an application, which is adjusted too large, causes the converter to be over-loaded by external alignment of $U_R$, the regulator 1444 ($PC_\phi$) limits the frequency towards the bottom, so that an overresonant operation of the resonance converter is ensured. A correct association of the voltage divider $R_{U1}$ and $R_{U2}$, or the voltage proportional current feed $R_U$ across the terminal $V_3$ according to FIG. 7A and FIG. 14 is a prerequisite for this limitation. Thereby, a limitation of the minimum allowable frequency is given, independent of the resonance frequency of the resonant circuit consisting of inductance L and capacitance C.

Thus, the internal fixed reference $U_{R0}$ of the control circuit or the control IC according to FIG. 13B or FIG. 14 determines together with the minimum phase angle $\Delta\phi_{min}$, which maximum load current is possible in the load circuit, in dependence on the current feed across $R_U$ and the coupling-out across $\omega C_3$. Further, since it can be assumed that such a load circuit in the closed loop is always operated in an overresonant way, which frequently offers the advantage of maximum efficiency when using a piezo transformer as load circuit, the limitation of the minimum phase angle to the value $\Delta\phi_{min}$ ensures that the regulation is maintained in an overresonant way, independent of the nominal reference value for the output voltage $U_R$, and thus for the output power or for the output current, and thus does not fall out of step by falling below the resonance point of the resonant circuit consisting of inductance L and capacitance C. Thus, the regulator 1430 (RU) does not fall below a minimum output voltage $U_f$ for generating a minimum frequency or operating frequency f, respectively.

If the regulation mechanism according to FIG. 13F is carried out, which means, a stepwise change of the period duration is determined via a digital regulation, whereby the operating frequency f also changes as reciprocal of the period duration, the regulator 1430 (RU) generates a time interval $\Delta\phi t$ instead of a voltage $U_f$, which is added to a stored previous period duration or subtracted from the stored previous period duration. In that case, the voltage-controlled oscillator 1452 is typically replaced by a digital means for generating a frequency with the period duration T, and the frequency monitoring means 1464 comprises, for example, digital reference value comparators, which evaluate the period duration T or the operating frequency f reciprocal thereto.

A start-up process for the circuitry 1400 is performed, for example, such that a frequency lying, for example, 15 kHz-50 kHz above the resonance frequency of the load circuit consisting of conductance L and capacitance C is adjusted by a starting block 1490 (START). Further, for example, a fixed turn-on time $D_{start}$ is adjusted in a range between typically 30% and 50% by the start block 1490.

The starting frequency, to which the operating frequency f is adjusted at the start by the start block 1490 can, for example, be adjusted by a capacitance $C_F$. If the mentioned capacitance $C_F$ is omitted, the frequency is, for example, alternatively adjusted by a corresponding resistor $R_F$ together with the desired output voltage $U_0$. According to the invention, after detecting a sufficient voltage signal $U_3$ or $V_3$, respectively, the above-described regulation mechanism is put in operation, so that frequency and turn-on time are adjusted by the process described with regard to FIG. 13F (in combination with FIGS. 13A-13E), or by a similar process in the circuitry 1400 according to FIG. 14. The adjustment of frequency and turn-on time is thereby performed, for example, via a voltage-controlled oscillator (VCO), wherein typically out-of-phase turning-on of the switch takes place using the phase shifter 1322.

Further, according to the invention, for saving additional feedback elements, such as galvanically separating optocouplers or further transformers, an adjustment to a constant load current $I_L$ is performed. The constant load current $I_L$ is measured such that it is not more than 50% to 100% above a maximum nominal current. According to the invention, this is obtained by selecting the transformation ratios $k_0$ and $k_r$ of the piezo transformer PT or another load resonant circuit according to FIG. 13B, such that the transformation ratios, together with the capacitances $C_2$ and $C_3$, result in a desired value, which results after impedance matching of the equivalent load R in relation to the output capacitance $C_2$ in the nominal load case (or, which result after impedance matching of the equivalent load R in relation to the output capacitance $C_2$ in the load case, respectively).

Since in most cases the described converter starts with an output voltage of zero ($U_0=0$), the current changes only slightly with appropriate dimensioning of the predetermined parameters, until it reaches approximately the nominal current of the nominal load, as long as the nominal load RN is applied to the output (of the resonant transformer arrangement). If a smaller load than the nominal load is applied, an input voltage-dependent phase correction angle $\phi_k$ will be generated via the tap $V_U$ of the input voltage $V_C$, which is processed with the turn-off load angle $\phi_{Z0n}$ illustrated in FIG. 13F, to form a correction factor F of the reference voltage $U_R$, such that the angle resulting from this calculation does not exceed or fall below a threshold. Thereby, a function of the angle $\phi_k$ falling in a linear, exponential or another continuous way with the input voltage $V_C$, is formed, which is linearly subtracted from the angle $\phi_{Z0}$ or linearly added to the angle $\phi_{Z0}$. Thereby, a fixed internal function of the control circuit is used, which can, however, also be impressed externally or influenced externally, respectively, when further pins of an integrated circuit (IC) or additional trim inputs were used.

Additionally, an adaptation to the input network, for example to the value of the inductance $L_f$ can be performed via a series resistor $R_V$. When in this case $L_f$ has been selected in the vicinity of the resonance frequency of the load circuit consisting of capacitance C and inductance L, a smaller value has to be selected for $R_V$, to select a higher reference voltage at the input $V_U$. If a higher value has been selected for $L_f$, for example to obtain improved input current smoothing towards the network, a higher value has to be selected for $R_V$ in order to generate a smaller reference voltage $V_U$.

Further, an angle $\phi_{Z0}$ is determined, which carries information about how long (in relation to a period duration T) the switch is turned on, or how long forward current flows through the switch. According to FIG. 13F, the angle $\phi_{Z0}$ describes, for example, a phase difference between the moment when the auxiliary voltage $U_3$ shows a falling zero crossing (from positive to negative), and a moment when the switch is turned off. If the mentioned angle $\phi_{Z0}$ reaches an angle $\phi_{Z0min}$, which is typically between −45° and −80°, a sufficient turn-on time can no longer be ensured. A turn-on time of zero would, for example, be obtained when the angle $\phi_{Z0}$ reached a value of −90°. In other words, the larger the quantity of the angle $\phi_{Z0}$ becomes, the smaller is the turn-on time of the switch. If the quantity of the angle $\phi_{Z0}$ exceeds a certain predetermined value, a sufficient turn-on time is no longer ensured. Therefore, in that case, a burst mode control (BM) is initiated. The mode of operation of the burst mode has been briefly discussed above, and thus reference is made to the above explanations.

With decreasing load (starting from a relative higher load), first, the reference voltage $U_R$ is reduced with the decreasing turn-off load angle $\phi_{Z0}$, so that the output voltage remains approximately constant. If it falls below a certain load, the resulting angle reaches a limit, so that a transition to the burst mode control or the burst mode operating state takes place, respectively.

During oscillation built-up of an impulse sequence of the burst mode, the reduced value of the reference voltage is always adjusted to an internal reference, for example the reference voltage $U_{R0}$. By determining the turn-off load angle $\phi_{Z0}$ occurring during oscillation built-up, in comparison to the input voltage function, for example according to (7), a decision is made whether the burst mode has to be maintained due to a low load, or whether the burst mode can be quit again with increasing load. A burst mode is also required when the starting frequency or a maximum frequency has been obtained, which is detected via comparator or reference value comparator KMA.

When further the reference according to FIG. 13C had been determined to a maximum phase angle of $90°=\pi/2$ during no-load operation or with minimum output load, the minimum possible phase angle $\Delta\phi_{min}$ according to FIG. 13B is $$\sin(\Delta\phi_{min})=(2/\pi)^2$$

$$\Delta\phi_{min}=26.5° \qquad (6)$$

under the assumption that the impedance $1/\omega C_2$ of the capacitance is equal to the ohmic equivalent load of the load R at an output of a full bridge rectifier according to FIG. 13B, and when it is further approximately assumed that the forward voltages $U_F$ of the rectifiers D5-D8 are negligible compared with the output voltage $U_0$.

If these forward voltages, however, are considered within common limits, then, with common small voltages of 1 Volt to 40 Volt at the output, a compensation of the inflow of the forward voltage is given, compared to the output voltage by the required frequency distance from the resonance point at maximum load, by not allowing the smallest possible phase angle $\Delta\phi_{min}$, but by limiting the same to a somewhat higher value to not operate the converter in an underresonant way, and to thus bring the regulator circuit out-of step.

Thus, determining a standardized minimum phase angle (which means a minimum phase angle fixed by the control circuit) means a frequency- and circuit-independent operation of such converters with load circuits according to FIG. 13A. However, the minimum phase angle $\Delta\phi_{min}$ can also be fixed to a smaller or higher value. A smaller value is possible when the reference value of the output voltage to be regulated according to FIG. 13D has been determined to be smaller than the one determined in the relation according to FIG. 13E. A higher value is possible when, for example, a smaller power than the maximum transmittable power at the impedance equality at the output of the piezo transformer between capacitive and ohmic load is allowed, to thereby ensure a better stability of the output voltage in the underload range.

Further, FIG. 14 shows that a minimum and maximum frequency can be detected by corresponding threshold comparators KMI, KMA, if, for example, such a frequency range is determined by an additional trim input of an integrated control circuit (control-IC). Thereby, the minimum frequency can be aligned approximately with the resonance frequency, so that the driver 1450 or the control unit STE, respectively, initiates the start process at a frequency above the minimum frequency (within a typical bandwidth of about 15 kHz to 30 kHz) via the START function (initiated by start block 1490). In other words, the start block 1490 achieves that the operating frequency at the moment of the start is about 15 kHz to 30 kHz above the minimum frequency. Thereby, an overresonant operation is guaranteed at all times, when a frequency generator starts at this maximum frequency $f_{max}=f_{min}+\Delta f_b$ and reduces the frequency step-by-step until an output current signal is observed via the auxiliary voltage $U_3$.

Further, an inventive monitoring circuit SDI of the switch current is given, if the same exceeds an allowed limit.

This exceeding is determined via the comparator or reference value comparator 1472 (KIS), when a maximum value of the switch current in the shunt resistor or sense resistor $R_S$, respectively, has been exceeded. In other words, the reference value comparator 1472 generates a signal at the input $SD_I$ of the driver 1450, if a switch current, which is too high, is determined. Thereby, indirect monitoring of heating the switch is given, so that a certain thermal load, caused by an effective value or RMS value of the switch current, respectively, cannot be exceeded. If the switch current level is only exceeded briefly, in an impulse, but periodically, this can also be detected by a monitoring circuit according to the invention, for example when zero voltage switching (ZVS) is missing. A short-term, impulse-like (possibly periodically appearing) exceeding of an allowable switch current level can, for example, be briefly blocked out (suppressed) at a starting process, so that, for example, missing zero voltage switching (ZVS) would be tolerated in a starting case. With dynamically starting transient transmissions and, for example, at a start of the burst mode, such a block-out circuit is also useful or required.

In other words, the driver 1450 is designed to deactivate the switch, if either a current, which is higher than a current limit, flows longer through the switch than a first time period, or if the current through the switch only briefly, but periodically recurring, exceeds the current limit for a second time period. However, the driver 1450 does not deactivate the switch when the current flow through the switch exceeds the current limit only for a sufficiently short time period, which is shorter than the first time period.

Further, monitoring the input voltage $V_C$ is possible via the reference value comparator 1478 (KUS), so that when a maximum value is exceeded, the converter can be turned off via the function SDU or a control signal $SD_U$, respectively.

However, as has been explained, the above-mentioned voltage monitoring of the input voltage $V_C$ can be simultaneously used via the function $\phi_k$, in order to perform further regulation of the output voltage or the output current. Therefore, the following simplified dependence $$\Delta\phi+\phi_{Z0}+k_u V_C=\phi_{ref}$$

is used. Factor $k_u$ describes a voltage division ratio through the voltage divider 1474, 1476 and can thus be adjusted via the resistor divider 1474, 1476 or the associated resistances $R_{V1}$, $R_{V2}$, respectively. Thereby, the operating range of the converter is determined with regard to the required input voltage range.

Thus, with constant input voltage, according to an aspect of the present invention according to (7), an approximately constant sum of the phase angles described in FIGS. 13C and 13D has to be adjusted to ensure a constant output voltage in the case of higher loads. As soon as the phase angle $\Delta\phi$ falls below a certain value, the proportionality of the relation in FIG. 13E is no longer given. With regard to a limit corresponding to the accuracy requirements, additionally, according to the invention, a regulation can be adjusted below a limit $\Delta\phi_{grenz}$ (which means if $\Delta\phi$ is smaller than $\Delta\phi_{grenz}$), where the function according to (7) is guaranteed. Particularly in the case of short circuit and overload, an approximately constant load current is adjusted, which is often desired in the case of an overload in current supplies.

Further configurations of the invention are a combined electrode of the piezo transformer for generating the load current proportional signal and the current supply for controlling the converter. In other words, the auxiliary voltage $U_3$ at the serially coupled-out auxiliary output can simultaneously be used for supplying the control circuit, whereby, for example, the above-described pump circuit can be omitted.

Further, the output of the piezo transformer can comprise a center electrode, so that only two rectifier diodes are required for generating the rectified DC output voltage (compare FIG. 13B), instead of four diodes of a bridge rectifier.

Further, in a further embodiment, a start block 1490 or a startup circuit (START) can be modified such that the start block reduces the frequency or operating frequency f, respectively, starting at an adjustable maximum frequency, incrementally and recurring for so long until a sufficiently high signal is detected at the auxiliary output or at the auxiliary electrode, respectively, for generating the load current proportional signal, which indicates the overresonant transformation of the piezo transformer. Then, the frequency can be slowly reduced, until a reverse current is observed in the switch, which suggests a resonant operation of the piezo transformer with zero voltage switching characteristic (ZVS characteristic). Detecting a reverse current through the switch can, for example, be performed by a reference value comparator similar to the comparator 1472 (KIS), wherein the configuration of the reference value comparator 1472 is in that case adapted to detect a reverse current (which means a current in reverse direction) and not an overcurrent (as shown in FIG. 14), which means a too high current in forward direction, but.

Only after determining the characteristic (which means the presence of a reverse current through the switch or a zero voltage switching), the actual regulator is put in operation.

Here, the circuitry according to FIGS. 13 and 14 is particularly robust, since control of the overall regulator functionality is possible loss-free or with low loss from a sinusoidal oscillation proportional to the load current.

An overall turn-on time (of the switch) can be longer than the time where the switch current flows in positive direction, wherein the time where the switch current flows in positive direction is referred to as positive turn-on time. The whole turn-on time is, for example, determined either by detecting a reverse current signal and by subsequent immediate turning-on of the switch, or according to a method by using a serial auxiliary tap with load-current phase proportional turning-on according to FIG. 13F. In other words, the switch can either be turned on directly after detecting a reverse current, or with a certain predetermined time or phase delay after a (rising or falling) zero crossing of the auxiliary voltage $U_3$.

The positive turn-on time occurs by determining the time difference between the switch current zero crossing or the turn-on moment (for example if the turn-on moment coincides at least approximately with the switch current zero crossing) and turning-off of the switch.

A regulation can alternatively or additionally, respectively, be adjusted or designed, respectively, by alternatively or additionally reducing the frequency during loss of the reverse current signal for so long, until a reverse current is detected again. In other words, if it is detected that no reverse current flows during a period duration T, then, in response, the operating frequency is reduced, or changed towards the resonance frequency of the resonant transformer arrangement, respectively.

Further, there are several possibilities to activate the burst mode. For example, switching to a burst mode control can be performed, when a loss of the reverse current signal is detected, since in that case, typically, the output voltage becomes too high (e.g. with too small load and maximum input voltage).

In all cases, it is advantageous to change to the burst mode, if despite (previous) frequency increase, the output voltage has been detected to be too high, and a maximum allowable frequency or maximum frequency $f_{max}$, respectively, has already been reached. For example, in the case of serial coupling-out and according to FIGS. 13 and 14, burst mode control is useful, if either the maximum frequency or maximum allowable frequency $f_{max}$, respectively, has been reached, and the output voltage remains too high, or when missing zero voltage switching (ZVS) is detected.

Burst mode control is even more effective in the case of serial coupling-out, by determining a minimum allowable phase angle $\phi_{Z0min}$, wherein a phase angle can or may not fall below the same, wherein when the same falls below the minimum allowable phase angle $\phi_{Z0min}$, the burst mode is used. Thus, for example, sampling a maximum frequency is no longer required in some cases. The minimum value $\phi_{Z0min}$ monitored or observed, respectively, at the driver 1450 or in the control unit STE, respectively, is always more than 0®, typically (with respect to quantity) 45°, so that a sufficient remaining turn-on time is ensured. $\phi_{Z0min}$ is preferably between 35° and 55°.

In order to find a value appropriate for the typical frequencies between 25 kHz and 500 kHz, the value $\phi_{OFFmin}$ should never fall below about 30°, which corresponds approximately to a turn-on time of 415 ns at a frequency of 200 kHz. This standardization is again independent of the topology, and can thus be applied to different converter types.

FIG. 15 shows a block diagram of an inventive resonance converter by using a serially coupled-out auxiliary voltage according to a further embodiment of the present invention.

The circuitry according to FIG. 15 is designated by 1600 in its entirety. Since the circuitry 1600 is very similar to the circuitry 1310 showed with regard to FIG. 13B, equal means in the circuitries 1310 and 1600 are designated by the same reference numbers and are not described again herein.

Thus, generally, the circuitry 1600 comprises an energy source 1610, which can comprise, for example, a voltage source 1311. Further, the circuitry 1600 comprises an input network 1312 consisting of switch unit 1612 and an optional reactance network 1614. The switch unit 1612 can either comprise an inductance and merely one switch or two switches, as it is graphically illustrated. It should be noted that in the region of the source 1610, the input network 1312 and the resonant transformer arrangement 1313, equal letters (A, B, C, D) designate circuit nodes, which can be coupled to each other. The optional reactance network 1614 can, for example, comprise a serial inductance, a series resonance circuit, a parallel inductance or a parallel resonance circuit, which can be connected in series or in parallel between the switch unit 1612 and the resonant transformer arrangement 1313. Thus, different topologies of the input network 1312 result.

However, it should be noted that different topologies could be used in the input network 1312. Thus, it is merely relevant that the input network 1312 generates excitation on the input side for the resonant transformer arrangement 1313, by switching at least one switch.

An output of the resonant transformer arrangement 1313 is further coupled to an output network 1616, which alternatively or in combination comprises an alternating current load or a direct current load with a rectifier and possibly a load capacitor, as has been described above.

A serially coupled-out auxiliary output of the resonant transformer arrangement 1313 provides, as has been described with regard to FIG. 13A or 13B, respectively, an auxiliary output voltage $U_3$, whose amplitude is proportional to a load alternating current $I_L$ in a resonance circuit of the resonant transformer arrangement.

A coupling-out network 1620 receives the auxiliary voltage $U_3$, and performs, if necessary, a level conversion, to, for example, displace the auxiliary output voltage $U_3$ into a level range, which can be processed in an integrated circuit. The coupling-out network 1620 can, for example, effect voltage division or voltage displacement. Thus, the coupling-out network 1620 generates output signals 1622, 1624 representing the auxiliary voltage $U_3$. The reference value comparator 1320a, also referred to as zero crossing detector ZCD, receives the signal 1622 and generates information 1626, 1628, indicating when the auxiliary voltage $U_3$ has a zero crossing. The phase shifter or the delay means 1322, respectively, delays, for example, the signal or information 1626 by about 60° and generates thus the turn-on signal 1319b, which acts on the driver 1318 (with voltage-controlled oscillator and driver) in the way described with regard to FIG. 13B.

Further, a peak detector 1630 (PID) detects amplitude, effective value or amplitude-dependent information about the auxiliary voltage $U_3$. The information generated by the peak detector 1630 is designated by 1632. A combiner or comparator, respectively, 1634 combines the information 1632 from the peak detector 1630 with a reference value (for example reference value $U_{ref}$ or reference value $U_R$, respectively) from a reference value provision means 1636. The combiner or comparer 1634, respectively, can, for example, be designed to form a difference between the information 1632 and the reference value from the reference value provision means 1636. Alternatively, the combiner or comparator 1634 can also compare only the information 1632 with the reference value, and thus provide information, which indicates merely qualitatively, whether the information 1632 is higher or lower than the reference value. Thus, the combiner or comparator 1634 provides difference information or comparison information 1637 to a regulator 1638 (VR), which can, for example, be a proportional regulator, an integral regulator, or preferably a proportional integral regulator (PI regulator). Thus, the regulator 1638 provides frequency information 1319a to the driver 1318, analog to the regulator 1330 according to FIG. 13B. The frequency information 1319a determines for example, the operating frequency f of the driver 1318, in the above-described manner.

Further, the driver 1318 provides a turn-off signal 1640 to a phase detector 1642, wherein the turn-off signal 1640 indicates when the driver 1318 opens the switch in the input network 1312 or deactivates the control signal 1318, respectively. The phase detector 1642 forms, at least concerning the quantity, a phase difference between the signal 1628, which indicates a zero crossing of the auxiliary voltage $U_3$, and the output signal 1640, which indicates turning-off of the switch. Thus, the phase detector 1642 determines the turn-off phase angle, which is indicated, for example, in FIG. 13F by $\phi_{Z0}$, and provides corresponding information 1644 to a burst mode regulator 1646. The burst mode regulator 1646 compares, for example, the received information 1644 about the turn-off phase angle $\phi_{Z0}$ with a minimum allowable turn-off phase angle $\phi_{Z0min}$, and activates, for example, the burst mode, if the actual turn-off phase angle $\phi_{Z0}$ becomes smaller than the minimum allowable turn-off phase angle $\phi_{Z0min}$.

Further, the burst mode regulator 1646 can detect, for example, when the phase angle reaches a predetermined value. In that case, the burst mode regulator 1646 sends a control signal to the driver 1318, which indicates that a maximum allowable operating frequency f is reached, and thus that the operating frequency f may no longer be increased. If the output voltage is still too high even after reaching the maximum allowable operating frequency f detected in such a way, the burst mode regulator 1646 can again cause a transition of the driver 1318 into the burst mode. It should be noted that the reference value provision means 1636 can either provide a fixed or a variable reference value or a fixed or variable reference voltage $U_{ref}$, $U_R$, respectively, as will be explained below.

Figure 6C:
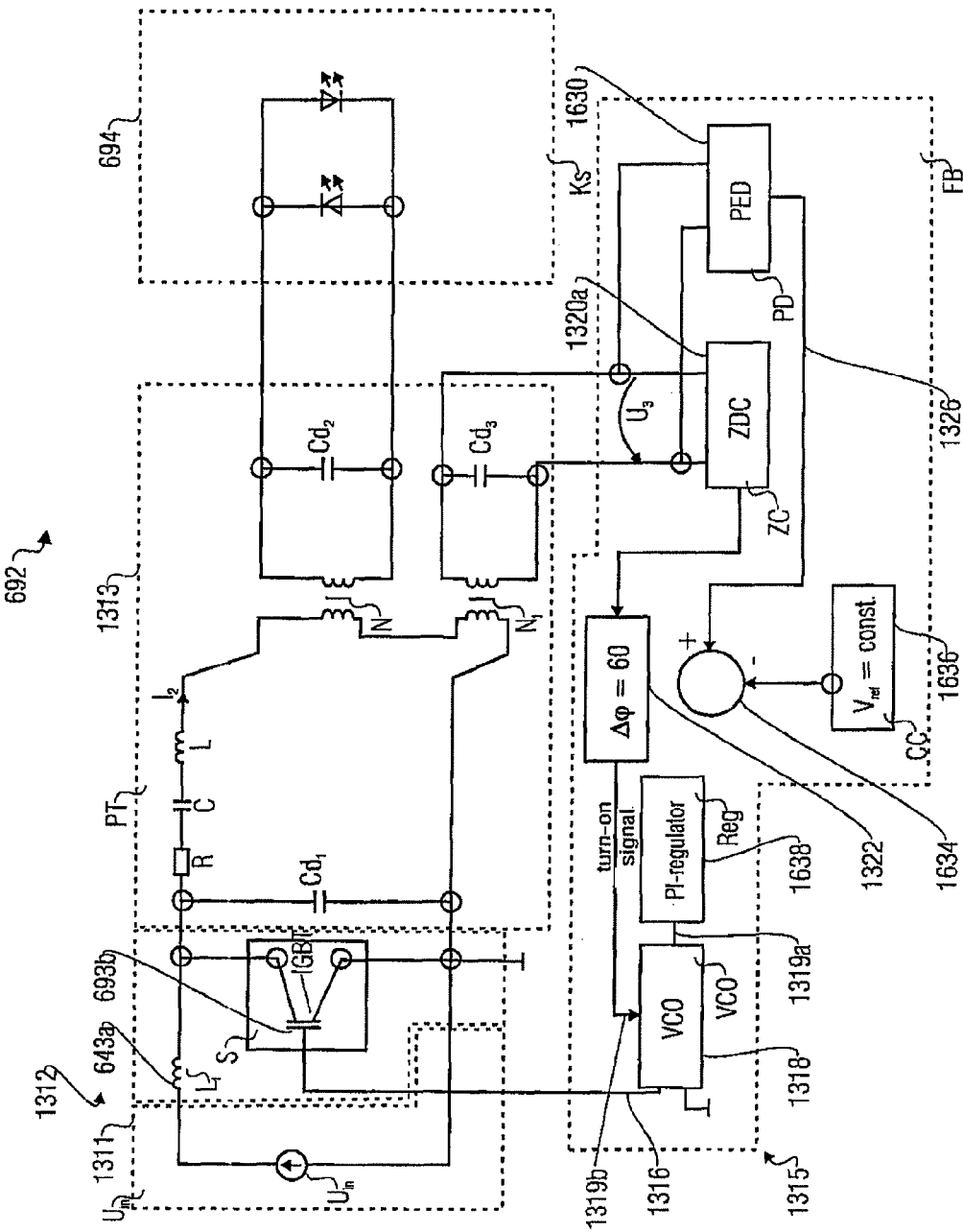
FIG. 6c is a block diagram of an inventive circuitry according to a fifth embodiment of the present invention.

FIG. 16 shows a graphical illustration of measurement results in a circuitry with auxiliary tap ZA according to FIG. 6c and FIG. 15 for synchronizing the turn-on moment and for regulating via a peak detector PED 1630 and a comparator 1637 when using a constant reference $U_R$ in block RW 1636, for regulating an approximately constant output current around an operating point of the right curve range >400 mA that a LED forward voltage $U_0$ of about 2.5 V, and a load current $I_0$ of about 530 mA, independent of the input voltage.

The graphical illustration of FIG. 16 is designated by 1600 in its entirety.

An abscissa 1610 shows an output current Iout in a range between 0 and 800 mA (wherein the output current Iout corresponds, for example, to a current through a load coupled to the output of the resonant transformer arrangement). An ordinate 1612 shows an output voltage Vout (which corresponds, for example, to a voltage $U_0$ at a load coupled to the output of the resonant transformer arrangement) in a range between 0 and 20 Volt.

A first curve 1620 describes the output voltage Vout in dependence on the output current Iout for an input voltage or input alternating voltage Vin, respectively, of 120 V alternating voltage. A second curve 1620 describes the output voltage Vout in dependence on the output current Iout for an input alternating current Vin of 230 V.

Further, an operating range 1630 of a constant current load is shown in the graphical illustration 1600.

Figure 5A:
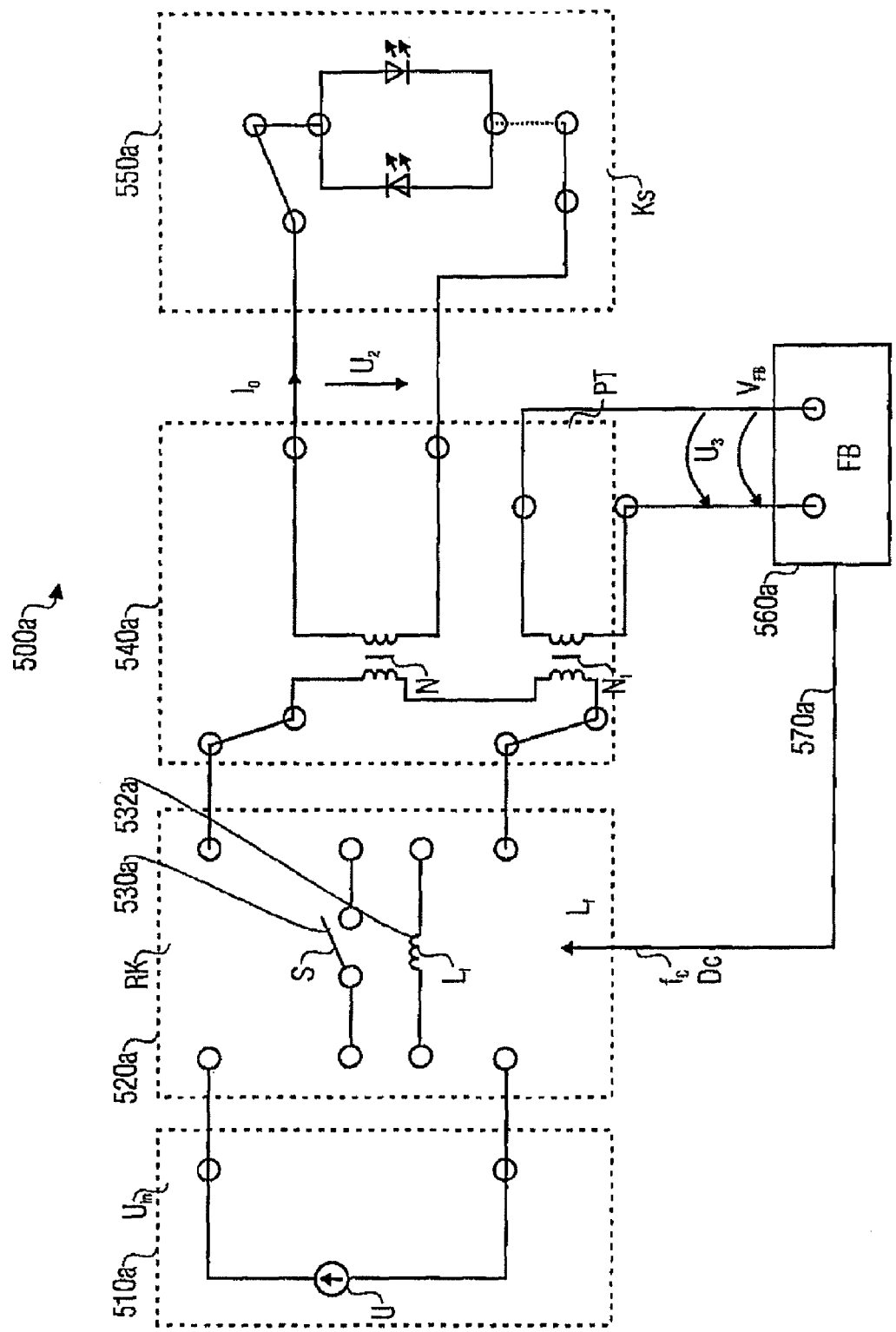
FIG. 5a is a block diagram of an inventive circuitry according to a second embodiment of the present invention.

In the following, with reference to FIGS. 5A and 5B, the inventive concept will be illustrated again in general. The circuitry according to FIG. 5A is designated by 500a in its entirety. The circuitry 500a comprises a voltage source 510a, which provides an input voltage $U_{in}$, and which is coupled to a converter means 520a (RK). The converter means 520 comprises, for example, a controlled switch 530a (S), and additionally, possibly, further reactive components, such as an inductance 532a ($L_f$). Thus, the converter means 520a forms, for example, a half bridge circuit, as has already been described above, or a class E converter, as has also already been described above. An output of the converter means 520a is further coupled to an input of a piezo transformer 540a, which is represented here by a simplified equivalent circuit diagram. Further, a load 550a is coupled to an output of the piezo transformer 540a, which comprises, for example, at least two light-emitting diodes (LEDs) connected in antiparallel, an antiparallel connection of two chains of light-emitting diodes or another load described in the above description.

An auxiliary output of the piezo transformer 540a, where an auxiliary signal $U_3$ is applied, is coupled to an input of a feedback circuit 560a. Thus, an input voltage $V_{FB}$ of the feedback circuit 560a corresponds to the auxiliary signal $U_3$.

Further, the feedback circuit 560a provides a control signal 570a to the converter means 520a, wherein the control signal 570a controls, for example, turning on and/or turning off of the switch 530a.

In summary, it can be noted that the voltage source 510a of the power source 2120 corresponds to the voltage source 1311 or the power source 1510, respectively.

Further, the converter means 520a corresponds to the combination of input network and switch unit 2120 or the unit 1312, respectively. The piezo transformer 540a corresponds to the resonant transformer arrangement 2130, 1300 or 1313, respectively. The load 550a corresponds, for example, to the load 2136 or the load 1316, respectively. Otherwise, the regulation means 560 corresponds to the control circuit 2150 or 1315, respectively.

FIG. 5b shows a block diagram of an inventive regulation means according to an embodiment of the present invention. The regulation means of FIG. 5b is designated by 560a in its entirety and represents a realization of the regulation means 560a according to FIG. 5a. The regulation means 560a receives the auxiliary signal $U_3$ from the auxiliary output of the piezo transformer 540a as input signal $V_{FB}$ and provides a pulse width modulated signal $V_{PWM}$ as output signal, which forms the control signal 570a. The regulation means comprises a synchronization means 580a, which is designed to detect zero crossings of the input signal $V_{FB}$ and to provide a turn-on signal 582a, which has, for example, a predetermined phase shift with regard to the zero crossings of the input signals $V_{FB}$, as has already been described above. Further, the regulation means 560a comprises a reference value comparator or a reference voltage subtracter 584a, respectively, which receives the input signal $V_{FB}$ or information about an amplitude, an average value or an effective value of the input signal $V_{FB}$ and subtracts a reference value $V_{ref}$ therefrom. Thus, a difference signal 586a is formed, which carries information whether a voltage of the auxiliary signal $U_3$ (with regard to an amplitude of an average value or an effective value) is higher or smaller than the value described by the reference value $V_{ref}$. Further, a regulator 588a receives the reference signal 596a and is designed to generate frequency information 590a based on the difference signal 586a.

An adjustable oscillator 592a (for example in the form of a voltage-controlled oscillator or an oscillator with a digitally adjustable frequency) receives the frequency information 590a as well as the turn-on signal 582a and generates the pulse width modulated signal $V_{PWM}$. It should be noted that the synchronization means 580a corresponds, for example, to the reference value detector or zero crossing detector 2170, respectively, as well as the phase shifter 2172 according to FIG. 12. Otherwise, the synchronization means 580a corresponds, for example, also to the reference value comparator 1320a as well as the phase shifter 1322 according to FIGS. 13b, 14 and 15.

Further, the comparator or difference determiner 584a corresponds, for example, to the comparator or difference determiner, respectively, shown with regard to FIG. 12, the comparator or difference determiner 1327 according to FIGS. 13b and 14, or the difference determiner 1634 according to FIG. 15, respectively. The regulator 588a corresponds, for example, to the regulator 2199 according to FIG. 12 (possibly together with the phase detector 2170, the reference value comparator 2180 and the phase detector 2184, the functional network 2190 and the reference value provision means 2196). Otherwise, the regulator 588a corresponds, for example, to the regulator 1330 according to FIG. 13 (possibly in connection with the regulation parameter provision means 1328 as well as, for example, optionally, the reference value comparator 1320a, 1321a, the phase detector 1323, the functional network 1325 and/or the reference value comparator 1327). Further, the regulator 588a corresponds, for example, to the regulator 1430 according to FIG. 14 (possibly in connection with further units providing input signals of the regulator 1430). Further, the regulator 588a corresponds to the regulator 1638 according to FIG. 15.

The (voltage-) controlled oscillator 592a corresponds, for example, to the driver unit 2160, the driver 1318 or the controlled oscillator 1452.

Further, the reference value $V_{ref}$ corresponds to the reference value 2192 according to FIG. 12, the reference voltage $U_R$ according to FIGS. 13b and 14 or the reference voltage $U_{ref}$ according to FIG. 15, respectively.

FIG. 6c shows a circuit diagram of an inventive circuitry according to a further embodiment of the present invention. The circuitry according to FIG. 6c is designated by 692 in its entirety. The circuitry 692 according to FIG. 6c corresponds substantially to the circuitry 1600 according to FIG. 15, so that the same means or signals are designated by the same reference numbers. Thus, only the differences between the circuitry 692 and the circuitry 1600 are described here.

It should be noted that the input network 1312 according to the circuitry 692 is implemented as class E converter. In other words, a first terminal of the voltage source 1311 is coupled to a first terminal of an inductance 693a ($L_f$). A second terminal of the inductance 693a is coupled to a collector terminal of an IGBT transistor 693b, as well as to a first input terminal of the piezo transformer 1313. Further, a second terminal of the voltage source 1311 is coupled to an emitter terminal of the IGBT transistor 693b as well as to a second input terminal of the piezo transformer 1313. Thus, the IGBT transistor 693b operates as switch. Further, a control terminal or gate terminal, respectively, of the IGBT transistor 639b receives the control signal 1316 from the voltage-controlled oscillator or driver 1318, respectively.

Further, it should be noted that the load 1616 according to FIG. 15 is replaced by a load 694 in the circuitry 692, which can comprise, for example, two light-emitting diodes connected in antiparallel, or another load described in the present specification. Further, it should be noted that the phase detector 1642 as well as the burst mode regulator 1646, for example, are omitted in the circuitry 692.

Further, it should be noted that in the circuitry 692, the reference voltage provided by the reference value provision means 1636 is designated by $V_{ref}$ while the reference voltage in FIG. 15 is designated by $U_{ref}$. However, the reference voltages $U_{ref}$ and $V_{ref}$ are to be considered as equivalent.

Otherwise, it should be noted that the piezo transformer 1313 in FIGS. 6c and 13 is illustrated by different equivalent circuit diagrams. However, this represents no structural difference.

Figure 7C:
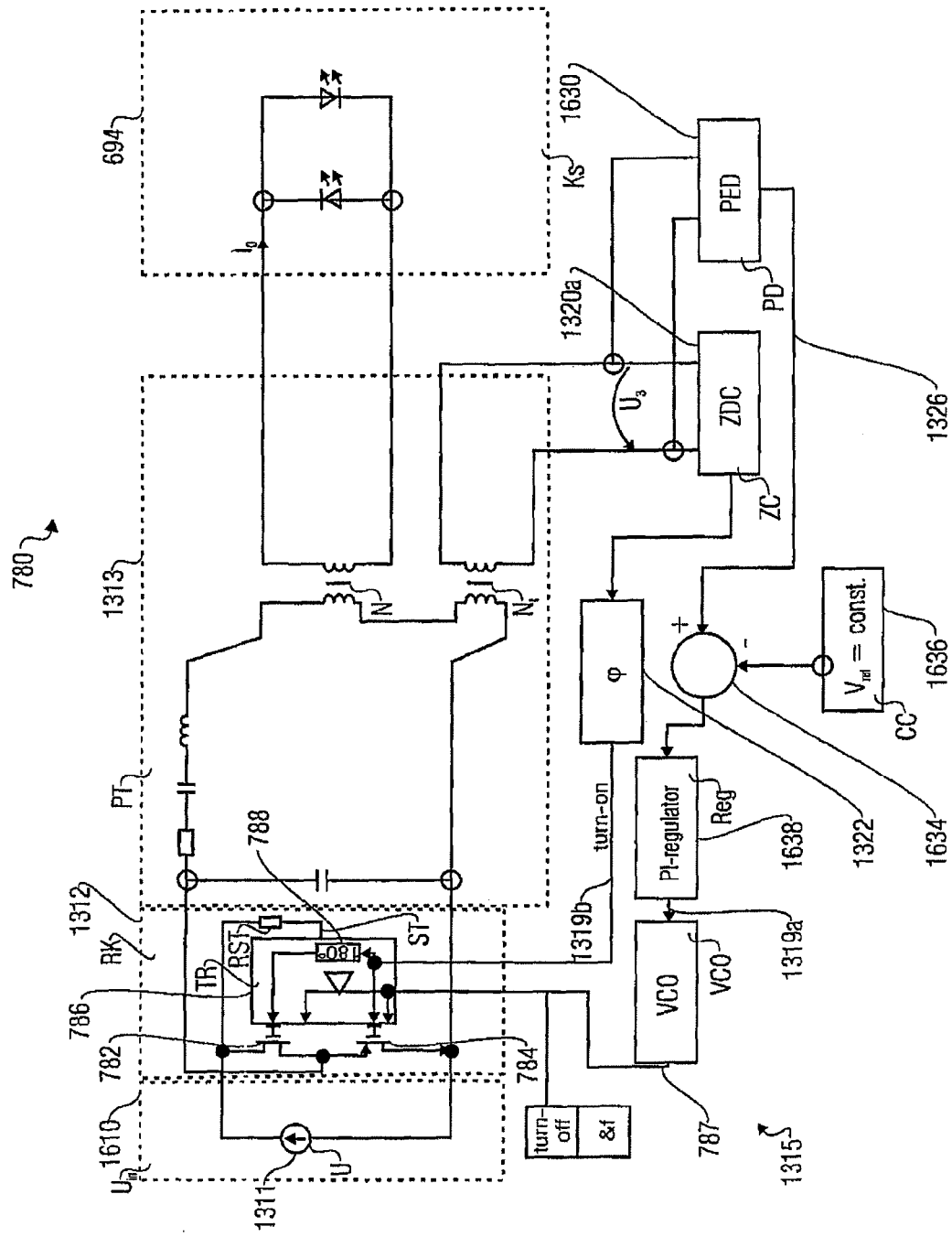
FIG. 7c is a block diagram of an inventive circuitry according to an eight embodiment of the present invention.

FIG. 7c shows a block diagram of an inventive circuitry according to a further embodiment of the present invention. The circuitry of FIG. 7c is designated by 780 in its entirety is designated by 780 in its entirety, and has significant similarities to the circuitries 692 according to FIGS. 6c and 1600 according to FIG. 15. Thus, equal means and signals are designated by the same reference numbers and are not explained again here. Rather, only the differences between the above-mentioned circuitries are described. The circuitry differs from the circuitry 692, for example, in that the input network 1312 in the circuitry 780 has a different structure than the input network 1312 in the circuitry 692. In the circuitry 780, the input network comprises a half bridge, which comprises two switches formed by transistors or field-effect transistors, respectively. Thereby, a first switch 782 and a second switch 784 are connected in series between a first terminal of the voltage source 1311 and a second terminal of the voltage source 1311. In other words, a drain terminal of the first field-effect transistor 782 is coupled to the first terminal of the voltage source 1311. A source terminal of the first field-effect transistor 782 is coupled to a drain terminal of the second field-effect transistor 784. A source terminal of the second field-effect transistor 784 is coupled to the second terminal of the voltage source 1311. The source terminal of the first field-effect transistor 1382 and the drain terminal of the second field-effect transistor 784 are further coupled to a first input terminal of the piezo transformer 1311. The second terminal of the voltage source 1311 is further coupled to a second input terminal of the piezo transformer 1313.

Control terminals or gate terminals, respectively, of the first field-effect transistor 782 and the second field-effect transistor 784 are further coupled to a driver 786. The driver 786 receives separately a turn-on signal 1319b as well as turn-off signal 787. A voltage-controlled oscillator or an oscillator 788 adjustable in frequency, respectively, generates the turn-off signal based on the frequency information 1319a provided by the regulator 1638. Thereby, the turn-on signal 1319b initiates turning on of a specific one of the two field-effect transistors 782, 784. The turn-off signal 787, however, determines turning off of a specific one of the two field-effect transistors 782, 784. Further, apart from the turn-off moments, the turn-off signal 787 also describes the frequency or operating frequency f, respectively. Further, the driver 786 is designed to control the two field-effect transistors 782, 784 with a phase shift of 180° to each other, which can be obtained, for example, by a delay means 788 included in the driver.

Figure 7D:
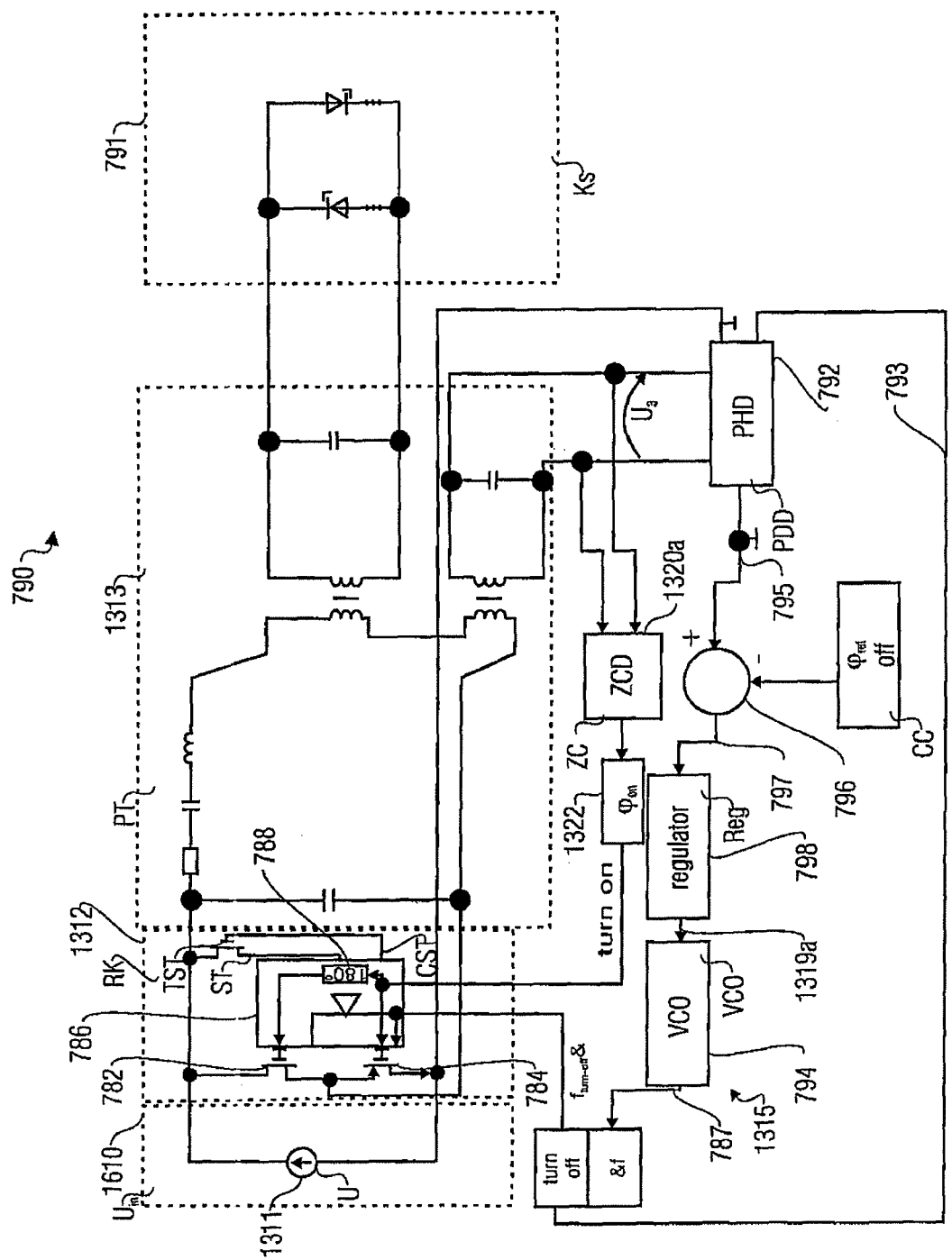
FIG. 7d is a block diagram of an inventive circuitry according to a ninth embodiment of the present invention.

FIG. 7d shows a block diagram of an inventive circuitry according to a further embodiment of the present invention. The circuitry according to FIG. 7d is designated by 790 in its entirety. The circuitry 790 according to FIG. 7d is very similar to the circuitry 780 according to FIG. 7c and the circuitry 160 according to FIG. 15, so that same means in the circuitry 790 are designated by the same reference numbers as in the circuitries 780, 1600. However, it should be noted that certain differences exist between the circuitries 780, 790, which will be discussed below.

In the circuitry 790, a first input terminal of the piezo transformer 1310 is coupled to the first terminal of the voltage source 1311, while a second input terminal of the piezo transformer 1310 is coupled to the source terminal of the first field-effect transistor 782 and the drain terminal of the second field-effect transistor 784. Further, the circuitry 790 has a load 791, which is altered compared to the load 694. Generally, the load 791 comprises an antiparallel connection of two diode elements, wherein, for example, resistive load elements can be connected in series to the diode elements.

Further, the circuitry 790 differs significantly from the circuitry 780 with regard to regulation. According to the circuitry 790, a phase detector 792 receives both the auxiliary signal $U_3$ from the auxiliary output of the piezo transformer 1330, and a signal 793, which indicates when at least one of the field-effect transistors 782, 784 is to be turned off. In other words, the signal 793 describes turn-off moments of at least one field-effect transistor 782, 784. The signal 793 can be based, for example, on the turn-off signal 787 provided by the frequency-controlled oscillator 794. The phase detector 792 is designed to determine a phase shift between the signal 793 and the output voltage $U_3$ at the auxiliary output of the piezo transformer 1313. The phase shift is designated by 795. A comparator or difference determiner 796, respectively, receives the phase difference 795 and compares the phase difference 795 with a phase difference reference value $\phi_{OFF,ref}$. In other words, the phase comparator or difference determiner 796, respectively, can be designed, for example, to determine a difference 797 between the phase difference 795 and the phase difference reference value $\phi_{OFF,ref}$. A regulator 798 receives the difference 797 and generates the frequency information 1319a based on the difference 797, to adjust the difference 797, for example, to a predetermined value or to zero.

In other words, the regulating circuit, consisting of the phase detector 792, the difference determiner 796, the regulator 798, is designed to regulate a phase difference between turn-off moments when one of the field-effect transistors 782, 784 is turned off, and a zero crossing of the auxiliary signal $U_3$ to the predetermined value $\phi_{OFF,ref}$. The regulation is performed according to the circuitry 790, which means not by using an amplitude, an average value or an effective value of the auxiliary signal $U_3$, but by using a phase difference between turn-off moments, when at least one of the switches or field-effect transistors 782, 784 is turned off, and the auxiliary signal $U_3$. Further, it should be noted that zero crossings of the auxiliary signal $U_3$ do not necessarily have to be evaluated, but that a phase difference between the turn-off moments and moments when the auxiliary signal $U_3$ reaches a predetermined value, can be detected by the phase detector 792 and used for regulation.

Figure 8A:
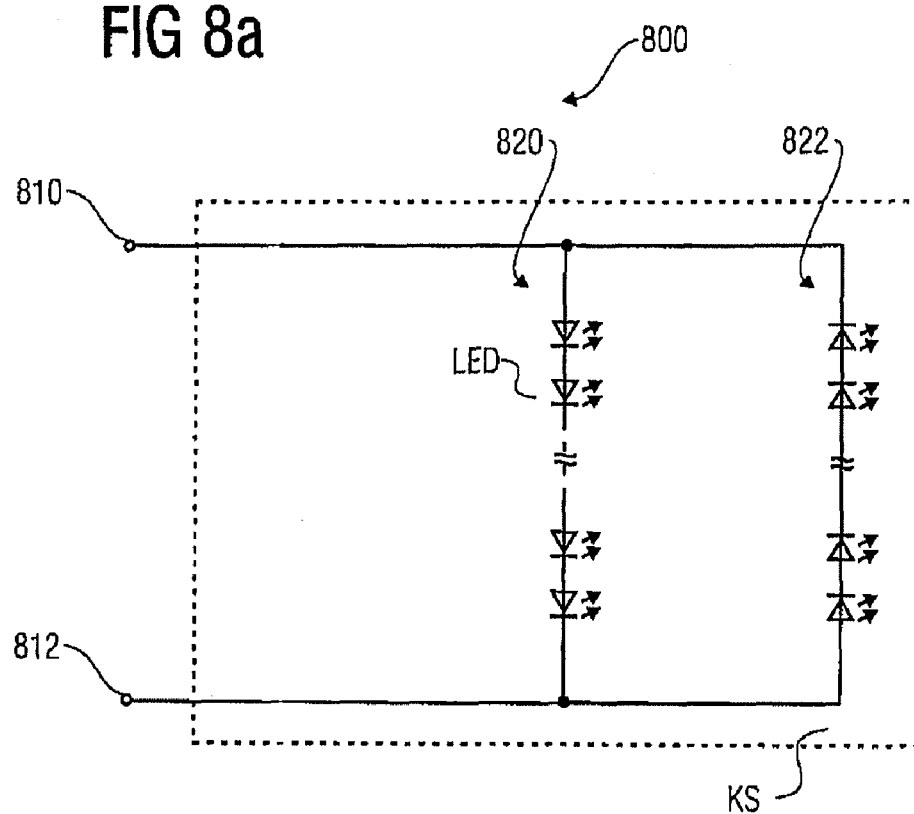
FIG. 8a is a circuit diagram of a load consisting of a parallel connection of two LED chains connected in antiparallel for usage in connection with the inventive circuitry.

In the following, different possibilities for the load or load arrangement, will be described. FIG. 8a shows a circuit diagram of an exemplary load for usage in an inventive circuitry. The load according to FIG. 8a is designated by 800 in its entirety, and can be connected to the output of the piezo transformer of the inventive circuitry like the loads described with regard to FIGS. 8b, 9, 10 and 11.

The load 800 comprises a parallel connection of a first branch 820 and a second branch 822 between a first terminal 810 and a second terminal 812. The first branch 820 comprises at least one light-emitting diode, but preferably a series connection of a plurality of light-emitting diodes, wherein the series connection of a plurality of light-emitting diodes is referred to as chain of light-emitting diodes (short: LED chain). The light-emitting diodes of the first branch 820 are all connected in a first orientation, so that a current in forward direction flows through the light-emitting diodes of the first branch, when a potential at the first terminal 810 of the load 800 is higher than the potential of the second terminal 812 of the load 800. The second branch 822 comprises at least one light-emitting diode, but preferably a series connection of a plurality of light-emitting diodes, which are all connected in a second orientation between the first terminal 810 and the second terminal 812. Thereby, the second orientation is opposite to the first orientation, so that a current in a forward direction flows through light-emitting diodes of the second branch 822, when the potential at the second terminal 812 of the load 800 is higher than the potential at the second terminal 810 of the load 800. In other words, in a preferred embodiment, the load 800 comprises a connection of two LED chains connected in antiparallel. In a preferred embodiment, all light-emitting diodes of the two LED chains 820, 822 are similar, and the two branches 820, 822 have the same number of light-emitting diodes connected in series. Thereby, it is obtained, for example, that the inventive circuitry is loaded symmetrically, and that further all light-emitting diodes have the same brightness.

Figure 8B:
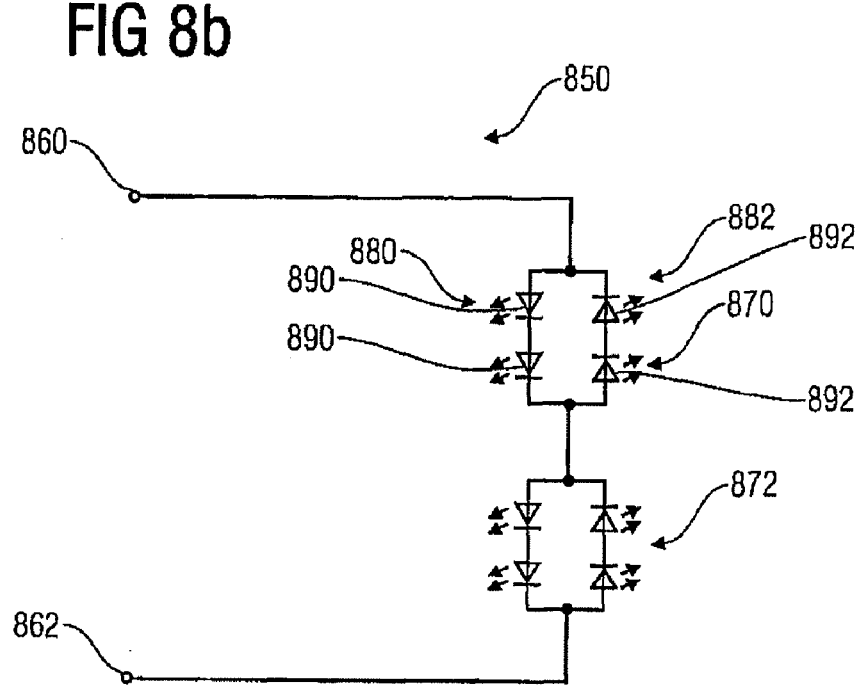
FIG. 8b is a circuit diagram of a load consisting of a series connection of two parallel connections of two LED chains connected in antiparallel, for usage in connection with the inventive circuitry.

FIG. 8b shows a circuit diagram of a further load for usage in the inventive circuitry. The load according to FIG. 8b is designated by 850 in its entirety. A series connection, consisting of a first load section 870 and a second load section 872, is connected between a first terminal 860 and a second terminal 862 of the load 850. The two load portions 870 and 872 are constructed similarly with regard to their basic structure, so that only the first load section 870 will be described in detail. The first load section 870 comprises a parallel connection of a first branch 880 as well as a second branch 882. The first branch 880 comprises, for example, a light-emitting diode or a series connection of a plurality of light-emitting diodes 890. Analogously, the second branch 882 comprises a light-emitting diode or a series connection of a plurality of light-emitting diodes 892. Apart from that, the light-emitting diodes 890 of the first branch 880 are connected in antiparallel to the light-emitting diodes 892 of the second branch 882, so that a current in forward direction flows through the light-emitting diodes 890, when the potential at the first terminal 860 is higher than the potential at the second terminal 862, and so that a current in forward direction flows through the light-emitting diodes 892, when the potential at the second terminal 862 of the load 850 is higher than the potential at the first terminal 860 of the load 850.

In a preferred embodiment, the first branch 880 comprises exactly one light-emitting diode 890, and the second branch 882 exactly one light-emitting diode 892 connected in antiparallel thereto, wherein the light-emitting diodes 890, 892 are structured similarly, except for manufacturing tolerances.

The load 850 according to FIG. 8b has the advantage that during short circuit of a branch (for example branch 880 or branch 882), the whole section 870 is short-circuited. Thus, the section 870 behaves symmetrically. However, in that case, at least one further section (e.g. the section 872) is available, the diodes of which can still emit light energy. Thus, the inventive load 850 has a particularly high error tolerance.

Figure 9:
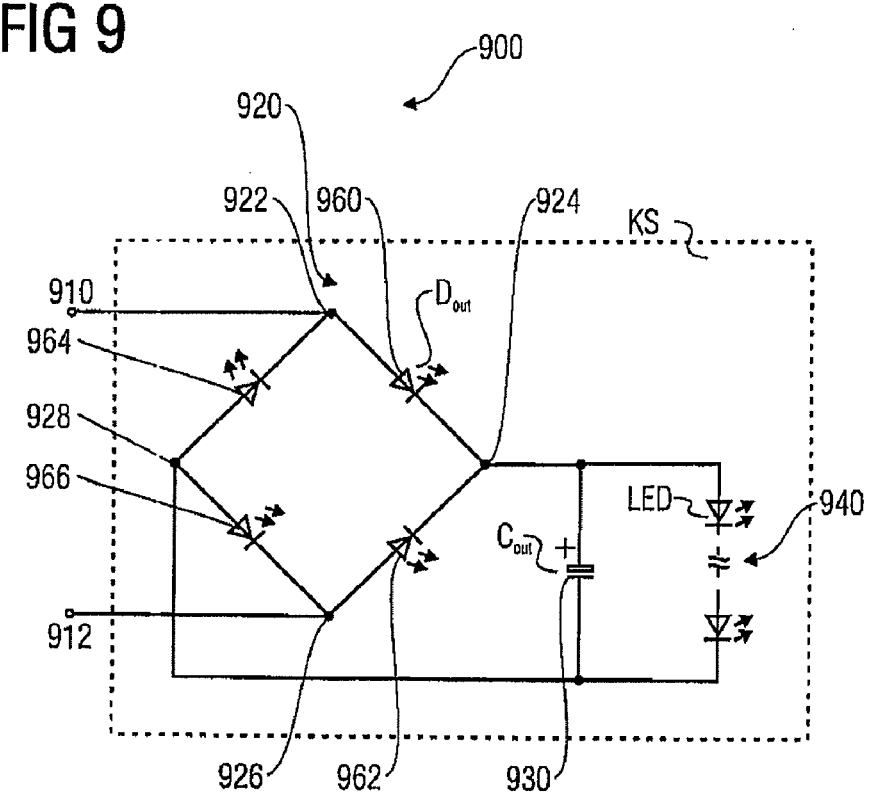
FIG. 9 is a circuit diagram of a load consisting of a bridge rectifier of light-emitting diodes, a capacitance and an LED chain for usage in an inventive circuitry.

FIG. 9 shows a circuit diagram of a load for usage in an inventive circuitry. The load according to FIG. 9 is designated by 900 in its entirety. The load 900 has a first input terminal 910 as well as a second input terminal 912. The first input terminal 910 is coupled to a first input terminal of a bridge rectifier 920, and the second terminal 912 of the load 900 is coupled to a second input terminal of the bridge rectifier 920. A first output terminal of the bridge rectifier 920 is coupled to a first terminal of a capacitance 930, and a second output terminal of the bridge rectifier 920 is coupled to a second terminal of the capacitance 930. Further, at least one light-emitting diode, but preferably a series connection of several light-emitting diodes is connected in parallel to the capacitance 930. The series connection or chain of light-emitting diodes, respectively, is designated by 940.

Further, the bridge rectifier 920 comprises four branches formed by luminescent diodes, or at least comprising luminescent diodes. In other words, at least one luminescent diode 960, whose anode terminal is coupled to the first input terminal 922 and whose cathode terminal is coupled to the first output terminal 924, is connected between the first input terminal 922 of the bridge rectifier 920 and in the first output terminal 924 of the bridge rectifier 920. Further, a light-emitting diode 962, whose anode terminal is coupled to the second input terminal 926, and whose cathode terminal is coupled to the first output terminal 924, is connected between the second input terminal 926 of the bridge rectifier 920 and the first output terminal 924 of the bridge rectifier 920. Further, a light-emitting diode 964, whose anode terminal is coupled to the second output terminal 928, and whose cathode terminal is coupled to the first input terminal 922, is connected between the first input terminal 922 and the second output terminal 92. Further, a light-emitting diode 966, whose anode terminal is coupled to the second output terminal 928, and whose cathode terminal is coupled to the second input terminal 926 of the rectifier or the bridge rectifier 920, respectively, is connected between the second input terminal 926 and the second output terminal 928.

Thus, the inventive load 900 allows a direct current operation of the light-emitting diodes of the chain 940, which can possibly result in an improved light efficiency and/or an improved life span of the corresponding light-emitting diodes. Providing the corresponding rectified voltage is not performed by a conventional rectifier, but by a bridge rectifier 920 consisting of light-emitting diodes. Thus, the usage of conventional diodes is not required, and the bridge rectifier 920 can be realized, for example, with the help of the same or similar light-emitting diodes as the chain 940 of light-emitting diodes. Further, the bridge rectifier 920 also generates light directly, since light-emitting diodes are inserted in the bridge rectifier 920. Thus, no other devices as light-emitting diodes are used in the circuitry 900, except the capacitance 930. This is of particular advantage, particularly for illumination purposes, since in some cases a density of light-emitting elements, which is as high as possible, is desirable.

In other configurations, the usage of additional, non-light emitting elements can be less problematic. In that case, the bridge rectifier 920 can, for example, in addition to the light-emitting diodes, comprise conventional diodes, which can, for example, be connected in series to the light-emitting diodes. In other words, the light-emitting diode 960 (as well as the light-emitting diodes 962, 964, 966) can, for example, be replaced by a series or parallel connection of several light-emitting diodes or a series or parallel connection of one or several light-emitting diodes with one or several conventional diodes. Thus, for example, the reverse disruptive strength of the bridge rectifier or the efficiency of the bridge rectifier can be increased.

Figure 10:
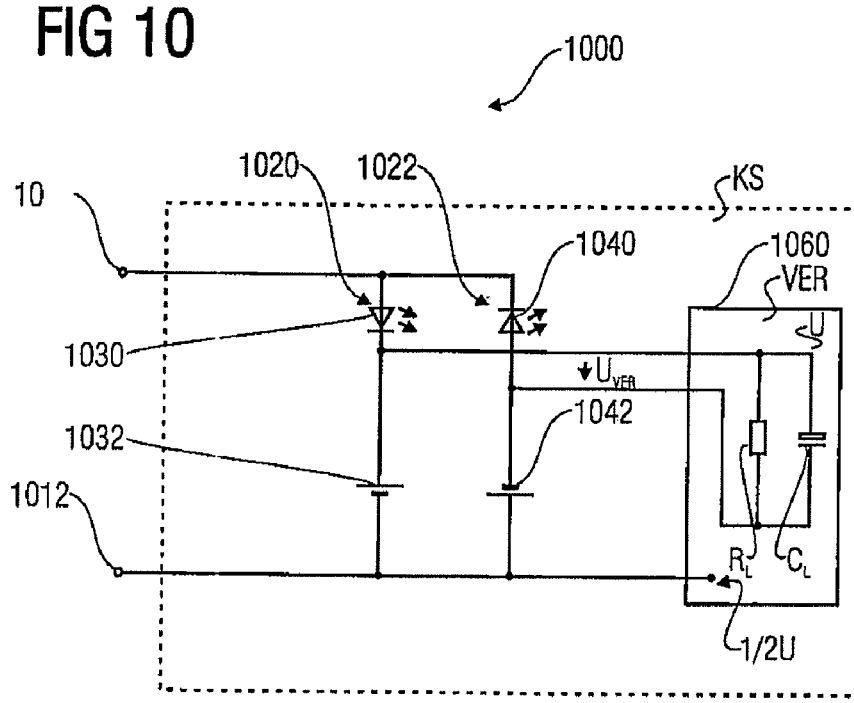
FIG. 10 is a circuit diagram of a load consisting of two accumulators for usage in the inventive circuitry.

FIG. 10 shows a circuit diagram of a further load for a usage in an inventive circuitry. The load of FIG. 10 is designated by 1000 in its entirety. The load 1000 has a first terminal 1010 as well as second terminal 1012, wherein the first terminal 1010 and the second terminal 1012 can, for example, be coupled to the output of the piezo transformer. The load 1000 comprises a parallel connection of two branches 1020, 1022 between the first terminal 1010 and the second terminal 1012. The first branch 1020 comprises a series connection of a first diode 1030 as well as a first accumulator 1032. An anode terminal of the first diode 1030 is coupled to a first terminal 1010 of the load 1000, and a cathode terminal of the first diode 1030 is coupled to a positive terminal of the first accumulator 1032. A negative terminal of the first accumulator 1032 is further coupled to the second terminal 1012 of the load 1000. The second branch 1022 of the load comprises a series connection of a second diode 1040 as well as a second accumulator 1042. A cathode terminal of the second diode 1040 is coupled to the first terminal 1010 of the load 1000, and an anode terminal of the second diode 1040 is coupled to a negative terminal of the second accumulator 1042. A positive terminal of the second accumulator 1042 is further coupled to the second terminal 1012 of the load 1000, as well as to the negative terminal of the first accumulator 1032. Further, an electrical load 1060 is coupled to the positive terminal of the first accumulator 1032 as well as to the negative terminal of the second accumulator 1042.

Further, the electrical load 1060 comprises, for example, a parallel connection of a resistor 1062 or a corresponding resistive load, respectively, as well as capacitance 1064. Further, the electrical load 1060 can be coupled to a negative terminal of the first accumulator or the positive terminal of the second accumulator 1042, respectively.

The inventive circuitry or load 1000, respectively, has the advantage that in dependence on a polarity of a voltage applied between the first input 1010 and the second input 1012, either the first accumulator 1032 or the second accumulator 1042 is charged via the associated diodes 1030, 1040. If, further, an alternating voltage signal is applied between the terminals 1010, 1012, alternating or in short succession, the two accumulators 1032, 1042 will be charged alternating or in short succession.

Further, the inventive circuitry has the advantage that a voltage can be tapped between the positive terminal of the first accumulator 1032 and the negative terminal of the second accumulator 1042, which is approximately twice as high as an amplitude of the alternating current signal applied to the terminals 1010, 1012. Thus, the inventive load or circuitry 1000, respectively, allows the provision of a voltage $U_{VER}$ to the electrical load 1060, which is higher than the voltage available in conventional charging circuits.

Figure 11:
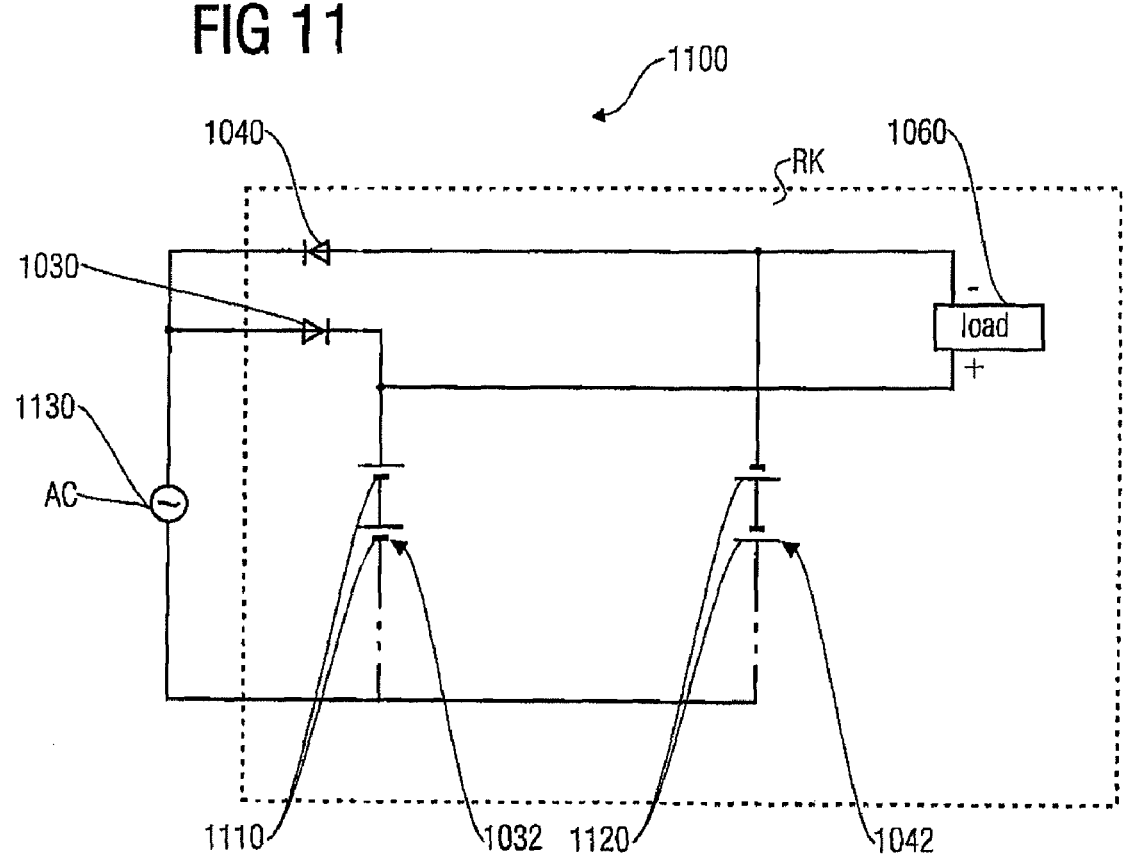
FIG. 11 is a circuit diagram of a further load with two accumulators for usage in the inventive circuitry.

FIG. 11 shows a block diagram of a further load for usage with the inventive circuitry. The circuit of FIG. 11 is designated by 1100 in its entirety and corresponds substantially to the load 1000 according to FIG. 10. Thus, the same means are designated with same reference numbers.

FIG. 11 illustrates that, for example, the first accumulator 1032 can be replaced by a series connection of several individual accumulators 1110. Further, the second accumulator 1042 can also be replaced by a series connection of several individual accumulators 1120. An alternating voltage source can be connected between the terminals 1010, 1012 of the load 1000, which is designated by 1130. The alternating voltage source 1130 can also be formed by the output of a piezo transformer.

In the following, important central ideas of the present invention will be summarized again. In circuitries, where feedback from an output to the converter means is desired or required, respectively, the feedback can be performed, for example, according to the circuitry 500 of FIG. 5*a* from a tap or an auxiliary output of the piezo transformer 540 across a low-side sense voltage. If a branch of the load 550 or a branch of an electrical load, respectively, fails (no-load operation), a higher voltage occurs (compared to normal operation) at the output of the piezo transformer 540 (for example at the output coupled to the load 550, or also the auxiliary output), which still causes a reduction of the power and thus a reduction of the input current. In other words, if the load 550 fails fully or partly, so that the resistor 550 of the load increases, the voltage at the output of the piezo transformer increases with constant excitation of the piezo transformer 540 on the input side. Still, less overall power is consumed in the load 550, so that the input current of the piezo transformer 540 is reduced.

Further, the phase position of the current (for example the output current $I_O$ or a load current $I_L$, which flows into a load circuit of the piezo transformer), can be observed via the tap of the piezo transformer or via the auxiliary output of the piezo transformer 540, respectively, in comparison to a turn-off moment of the switch 530 or switches (in the converter means 520), respectively, and thus, a quantity of a remaining load can be incurred at the failure of an electrical load branch, to further maintain the current constant in the remaining load, by adapting the reference voltage of the sense voltage corresponding to the phase position.

In other words, by determining a phase difference between turn-off moments, when the switch 530 of the switch unit of the converter means or several switches of the switch unit of the converter means 520 are turned off, and a phase position of the auxiliary voltage $U_3$ at the auxiliary output of the piezo transformer 540, a measure for a quantity of the load 550 can be determined. The information about the quantity of the load, which is determined from the above-mentioned phase differences between the turn-off moments of the mentioned switches and, for example, zero crossing moments of the auxiliary voltage $U_3$, can then be used to determine whether the load has a nominal quantity or has altered or increased or decreased, respectively, with regard to the nominal quantity. If, for example, it is determined in a load determination means, that the load deviates from the nominal quantity by more than a maximum deviation, a reference quantity (e.g. a reference voltage or a reference current) can be adapted. In other words, the load determination means is preferably designed to determine by comparing the above-mentioned phase difference with one or several thresholds, in which of at least two phase-difference intervals the measured or determined phase difference lies. Thereby, different discrete quantities of the load are associated to the different intervals. This is advantageous, since it is assumed that the load does not change continuously, but that, for example, a certain part of the load fails, wherein the load as a whole is subject to manufacturing tolerances. In dependence on the quantity of the load determined based on the above-mentioned threshold comparison, then, a reference quantity (for example a reference voltage or reference current) is adjusted, wherein the reference quantity defines a target value of the output current $I_O$ or a regulation aim of the feedback means or regulation means 560, respectively.

By appropriately regulating the frequency or operating frequency f, respectively, for controlling the converter means or converter circuit 520 (RK), respectively, via detecting the input current, the same is approximately maintained constant, since it slowly rises during load reduction, and is turned off a little later by a reference RS. Thus, an approximately constant current occurs again at the output, wherein the remaining electrical loads can carry a higher current.

If, however, part of the electrical loads is short circuited, the current at the input of the piezo transformer 540 rises faster and is turned off earlier by a reference RS. Thus, with smaller output impedance, still no higher power is transmitted, so that the remaining electrical loads emit approximately the same power. The same applies in an alleviated way when the electrical loads change their impedance over time by voltage variation at the output of the piezo transformer 540, so that they can still be operated with constant current.

Further, FIG. 6*a* shows such a regulator circuit for adjusting a constant current, by detecting the input current, for example via a sense resistor or shunt resistor 672 (RS), and using the same for adjusting an approximately constant output current. The input current detection can be fully integrated in the driving converter RK (or in the converter means 620, respectively). In other words, regulation of the circuitry 600 can be performed, for example, merely by detecting the switch current $I_S$ through a switch of the switch unit 650, whereby it can be ensured that the switch current $I_S$ is adjusted, for example to an approximately constant average value, effective value or maximum value.

In order to improve regulation accuracy, according to FIG. 6*b*, for example, an output current detection, such as by a sensor system $R_{LS}$ or a shunt resistor 684, can be provided. By detecting phase zero crossings between output current and input current of the piezo transformer 630, and by adjusting a constant phase difference (between the input current or switch current $I_S$, respectively, and the output current $I_O$), the output current $I_O$ can also be approximately maintained constant, independent of the input voltage ($U_{in}$) and output load.

Finally, merely the output current $I_O$ itself can be detected, for example with regard to maximum value or effective value, and for example, be adjusted to a constant effective current value.

Alternatively, according to FIG. 6*c*, for example, a tap (also referred to as auxiliary output) of the piezo transformer 1313 can be used to adjust a constant current in an electrical load (for example in the load 694) via the coupled-out sense voltage (also referred to as auxiliary voltage) and, if necessary, additionally via a phase position between the turn-off moment of a switch (for example the switch 693d) and, for example, a zero crossing of the coupled-out signal (for example the auxiliary signal $U_3$).

Further, FIG. 7c shows a typical embodiment of the present invention using an inventive tap of the piezo transformer 1313 (also referred to as auxiliary output), whose voltage amplitude (which means, the amplitude of the auxiliary voltage $U_3$) is adjusted to a constant value (for example to the value of the reference voltage $U_{ref}$), to keep the current ($I_0$) in the load 694 constant, with appropriate dimensioning of the piezo transformer 1313. A zero crossing of the voltage, for example the auxiliary voltage $U_3$ of this tap, is also used to adapt the turn-on moment of the switch (for example the field-effect transistors 782, 784) to a phase position of a load circuit current ($I_S$) of the piezo transformer 1313 independent of the topology. Thus, optimum switching-on, for example in the form of zero voltage switching, of the piezo transformer 1313 is ensured. At the same time, this phase synchrony acts like in a PLL circuit, so that robust and reliable regulation becomes possible.

Further, during such a control, the phase difference between the zero crossing of the auxiliary signal ($U_3$) of the tap and the turn-off moment of one of the switches (for example the field-effect transistor 782 or the field-effect transistor 784) can be compared to a nominal value, which corresponds to a nominal load. If this nominal value changes, an electrical load has failed or a short circuit is occurred, so that in that case the reference value of the auxiliary voltage of the tap can be adapted correspondingly, to either maintain the current in the remaining load constant, while the overall current is reduced (smaller reference voltage), or even to turn off the current in the short circuit case by turning off the converter.

FIGS. 7a, 7b, 7c and 7d each show a typical load circuit or a typical load 640, 694, 791, respectively (also designated by KS), which is formed of light-emitting diodes (LED). Preferably, a bridge arrangement is used, so that during short circuit of a branch of light-emitting diodes, a balanced load of the output is maintained.

However, with a load arrangement according to FIG. 8a, at a short circuit, of a branch, imbalance occurs, which can cause higher regulation effort. If, however, a branch is interrupted, the embodiments of circuitries shown in FIGS. 7a, 7b, 8a and 8b behave in a similar way.

A number of light-emitting diodes are selected such that a voltage results across a serial branch, which can be electrically handled by the same, even in reverse direction. With an arrangement of 8 to 24 light-emitting diodes in a converter, for example, in the embodiment according to FIGS. 7a, 7b or 8b, two to six diodes can be connected in series in one branch.

FIG. 9 shows an extension of the load circuit by a bridge rectifier and a smoothing capacitor. With this load circuit, a higher device effort is accepted, in order to achieve a better light efficiency of the light-emitting diodes with such an impressed direct current, in comparison to alternating current. The embodiment according to FIG. 9 shows a rectifier bridge 920, through which alternating current flows, having diodes 960, 962, 964, 966 (also designated by $D_{out}$), which are also designed as light-emitting diodes, so that only a direct current flows through the other light-emitting diodes 940, which are connected in parallel to the smoothing capacitor 930 ($D_{out}$). Thus, only the light efficiency of the light-emitting diodes 960, 962, 964, 966, which are connected to the rectifier bridge 920, is slightly lower than the light efficiency of the light-emitting diodes 940, which are connected in parallel to the smoothing capacitor 930 ($C_{out}$), and through which direct current flows.

All arrangements according to FIGS. 7a, 7b, 7c, 7d, 8a, 8b and 9 are also suitable for dimmable embodiments, by using pulse interval control, which operates the light-emitting diodes during a pulse with full power, and switches the same off during interval times (burst mode).

In summary, it can be said that the present invention relates to controlling electronic loads requiring constant current. Particularly diodes as luminescent diodes or light-emitting diodes (LEDs) but also other light-emitting devices, such as fluorescent lamps or accumulators represent such loads. As has been explained above, according to one aspect, the present invention allows to replace the several passive devices used in conventional circuitries by at least only one element, which can at the same time be kept flat and small in its structural height. Thus, savings in structural volume and possibly in weight are obtained compared to conventional solutions.

Thus, the present invention provides a solution of the above-described problems of conventional converters, by achieving constant current regulation for one or several electrical loads, by replacing a conventional inductance by a piezoelectric transformer as transformation means. Advantages of this solution are high efficiency, low interference emission and a low number of additional devices. Particularly, all electronic control and switching functions can be monolithically integrated in a single integrated circuit (IC), such as in non-galvanically isolated systems, as they are used in motor vehicles. Further, piezo transformers can be developed in a flat design, and can be placed on a mostly free rear side of a printed circuit board (PCB), in order to save space on the front. By the possibility of a very flat design of the piezo transformer, high accelerations (such as shock and/or vibration loads) can be absorbed better by the same than by inductances, since the contact area of the piezo transformer is higher in that case. Further, the present solution allows dispensing with protection circuits against overvoltage at the input and separate short circuit protection. Since a piezo transformer only allows energy transformation via alternating voltage, the mechanical vibration of the piezo transformer with regard to its energy transmission power can be instantly reduced by a frequency change when an overvoltage occurs at the input or a short circuit occurs at the output, wherein the piezo transformer represents an electromechanically vibrating energy converter.

Further, additional smoothing capacitors and fast rectifier diodes can be omitted at the output of the piezo transformer, since the electrical loads in antiparallel connections (e.g. antiparallel LED chains) serve as rectifiers, even at high frequency, and since further no overvoltage occurs in reverse direction. Thereby, maximally, only that many electrical loads (for example light-emitting diodes) are connected in series that their summed forward voltage can be handled by its respective antiparallel chain in reverse direction. Further, the output line or output power, respectively, of a piezo transformer, can be supplied to different electrical loads, without emitting a broadband interference spectrum with regard to frequency, since a piezo transformer generates only a single output frequency. If the electrical loads are almost constant ohmic loads, a sinusoidal oscillation occurs with only one frequency, which does not stray in the frequency range of other components and/or modules by harmonics. Since a piezo transformer can also be fed by an almost sinusoidal signal on the input side, by using an appropriate resonance converter, the interference spectrum on the input side is low in harmonics, which is more difficult to achieve with a hard-switching regulator.

Further, according to one aspect, the present invention provides the advantage of saving load-side sense resistors or shunt resistors, respectively, or other current or voltage sensors for regulating a constant current. This is preferably achieved in that the output of the piezo transformer supplies a constant current, which has to be provided to the electrical load via only a single line. Feeding back of the current flow can be performed via a ground connection without any further sense lines, which would additionally be susceptible to interference. Further, no output-side sensor of the piezo transformer is required at the high-side feed to the load (for example no high-side current sensor or high-side voltage sensor), since the piezo transformer is preferably designed with a tap, which couples out the current of the resonant load circuit in the form of a sense voltage or a sense current with regard to the low side, so that a direct feedback can be performed for a regulation of a constant current into the load with respect to ground for evaluation in a control circuit. This is achieved by appropriate dimensioning a piezo transformer, in that the coupled-out sense voltage is preferably proportional to the load current.

In other words, the basic principle of the present invention is to use a piezo transformer which has an electrical equivalent diagram shown in FIG. 4 as energy transformer.

According to one aspect, the present invention provides an inductance-free half-bridge converter. By evaluating the current in a switch (for example a switch S1 or a low-side switch) by a sense resistor (for example in the resistor RS), and by a comparison with a signal from a sense output of the piezo transformer, a constant output current can be adjusted. Alternatively, the comparison can also made with the output current or a signal derived from the same via a further sense resistor $R_{LS}$, respectively.

Further, it should be noted that the main features of the disclosure of EP 0681759 B1 entitled "Resonanter Wechselrichter" as well as of DE 10259069 entitled "Resonanzkonverter für Abtransformation" could be used for improving and optimizing dimensioning and control of the inventive topologies. Also, the principle of tapping a piezo transformer, which is, for example, shown in FIG. 5a, is used for regulating a constant output current, which is also described in a very detailed way in the patent application entitled "Control Circuit for a Switch Unit of a Clocked Power Supply Circuit, and Resonance Converter" filed at the same day as the present application. In other words, the whole disclosure of the patent application entitled "Control Circuit for a Switch Unit of a Clocked Power Supply Circuit, and Resonance Converter" filed the same day is herein incorporated by reference. The above patent application describes particularly details with regard to a regulation of the inventive circuitry as well as with regard to different protection circuits.

In the following, different aspects of the present invention will be summarized again. According to one aspect, the present invention provides a control device for constant current loads, which comprises an input source ($U_{in}$), a converter means (RK), a transformation means (PT), which consists of a single device, a constant current load (KS), wherein the input source ($U_{in}$) is connected to the converter means (RK), wherein the converter means (RK) is again connected to the transformation means, wherein the transformation means (PT) is again connected to the constant current load (KS), so that merely by detecting a current in the converter means (RK) or additionally a current of the constant current load (KS) or a signal from a tap of the transformation means (PT), an approximately constant current flows through the constant current load (KS), by controlling the converter means (RK) only by a signal gained from current detection.

According to a further aspect, the control device is designed such that the transformation means (PT) is a piezoelectric transformer.

According to a further aspect, the control device is designed such that the transformation means (PT) acts according to the principle of a radial vibrating piezoelectric transformer with input and output part.

According to a further aspect, the control device is designed such that the converter means (RK) is part of a resonance converter formed of switches and possibly passive energy storage elements.

According to a further aspect, the control device is designed such that the transformation means (PT) is part of a resonance converter formed of passive energy storage elements and transformation means.

According to a further aspect, the control device is designed such that the constant current load (KS) is part of a resonance converter, which is mainly formed of ohmic loads, operated with approximately constant voltage, or formed by a constant resistor, into which constant current is impressed.

According to a further aspect, the control device is designed such that the current detection is only performed in the converter means (RK).

According to a further aspect, the control device is designed such, that the current detection is only performed in the constant current load (KS).

According to a further aspect, the control device is designed such that the current detection is performed in the converter means (RK) and the constant current load (KS).

According to a further aspect, the control device is designed such that the detected currents of the converter means (RK) and the constant current load (KS) are compared to each other with regard to their phase position in zero crossing, and a phase locked loop (PLL) is formed from the same, which changes the switching frequency of the converter means (RK) for obtaining a constant current in the constant current load (KS).

According to a further aspect, the control device is designed such that the turn-on moment of the switches with constant phase shift is generated from the zero crossing or obtaining another reference value of the auxiliary signal (HS) of the converter means (RK), and thus a phase locked loop is formed, by adapting the frequency of the driver circuit to the frequency of the transformation means (PT).

According to a further aspect, the control device is designed such that a current detection is only performed in the transformation means (PT). According to a further aspect, the control signal is designed such that the transformation means (PT) has a tap, which generates a voltage, which is proportional to the current flowing through the transformation means (PT).

According to a further aspect, the control device is designed such that the current-proportional voltage obtained from the transformation means (PT) via a tap, is adjusted to a constant value, by comparing the same to a constant reference.

According to a further aspect, the control device is designed such that the regulator for regulating the voltage occurring at the tap of the transformation means (PT) is a PI regulator.

According to a further aspect, those regulation mechanisms are used with the present invention, which are described in the above-mentioned patent application entitled "Control Circuit for a Switch Unit of a Clocked Power Supply Circuit, and Resonance Converter", which was filed together with the present patent application.

Thus, overall, the present invention provides a circuitry for advantageous operation of constant current loads and allows, according to different aspects, high efficiency, low interference emission and precise regulation.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful energy is substantially proportional to the output current; and
wherein the circuitry is designed to adjust the output current to a predetermined value; the circuitry further comprising an output current determiner for deriving an output current description signal, which is proportional to the output current, as well as an input current determiner for deriving an input current description signal, which describes a phase position of a current flow in the converter or a phase position of the alternating current signal provided to the input of the piezo transformer by the converter, as well as a regulator,
wherein the regulator is designed to control the converter to regulate a phase difference between the output current description signal and the phase position described by the input current description signal to a predetermined value.

2. The circuitry according to claim 1, wherein the input current determiner is designed to derive the input current determination signal such that the input current determination signal describes a phase position of a current flow through a switch in the converter.

3. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful energy is substantially proportional to the output current; and
wherein the circuitry is designed to adjust the output current to a predetermined value; the circuitry further comprising an input current determiner for deriving an input current description signal, which describes a quantity of a current flow in the converter or a quantity of the alternating current signal provided by the converter to the input of the piezo transformer, and a regulator,
wherein the regulator is designed to control the converter in order to regulate the quantity of the current flow in the converter or the quantity of the alternating current signal provided by the converter to the input of the piezo transformer based on the input current description signal to a predetermined value.

4. The circuitry according to claim 3, wherein the regulator is designed to adjust a frequency, by which a switch in the converter is switched for generating the alternating current signal, in order to regulate the quantity of the current flow in the converter or the quantity of the alternating current signal provided by the converter to the input of the piezo transformer based on the input current description signal to the predetermined value.

5. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful enemy is substantially proportional to the output current; and
wherein the circuitry is designed to adjust the output current to a predetermined value; wherein the piezo transformer comprises an auxiliary output for transformationally providing an auxiliary signal, whose amplitude is substantially proportional to a load alternating current through a resonant circuit of the piezo transformer, and which further comprises a regulator, which is designed to control the converter in dependence on the auxiliary signal.

6. The circuitry according to claim 5, wherein the regulator is designed to determine a phase difference between the auxiliary signal and turn-off moments when a switch in the converter, which serves to generate the alternating current signal, is turned off, and to adjust a regulation aim in dependence on the phase difference.

7. The circuitry according to claim 5, wherein the converter comprises a switch unit, which is designed to generate the alternating current signal by switching at least one switch, wherein the circuitry further comprises a driver, which can be controlled to switch the switch unit,
wherein the regulator comprises a detector, which is designed to determine amplitude information, which depends on an amplitude or an average value of the auxiliary signal, and
wherein the regulator further comprises a regulator, which is designed to change an operating frequency in dependence on the amplitude information provided by the detector, to determine a period duration between turn-off moments when the driver is to turn-off the switch unit, as reciprocal of the operating frequency.

8. The circuitry according to claim 7, wherein the detector is designed to obtain a first detector reference value crossing moment when the auxiliary signal crosses a predetermined first detector reference value, and to obtain a second detector reference value crossing moment when the auxiliary signal crosses a predetermined second detector reference value, to determine a detector phase shift between the first detector reference value crossing moment and the second detector reference value crossing moment, and to determine an approximate value for an amplitude of the auxiliary signal from the detector phase shift, which forms the amplitude information.

9. The circuitry according to claim 8, wherein the detector is designed to receive the first detector reference value crossing moment from the phase detector, and to receive the second detector reference value crossing moment from a detector reference value comparator, which is designed to compare the auxiliary signal with a detector reference voltage value or a detector reference current value, wherein the detector reference value crossing moments are defined as moments when the comparison result of the phase detector or the detector reference value comparator changes.

10. The circuitry according to claim 9, wherein the detector is designed to detect first reference value crossing moments when the auxiliary signal has a zero crossing, and to determine the approximate value for the amplitude of the auxiliary signal by evaluating the relation $$U_{RR} = \frac{UI_{R0}}{\sin(\Delta\varphi)}$$

wherein $UI_{R0}$ designates the detector reference voltage value or the detector reference current value, wherein sin designates a sinusoidal function and wherein $\Delta\varphi$ designates the detector phase shift.

11. The circuitry according to claim 7, wherein the regulator is designed to compare the amplitude information with an amplitude reference value, to obtain an amplitude comparison result, and to change the operating frequency by a change step towards a resonance frequency of the piezo transformer, when the amplitude information is smaller than the amplitude reference value, and to change the operating frequency by a change step away from the resonance frequency of the resonant transformer arrangement, when the amplitude information is higher than the amplitude reference value.

12. The circuitry according to claim 11, wherein the regulator is designed to determine the change step in dependence on the detector phase shift, such that the higher the detector phase shift, the smaller the change step.

13. The circuitry according to claim 11, wherein the amplitude reference value is a fixed predetermined value.

14. The circuitry according to claim 8, wherein the regulator is designed to determine a variable amplitude reference value based on a load-dependent correction of a fixed amplitude reference value by using the detector phase shift, and to regulate the operating frequency to minimize a deviation of the amplitude information from the variable amplitude reference value.

15. The circuitry according to claim 7, wherein the regulator is designed to regulate the operating frequency in dependence on a relation between the amplitude information and an amplitude reference value or in dependence on a difference between the amplitude information and the amplitude reference value, and to adjust the amplitude reference value such that the amplitude reference value decreases with increasing load resistance at an output of the piezo transformer.

16. The circuitry according to claim 15, wherein the regulator is designed to adjust the amplitude reference value in dependence on a turn-off angle between a zero crossing of the auxiliary signal and a moment when the switch unit is turned off.

17. The circuitry according to claim 7, wherein the detector is designed to obtain a first detector reference crossing moment when the auxiliary signal crosses a predetermined first detector reference value, to obtain a second detector reference crossing moment when the auxiliary signal crosses a predetermined second detector reference value, to determine a detector phase shift between the first detector reference crossing moment and the second detector reference crossing moments, to compare the detector phase shift with a minimum allowable detector phase shift limit, and to limit a change of the operating frequency towards a resonance frequency of the piezo transformer, when the detector phase shift reaches the detector phase shift limit or falls below the same.

18. The circuitry according to claim 7, wherein the regulator is designed to determine an updated operating frequency by determining an associated updated period duration, wherein the regulator is further designed to determine the updated period duration by incrementing or decrementing a previous period duration associated to a previous operating frequency.

19. The circuitry according to claim 7, wherein the regulator is designed to regulate the operating frequency in dependence on a relation between the amplitude information and an amplitude reference value, wherein the regulator is further designed to provide a measure for a load resistor connected to an output of the piezo transformer, and to adjust the amplitude reference value based on the measure for the load resistor such that the amplitude reference value depends on a logarithm of a value of the load resistor according to a linear context.

20. The circuitry according to claim 19, which is further designed to adjust the amplitude reference value in dependence on a forward current time period, during which a current flows in forward direction through a switch of the switch unit, and a reverse current time period, during which a current flows in a reverse direction through a switch of the switch unit, such that the amplitude reference value decreases with increasing ratio between reverse current time period and forward current time period.

21. The circuitry according to claim 20, which is further designed to adjust the amplitude reference value to a final value independent of the forward current time period and the reverse current time period, when the reverse current time period is higher than or equal to the forward current time period.

22. The circuitry according to claim 19, which is further designed to determine a reverse-time/forward-time ratio between a reverse current time period, during which a current flows in a reverse direction through a switch of the switch unit, and a forward current time period, during which a current flows in forward direction through a switch of the switch unit, and to adjust the amplitude reference value based on the reverse-time/forward-time ratio such that a large amplitude reference value is associated to a small reverse-time/forward-time ratio, and that a smaller amplitude reference value is associated to a larger reverse-time/forward-time ratio.

23. The circuitry according to claim 22, wherein the circuitry is designed to determine the amplitude reference value as linear function of the reverse-time/forward-time ratio, if the reverse-time/forward-time ratio is smaller than a predetermined value.

24. The circuitry according to claim 23, wherein the control circuit is further designed to determine the amplitude reference value independent of the reverse-time/forward-time ratio, if the reverse-time/forward-time ratio is higher than the predetermined value.

25. The circuitry according to claim 22, wherein the circuitry is designed to determine a source voltage of the energy source, and to adjust the amplitude reference value in dependence on the source voltage and the reverse-time/forward-time ratio.

26. The circuitry according to claim 25, wherein the circuitry is designed to map the reverse-time/forward-time ratio to the amplitude reference value by a linear functional context, wherein the circuitry is designed to adjust parameters of the linear functional context in dependence on the source voltage,
so that for a maximum allowable value of the source voltage, a predetermined reverse-time/forward-time ratio in a range between 0.4 and 0.7 is mapped to a predetermined amplitude reference value,
so that for a minimum allowable value of the source voltage, a reverse-time/forward-time ratio in a range between 0.0 and 0.2 is mapped to the predetermined amplitude reference value,
so that at a maximum allowable value of the source voltage, a reverse-time/forward-time ratio in a range between 0.9 and 1.0 is mapped to a minimum amplitude reference value, and
that at a minimum allowable value of the source voltage, a reverse-time/forward-time ratio in a range between 0.9 and 1.0 is mapped to the minimum amplitude reference value.

27. The circuitry according to claim 26, wherein the circuitry is designed to adjust the amplitude reference value such that a ratio between a maximum amplitude reference value and the minimum amplitude reference value lies in a range between 2.0 and 2.3.

28. The circuitry according to claim 5, wherein the converter unit comprises a switch unit, which is designed to generate the alternating current signal by switching at least one switch, wherein the circuitry further comprises:
a phase detector, which is designed to detect reference crossing moments when the auxiliary signal crosses a predetermined reference value,
a driver, which is controllable to switch the switch unit, and
a synchronizer,
wherein the synchronizer is designed to synchronize turning-on of the switch unit through the driver with regard to a phase position with the auxiliary signal, to achieve turning-on of the switch unit within a predetermined time interval around a zero crossing of a voltage across the switch unit and a current through the switch unit,
wherein the synchronizer is designed to receive information about the reference crossing moments from the phase detector, and to provide a turn-on signal with a fixed phase delay to the driver, to define turn-on moments when the driver is to turn on the switch unit.

29. The circuitry according to claim 28, wherein the synchronizer is designed to provide the turn-on signal such that the driver turns on the switch unit with a phase delay between 60° and 90° to the reference crossing moments.

30. The circuitry according to claim 28, wherein the predetermined time interval begins one twelfth of a period duration of the operating frequency prior to the zero crossing of the voltage across the switch unit, ends with the zero crossing of the voltage across the switch unit or the current through the switch unit, and comprises associated interval limits.

31. The circuitry according to claim 28, wherein the synchronizer comprises a delayer, which is designed to delay the turn-on signal by a phase delay in a range between 50° and 80° in relation to a period of the operating frequency with respect to the reference crossing moments.

32. The circuitry according to claim 28, wherein the synchronizer comprises a delayer, which is designed to delay the turn-on signal by a phase delay in the range between 60° and 70° in relation to a period of the operating frequency with respect to the reference crossing moments.

33. The circuitry according to claim 28, wherein the driver is designed such that a sum of phase delays of the switch unit and the driver lies between 10° and 40° in relation to a period of the operating frequency.

34. The circuitry according to claim 28, wherein the driver is designed such that a sum of phase delays of the switch unit and the driver lies between 20° and 30° in relation to a period of the operating frequency.

35. The circuitry according to claim 5, wherein the piezo transformer comprises a first transformer unit and a second transformer unit, wherein the first transformer unit and the second transformer unit are connected in series on the input side, wherein an output of the first transformer unit provides the output current, and wherein an output of the second transformer unit provides the auxiliary signal.

36. The circuitry according to claim 35, wherein a capacitance is connected in parallel to the output of the second transformer unit, which is designed to achieve that the auxiliary voltage has a phase shift in a range between 80° and 100° in relation to a current in a resonant circuit of the piezo transformer.

37. The circuitry according to claim 35, wherein the first transformer unit and the second transformer unit are two piezoelectric transformers or part of a single piezoelectric transformer.

38. The circuitry according to claim 35, wherein the switch unit, the driver and the synchronizer are designed such that a sum of phase delays of the synchronizer, the driver and the switch unit lies in a range between 80° and 100°, wherein the phase delay of the driver describes a time delay between a turn-on signal and a generation of a control signal for turning on the switch of the switch unit, and wherein the phase delay of the switch describes the time delay between the generation of the control signal for turning on the switch and actual turning-on of the switch.

39. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and which is further designed such that a useful power provided in the form of useful energy is substantially proportional to the output current; and wherein the circuitry is designed to adjust the output current to a predetermined value; wherein the converter unit comprises an inductance, which is connected between a supply voltage terminal for receiving a supply direct voltage and a first input terminal of the piezo transformer, so that a first terminal of the inductance is coupled to the first supply terminal, and such that a second terminal of the inductance is coupled to the first input terminal of the piezo transformer, and wherein the converter further comprises a switch whose first terminal is coupled to the second terminal of the inductance and the first input terminal of the piezo transformer, and whose second terminal is coupled to a second input terminal of the piezo transformer and a second supply terminal for receiving the supply direct voltage, so that the converter unit forms a class E converter.

40. The circuitry according to claim 5, wherein the regulator is designed to determine a phase difference between the auxiliary signal and turn-on moments when a switch of the converter, which serves to generate the alternating current signal, is turned off, and to turn off the converter when the phase difference leaves a predetermined allowable range.

41. The circuitry according to claim 5, wherein the regulator is designed to determine a phase difference between the auxiliary signal and turn-off moments when a switch of the converter, which serves to generate the alternating current signal, is turned off, and to change the predetermined value for the output current when the phase difference leaves a predetermined range.

42. The circuitry according to claim 41, wherein the regulator is designed to reduce the predetermined value for the output current, when the phase difference indicates a load reduced by at least a predetermined deviation in relation to a nominal value.

43. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful energy is substantially proportional to the output current; and
wherein the circuitry is designed to adjust the output current to a predetermined value;
wherein the load comprises one or several light-emitting diodes, and wherein the form of the useful energy is light energy,
wherein the load comprises a series connection of at least two sections, wherein the first section comprises a parallel connection of two branches, wherein the first branch of the first section comprises one or several light-emitting diodes, which are connected in a first direction between a first terminal of the first section and a second terminal of the first section, and wherein the second branch of the first section comprises one or several light-emitting diodes, which are connected in a second direction, which is opposite to the first direction, between the first terminal of the first section and the second terminal of the first section, and wherein the second section comprises a parallel connection of the two branches, wherein the first branch of the second section comprises one or several light-emitting diodes, which are connected in a first orientation between a first terminal of the second section and a second terminal of the second section, and wherein the second branch of the second section comprises one or several light-emitting diodes, which are connected in a second orientation, which is opposite to the first orientation, between the first terminal of the second section and the second terminal of the second section.

44. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful energy is substantially proportional to the output current; and
wherein the circuitry is designed to adjust the output current to a predetermined value;
wherein the load comprises one or several light-emitting diodes, and wherein the form of the useful energy is light energy, wherein the load comprises a bridge rectifier, whose input is coupled to the output of the piezo transformer to receive the output current, and whose output is coupled to a bridge rectifier output load, wherein diodes of the bridge rectifier are designed as light-emitting diodes.

45. The circuitry according to claim 44, wherein the bridge rectifier output load comprises a parallel connection of a capacitance and a light-emitting diode or a series connection of at least two light-emitting diodes.

46. A circuitry comprising:
a converter for generating an alternating current signal from energy from an energy source;
a piezo transformer with an input and an output, wherein the input of the piezo transformer is electrically coupled to the converter to receive the alternating current signal from the converter as an input side excitation, and wherein the output of the piezo transformer is designed to provide an output current; and
a load coupled to the output of the piezo transformer so that output current flows through the same,
which is designed to convert at least part of the electrical energy supplied by the output current flowing through the load into another form of energy, and
which is further designed such that a useful power provided in the form of useful energy is substantially proportional to the output current; and
wherein the circuitry is designed to adjust the output current to a predetermined value, and wherein the load comprises an accumulator, and wherein the form of the useful energy is chemical energy.

47. A circuitry comprising:

a converter for generating an alternating current signal from energy from an energy source;

a piezo transformer with an input and an output, wherein the input of the piezo transformer is electrically coupled to the converter to receive the alternating current signal from the converter as an input side excitation, and wherein the output of the piezo transformer is designed to provide an output current; and a load coupled to the output of the piezo transformer so that output current flows through the same, which is designed to convert at least part of the electrical energy supplied by the output current flowing through the load into another form of energy, and which is further designed such that a useful power provided in the form of useful energy is substantially proportional to the output current; and wherein the circuitry is designed to adjust the output current to a predetermined value, wherein the load comprises a parallel connection of a first accumulator branch and a second accumulator branch, wherein the first accumulator branch comprises a series connection of a first diode and a first accumulator, which are connected in a first polarity between a first terminal of the load and a second terminal of the load, and wherein the second accumulator branch comprises a series connection of a second diode and a second accumulator, which are connected in a second polarity opposite to the first polarity between the first terminal of the load and the second terminal of the load.

48. The circuitry according to claim 47, wherein a positive electrode of the first accumulator is coupled to the first terminal of the load via the first diode, and wherein a negative electrode of the first accumulator is coupled to the second terminal of the load, wherein a negative electrode of the second accumulator is coupled to the first terminal of the load via the second diode, and wherein a positive electrode of the second accumulator is coupled to the negative electrode of the first accumulator and the second terminal of the load.

49. The circuitry according to claim 48, wherein an electrical current load is coupled to the positive electrode of the first accumulator, and wherein the electrical current load is further coupled to the negative electrode of the second accumulator.

50. The circuitry according to claim 49, wherein the electrical current load is further coupled to the second terminal of the load.

\* \* \* \* \*

UNITED STATES PATENT AND TRADEMARK OFFICE
CERTIFICATE OF CORRECTION

PATENT NO. : 7,745,970 B2  Page 1 of 1
APPLICATION NO. : 11/383976
DATED : June 29, 2010
INVENTOR(S) : Matthias Radecker et al.

It is certified that error appears in the above-identified patent and that said Letters Patent is hereby corrected as shown below:

Claim 5, Column 50, Line 40, replace the word "enemy" with --energy--. This line should appear as follows:

in the form of useful energy is substantially proportional

Signed and Sealed this

Ninth Day of November, 2010

David J. Kappos
*Director of the United States Patent and Trademark Office*